US012759173B1

(12) United States Patent
Jenest et al.

(10) Patent No.: US 12,759,173 B1
(45) Date of Patent: Oct. 13, 2026

(54) ELBOW ASSEMBLY OF A HUMANOID ROBOT

(71) Applicant: Figure AI Inc., San Jose, CA (US)

(72) Inventors: Nathan Jenest, San Jose, CA (US); Michael Stevens, San Jose, CA (US); David McCall, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/090,353

(22) Filed: Mar. 25, 2025

Related U.S. Application Data

(60) Provisional application No. 63/634,959, filed on Apr. 17, 2024, provisional application No. 63/634,527, filed on Apr. 16, 2024, provisional application No. 63/633,931, filed on Apr. 15, 2024, provisional application No. 63/569,238, filed on Mar. 25, 2024.

(51) Int. Cl.
*B25J 17/00* (2006.01)

(52) U.S. Cl.
CPC .................................... *B25J 17/00* (2013.01)

(58) Field of Classification Search
CPC ........ B25J 15/0009; B25J 9/101; B25J 18/04; B25J 9/1025; B25J 49/001; F16H 49/001
See application file for complete search history.

(56) References Cited

U.S. PATENT DOCUMENTS

| | | | |
|---|---|---|---|
| 4,804,220 | A | 2/1989 | Rosheim |
| 4,834,761 | A | 5/1989 | Walters |
| 4,986,723 | A | 1/1991 | Maeda |
| 5,394,766 | A | 3/1995 | Johnson |
| 5,447,403 | A | 9/1995 | Engler, Jr. |
| 6,477,058 | B1 | 11/2002 | Luebs |
| 6,732,015 | B2 | 5/2004 | Maeda |
| 6,901,313 | B2 | 5/2005 | Mori |
| 6,980,889 | B2 | 12/2005 | Ito |
| 7,024,276 | B2 | 4/2006 | Ito |
| 7,031,806 | B2 | 4/2006 | Kuroki |

(Continued)

FOREIGN PATENT DOCUMENTS

| | | |
|---|---|---|
| CN | 102357889 | 2/2012 |
| CN | 308637925 | 5/2014 |

(Continued)

OTHER PUBLICATIONS

Machine translation of CN-114147745-A (Year: 2022).*

(Continued)

*Primary Examiner* — Randell J Krug

(57) ABSTRACT

A humanoid robot comprises a torso and an arm assembly with an upper arm twist actuator, lower humerus, upper forearm, and elbow actuator. The lower humerus features a humerus extender coupled to the twist actuator and an elbow actuator mating assembly with a curvilinear external surface. The upper forearm includes a coupling assembly with a U-shaped external surface in a first plane, and an extender with a U-shaped external surface in a second plane perpendicular to the first plane. The elbow actuator has one extent received within the mating assembly and another extent within the coupling assembly, with these assemblies collectively surrounding most of the elbow actuator. This configuration enables controlled arm movement while maintaining structural integrity at the elbow joint.

22 Claims, 25 Drawing Sheets

(56) References Cited

U.S. PATENT DOCUMENTS 7,072,741 B2 7/2006 Nagashima
7,099,747 B2 8/2006 Mikami
7,113,849 B2 9/2006 Kuroki
7,308,336 B2 12/2007 Takenaka
7,319,917 B2 1/2008 Takenaka
7,319,918 B2 1/2008 Takenaka
7,337,039 B2 2/2008 Takenaka
7,379,789 B2 5/2008 Takenaka
7,386,364 B2 6/2008 Mikami
7,496,428 B2 2/2009 Takenaka
7,664,569 B2 2/2010 Shimizu
7,864,159 B2 1/2011 Sweetser
D641,808 S 7/2011 Matsuda
D677,743 S 3/2013 Koshiishi
D687,908 S 8/2013 Hoang
8,511,964 B2 8/2013 Linn
D689,566 S 9/2013 Wong
8,660,695 B2 2/2014 De La Rosa Tames
8,770,749 B2 7/2014 Mccabe
8,942,849 B2 1/2015 Maisonnier
9,134,547 B2 9/2015 Mccabe
9,205,556 B1 12/2015 Magnusson
9,205,560 B1 12/2015 Edsinger
9,346,165 B1 5/2016 Metzger
9,494,415 B2 11/2016 Sweetser
9,574,646 B1 2/2017 Edsinger
9,575,335 B1 2/2017 Mccabe
9,592,603 B2 3/2017 Hardouin
D794,692 S 8/2017 Haranaka
D795,320 S 8/2017 Liu
D795,321 S 8/2017 Liu
9,789,607 B1 10/2017 Whitman
9,789,612 B2 10/2017 Hoffman
9,796,078 B2 10/2017 Angle
9,821,466 B2 11/2017 Bingham
9,868,210 B1 1/2018 Whitman
9,992,474 B2 6/2018 Grunnet-Jepsen
10,007,994 B2 6/2018 Grunnet-Jepsen
10,018,256 B1 7/2018 Magnusson
D835,214 S 12/2018 Xiong
D838,759 S 1/2019 Kowalski
10,189,158 B2 1/2019 Edsinger
D841,708 S 2/2019 Koshiishi
10,203,209 B2 2/2019 Roumeliotis
10,310,362 B2 6/2019 Grunnet-Jepsen
10,349,245 B2 7/2019 Tokuchi
D866,684 S 11/2019 Früh
D868,866 S 12/2019 Gable
D872,152 S 1/2020 Xiong
D873,320 S 1/2020 Clerc
10,537,998 B2 1/2020 Salisbury
10,545,497 B1 1/2020 Cui
D885,451 S 5/2020 Chen
D888,120 S 6/2020 Hurst
D892,886 S 8/2020 Klassen
D892,887 S 8/2020 Klassen
D893,573 S 8/2020 Yan
10,780,578 B2 9/2020 Blankespoor
D898,789 S 10/2020 Nazarikhorram
10,890,921 B2 1/2021 Gillett
D911,459 S 2/2021 Xiong
10,921,558 B2 2/2021 Yao
10,924,638 B2 2/2021 Swaminathan
10,946,528 B2 3/2021 Gupta
10,960,539 B1 3/2021 Kalakrishnan
10,988,192 B1 4/2021 Thorne
D918,979 S 5/2021 Mullan
D921,081 S 6/2021 Laplante
D932,531 S 10/2021 Xu
11,180,205 B2 11/2021 Amino
11,188,821 B1 11/2021 Kalakrishnan
11,247,738 B2 2/2022 Lavalley
11,292,126 B2 4/2022 Christensen
11,333,954 B2 5/2022 Bull
11,347,030 B2 5/2022 Yao
11,416,003 B2 8/2022 Whitman
11,435,745 B2 9/2022 Lee
11,498,223 B2 11/2022 Williams
11,546,504 B2 1/2023 Kim
11,554,484 B2 1/2023 Jung
11,600,010 B2 3/2023 Doutre
11,602,853 B2 3/2023 Stoianovici
11,632,991 B2 4/2023 Hull
D985,643 S 5/2023 Li
11,686,884 B2 6/2023 Shinohara
11,699,884 B2 7/2023 Braun
11,707,852 B1 7/2023 Hurst
11,736,677 B2 8/2023 Grunnet-Jepsen
11,807,067 B2 11/2023 Mancini
11,833,680 B2 12/2023 Deits
11,850,738 B2 12/2023 Chernyak
11,851,120 B2 12/2023 Fay
11,924,023 B1 3/2024 Smith
11,999,423 B2 6/2024 Whitman
12,036,670 B2 7/2024 Geating
12,054,208 B2 8/2024 Swilling
12,070,863 B2 8/2024 Whitman
12,077,229 B2 9/2024 Whitman
12,097,626 B2 9/2024 Ikeda
12,122,044 B2 10/2024 Webb
D1,051,193 S 11/2024 Mahoor
12,134,181 B2 11/2024 Klingensmith
12,172,537 B2 12/2024 Gonano
12,214,497 B2 2/2025 Whitman
12,235,652 B2 2/2025 Whitman
12,240,117 B2 3/2025 Chebotar
12,246,441 B1 3/2025 Abate
12,251,831 B2 3/2025 Murphy
D1,069,875 S 4/2025 Belon
12,263,591 B1 4/2025 Clerc
12,290,940 B1 5/2025 Abate
D1,082,881 S 7/2025 Wang
D1,085,192 S 7/2025 Abroff
12,365,094 B2 7/2025 Mccall
12,403,611 B2 9/2025 Mccall
12,447,628 B1 10/2025 Mccall
12,472,648 B1 11/2025 Hadas
2003/0120388 A1 6/2003 Kuroki
2004/0075168 A1 4/2004 Azuma
2004/0103740 A1 6/2004 Townsend
2005/0072558 A1 4/2005 Whitney
2006/0217838 A1 9/2006 Sugino
2007/0035143 A1 2/2007 Blackwell
2008/0239678 A1 10/2008 Ploeg
2008/0240889 A1 10/2008 Yokoyama
2009/0059033 A1 3/2009 Shimada
2010/0280662 A1 11/2010 Abdallah
2011/0058800 A1 3/2011 Lee
2011/0067517 A1 3/2011 Ihrke
2011/0067520 A1 3/2011 Ihrke
2011/0068595 A1 3/2011 Ihrke
2011/0071671 A1 3/2011 Ihrke
2011/0071673 A1 3/2011 Ihrke
2011/0071678 A1 3/2011 Ihrke
2012/0078419 A1 3/2012 Kim
2012/0155775 A1 6/2012 Ahn
2012/0310412 A1 12/2012 Seo
2013/0175816 A1 7/2013 Kawasaki
2014/0039675 A1 2/2014 Ead
2014/0217762 A1 8/2014 Ihrke
2014/0265401 A1 9/2014 Allen Demers
2014/0279432 A1 9/2014 Holman
2015/0192399 A1* 7/2015 Raab .................... G05B 19/401 33/503
2016/0008988 A1 1/2016 Kennedy
2016/0052574 A1 2/2016 Khripin
2016/0064263 A1 3/2016 Hosek
2017/0032035 A1 2/2017 Gao
2017/0075143 A1 3/2017 Saylor
2017/0080582 A1* 3/2017 Mugnier .............. B25J 19/0091
2017/0106738 A1 4/2017 Gillett
2017/0299898 A1 10/2017 Gallina
2017/0326736 A1 11/2017 Nagatsuka
2018/0104823 A1 4/2018 Kaku

(56) References Cited

U.S. PATENT DOCUMENTS

| | | | |
|---|---|---|---|
| 2018/0182260 | A1 | 6/2018 | Ciniello |
| 2018/0281179 | A1 | 10/2018 | Michalakis |
| 2018/0293517 | A1 | 10/2018 | Browne |
| 2018/0357552 | A1 | 12/2018 | Campos |
| 2019/0025611 | A1 | 1/2019 | Saylor |
| 2019/0105783 | A1 | 4/2019 | Al Moubayed |
| 2019/0278079 | A1 | 9/2019 | Mccabe |
| 2019/0329413 | A1 | 10/2019 | Johnson |
| 2019/0337166 | A1 | 11/2019 | Keeney-Ritchie |
| 2019/0374161 | A1 | 12/2019 | Ly |
| 2020/0009739 | A1 | 1/2020 | Moon |
| 2020/0086479 | A1 | 3/2020 | Messier |
| 2020/0180145 | A1 | 6/2020 | Xiong |
| 2020/0180146 | A1 | 6/2020 | Xiong |
| 2020/0180167 | A1 | 6/2020 | Xiong |
| 2020/0182336 | A1 | 6/2020 | Xiong |
| 2020/0182337 | A1 | 6/2020 | Xiong |
| 2020/0330246 | A1 | 10/2020 | Tognetti |
| 2020/0409183 | A1 | 12/2020 | Saylor |
| 2021/0162602 | A1 | 6/2021 | Kawaguchi |
| 2021/0387346 | A1 | 12/2021 | Gillett |
| 2022/0226996 | A1 | 7/2022 | Ishizuka |
| 2022/0227010 | A1 | 7/2022 | Takabu |
| 2022/0287853 | A1 | 9/2022 | Ren |
| 2022/0294062 | A1 | 9/2022 | Kamon |
| 2022/0388174 | A1 | 12/2022 | Stathis |
| 2022/0390952 | A1 | 12/2022 | Yu |
| 2022/0395974 | A1 | 12/2022 | Balasubramanian |
| 2022/0410378 | A1 | 12/2022 | Deits |
| 2022/0410380 | A1 | 12/2022 | Lu |
| 2023/0033779 | A1 | 2/2023 | Gazeau |
| 2023/0048725 | A1 | 2/2023 | Barbour |
| 2023/0112596 | A1 | 4/2023 | Yang |
| 2023/0143315 | A1 | 5/2023 | Whitman |
| 2023/0154055 | A1 | 5/2023 | Besenbruch |
| 2023/0173683 | A1 | 6/2023 | Gomez |
| 2023/0182296 | A1 | 6/2023 | Sermanet |
| 2023/0347514 | A1 | 11/2023 | Xiao |
| 2023/0390948 | A1 * | 12/2023 | Hsu ...................... B25J 19/0033 |
| 2024/0003380 | A1 | 1/2024 | Vyas |
| 2024/0044331 | A1 * | 2/2024 | Sterling .............. F16H 57/0495 |
| 2024/0091964 | A1 | 3/2024 | Smith |
| 2024/0181637 | A1 | 6/2024 | Gillett |
| 2024/0217104 | A1 | 7/2024 | Neville |
| 2024/0228191 | A1 | 7/2024 | Kumar |
| 2024/0289606 | A1 | 8/2024 | Wang |
| 2024/0294219 | A1 | 9/2024 | Gildert |
| 2024/0299195 | A1 * | 9/2024 | Perry ...................... A61F 2/583 |
| 2024/0300109 | A1 | 9/2024 | Shaw |
| 2024/0430464 | A1 | 12/2024 | Kalva |
| 2025/0042020 | A1 | 2/2025 | Fleury |
| 2025/0042024 | A1 | 2/2025 | Dijkman |
| 2025/0131347 | A1 | 4/2025 | Wells |
| 2025/0147517 | A1 | 5/2025 | Swilling |
| 2025/0187202 | A1 | 6/2025 | Mccall |
| 2025/0196326 | A1 | 6/2025 | Katz |
| 2025/0196327 | A1 | 6/2025 | Geating |
| 2025/0205908 | A1 | 6/2025 | Goldsmith |

FOREIGN PATENT DOCUMENTS

| | | | | |
|---|---|---|---|---|
| CN | 303298408 | | 7/2015 | |
| CN | 209615545 | | 11/2019 | |
| CN | 210998685 | | 7/2020 | |
| CN | 212287717 | | 1/2021 | |
| CN | 112959343 | | 6/2021 | |
| CN | 114147745 | | 3/2022 | |
| CN | 114147745 | A * | 3/2022 | ........... B25J 9/1602 |
| CN | 115503013 | | 12/2022 | |
| CN | 115649316 | | 1/2023 | |
| CN | 218802294 | | 4/2023 | |
| CN | 116714698 | | 9/2023 | |
| CN | 117047810 | | 11/2023 | |
| CN | 117301022 | | 12/2023 | |
| CN | 117462367 | | 1/2024 | |
| CN | 309012925 | | 12/2024 | |
| DE | 112018003604 | T5 * | 5/2020 | ............... C22C 9/06 |
| DE | 112018003604 | | 11/2023 | |
| GB | 2472046 | | 4/2013 | |
| GB | 2496335 | | 5/2013 | |
| JP | 1301180 | | 5/2007 | |
| JP | D1638014 | | 7/2019 | |
| JP | 1698172 | | 10/2021 | |
| KR | 20180107353 | | 10/2018 | |
| KR | 300994127 | | 2/2021 | |
| KR | 3020240036125 | | 9/2024 | |
| SU | 1734994 | | 5/1992 | |
| WO | 2009030922 | | 3/2009 | |
| WO | 2017103682 | | 6/2017 | |
| WO | 2017103682 | A2 | 6/2017 | |
| WO | 2019234706 | | 12/2019 | |
| WO | 2020190594 | | 9/2020 | |
| WO | WO-2020190594 | A1 * | 9/2020 | .......... B25J 19/0091 |
| WO | 2022207106 | | 10/2022 | |
| WO | 2023107501 | | 6/2023 | |
| WO | 2023110778 | | 6/2023 | |
| WO | 2023246994 | | 12/2023 | |
| WO | 2023246995 | | 12/2023 | |
| WO | 2024058844 | | 3/2024 | |
| WO | 2024072966 | | 4/2024 | |
| WO | 2024085904 | | 4/2024 | |
| WO | 2024112350 | | 5/2024 | |
| WO | 2024112351 | | 5/2024 | |
| WO | 2024123766 | | 6/2024 | |
| WO | 2024163992 | | 8/2024 | |
| WO | D243074010 | | 10/2024 | |
| WO | 2025019583 | | 1/2025 | |
| WO | 2025042802 | | 2/2025 | |
| WO | 2025072321 | | 4/2025 | |
| WO | 2025103557 | | 5/2025 | |
| WO | 2025103557 | A1 | 5/2025 | |

OTHER PUBLICATIONS

Machine translation of DE-112018003604-T5 (Year: 2020).*

Machine translation of WO-2020190594-A1. (Year: 2020).*

Barker et al., Natural head movement for HRI with a muscular-skeletal head and neck robot, 2017, IEEE, p. 587-592 (Year: 2017).

Gao et al., Development of a low motion-noise humanoid neck: Statics analysis and experimental validation, 2010, IEEE, p. 1203-1208 (Year: 2010).

Keselman et al., "Intel RealSense stereoscopic depth cameras," in Proceedings of the IEEE Conference on Computer Vision and Pattern Recognition Workshops, pp. 1-10, 2017.

Nakada et al., Deep Learning of Neuromuscular and Visuomotor Control of a Biomimetic Simulated Humanoid, 2020, IEEE, p. 3952-3959 (Year: 2020).

Lim et al., Basic emotional walking using a biped humanoid robot, 1999, IEEE, p. 954-959 (Year: 1999).

Albers et al., Upper Body of a new Humanoid Robot—the Design of ARMAR III, 2006, IEEE, p. 308-309 (Year: 2006).

Mikayla Tetteh-Martey, (date posted Nov. 3, 2024), Blurring Lines: Resurgence of 'I, Robot', Cornellsun.com, URL: (https:// www.cornellsun.com/article/2024/11/blurring-lines-resurgence-of-i-robot), (Year: 2024).

Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).

Park et al., Mechanical Design of Humanoid Robot Platform KHR-3 (KAIST Humanoid Robot 3: HUBO), 2005, IEEE, p. 321-3226 (2005).

International Search Report for PCT/US2025/023064.

Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.

Hebi Robotics, "T-Series Actuator," Jan. 29, 2024.

International Search Report for PCT/US2025/019793.

International Search Report for PCT/US2025/025005.

International Search Report for PCT/US2025/024817.

(56) References Cited

OTHER PUBLICATIONS

Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2025).
Frohlich et al., "Design and Impementation of a Spherical Joint for Mobile Manipulators," IEEE, p. 251-258 (2025).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic—Head for Human-Robot Interaction, 2019, IEEE, p. 46-51 (Year: 2019).
International Search Report for PCT/US25/23325.
Merged original document with English translation (CN 112959343); Paragraphs added for citation purposes. (Year: 2025).
Merged original document (KR 20180107353) with English Translation (Year: 2025).
International Search Report for PCT/US2025/012544.
International Search Report for PCT/US2025/010425.
International Search Report for PCT/US2025/011450.
International Search Report for PCT/US2025/016930.
Available online at https://youtu.be/YsdnsNjvwKo?si=bu2dXk8mQaL86C2M, at least as early as Aug. 23, 2023.
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://www.youtube.com/watch?v=G6JE7mNYz2A, at least as early as Oct. 17, 2024.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://www.youtube.com/watch?v=B-ebMigAHzQ, at least as early as Sep. 30, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://www.youtube.com/watch?v=DrNcXgoFv20, at least as early as Oct. 18, 2024.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://www.youtube.com/watch?v=iWC8rSjDywU, at least as early as Oct. 18, 2024.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=bUrLuUxv9gE, at least as early as Aug. 30, 2024.
Available online at https://www.youtube.com/watch?v=-9EM5_VFIt8, at least as early as Apr. 16, 2024.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=bdVrWxjK2vo, at least as early as Sep. 17, 2024.
Available online at https://www.youtube.com/watch?v=qw2y0kceAv0, at least as early as Oct. 15, 2024.
Available online at https://www.youtube.com/watch?v=B_l2k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w&t=111s, as least as early as Oct. 5, 2022.
Available online at https://www.youtube.com/watch?v=UPOLcE1vwA0, at least as early as Apr. 28, 2016.
Available online at https://www.youtube.com/watch?v=UBbk18oZbTc, at least as early as Oct. 14, 2024.
Available online at https://www.youtube.com/watch?v=UHe1zSQwep0, at least as early as Oct. 14, 2024.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=zmqWU2dQKZ8, at least as early as Oct. 24, 2024.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Pateromichelakis et al., Head-eyes system and gaze analysis of the humanoid robot Romeo, 2014, IEEE, p. 1374-1379 (Year: 2014).
Jeung et al., Realization of human neck motion with novel robotic mechanism, 2016, IEEE, p. 482-486 (Year: 2016).
Available online at https://www.youtube.com/watch?v=FGcQqyCaG5s, at least as early as Dec. 2, 2025.
Duran-Hernandez et al., "Control Implementation in a Low-cost Designed Biped Robot to Reproduce Squats," The 10th International Conference on Control, Mechatronics and Automation, Nov. 9, 2022.
Hao et al., Design and kinematics analysis of a 4-DOF articulated steering mechanism, 2015, IEEE, p. 5875-5880 (Year: 2015).
Or, Computer Simulations of a Humanoid Robot Capable of Walking Like Fashion Models, 2012, IEEE, p. 241-248 (Year: 2012).
Available online at https://www.youtube.com/watch?v=Fb_R6IDDU4A, at least as early as Oct. 9, 2020.

(56) References Cited

OTHER PUBLICATIONS

Available online at https://www.youtube.com/watch?v=_mQJw8VhZ7w, at least as early as Oct. 5, 2022.
Available online at https://www.youtube.com/watch?v=a-R4H8-8074, at least as early as Jun. 6, 2015.
Available online at https://www.youtube.com/watch?v=1fC7b2LjVW4, at least as early as Jul. 12, 2016.
Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).
Shafti et al., Real-time Robot-assisted Ergonomics, 2019, IEEE, p. 1975-1981 (Year: 2019).
Luo et al., Human body trajectory generation using point cloud data for robotics massage applications, 2014, IEEE, p. 5612-5617 (Year: 2014).
Cheng et al., Human posture estimation using voxel data for "smart" airbag systems: issues and framework, 2004, IEEE, p. 84-89 (Year: 2004).
Or, Humanoids Grow a Spine: The Effect of Lateral Spinal Motion on the Mechanical Energy Efficiency, 2012, IEEE, p. 1-11 (Year : 2012).
Souissi et al., Influence of the number of humanoid vertebral column pitch joints in flexion movements, 2011, IEEE, p. 227-282 ( Year: 2011).
Han et al., Mechanical design of robot lower body based on four-bar linkage structure for energy efficient bipedal walking, 2016, IEEE, p. 402-407 (Year: 2016).
Park et al., Design of a lower limb exoskeleton including roll actuation to assist walking and standing up, 2015, IEEE, p. 359-354 ( Year: 2015).
Tsagarakis et al., Lower body realization of the baby humanoid 'iCub', 2007, IEEE, p. 3616-3622 (Year: 2007).
Available online at https://x.com/Tesla/status/1986558797947580555, at least as early as Nov. 6, 2005.
Available online at https://x.com/Tesla_Optimus/status/1964425666834931730, at least as early as Sep. 6, 2025.
Available online at https://x.com/Tesla_Optimus/status/1925047336256078302, at least as early as May 21, 2025.
Available online at https://x.com/elonmusk/status/1922083384085430492, at least as early as May 12, 2025.
Available online at https://x.com/Tesla_Optimus/status/1914781858706985363, at least as early as Apr. 22, 2025.
Available online at https://x.com/Tesla_Optimus/status/1866171391156113740, at least as early as Dec. 9, 2024.
Available online at https://x.com/Tesla_Optimus/status/1862116407594377698, at least as early as Nov. 28, 2024.
Available online at https://x.com/Tesla_Optimus/status/1844789517833629717, at least as early as Oct. 11, 2024.
Available online at https://x.com/elonmusk/status/1752516361799258318, at least as early as Jan. 30, 2024.
Available online at https://www.youtube.com/watch?v=6JwClvNwoYw, at least as early as Oct. 6, 2025.
Available online at https://www.youtube.com/watch?v=Sdz21k-X7gc, at least as early as Oct. 4, 2025.
Available online at https://www.youtube.com/watch?v=xDf94C2AoYQ, at least as early as Nov. 9, 2025.
Available online at https://www.youtube.com/shorts/mOlxtSSa1NE, at least as early as Sep. 3, 2025.
Available online at https://www.youtube.com/watch?v=mveqrNJj8ME, at least as early as Oct. 31, 2025.
Available online at https://youtu.be/LTYMWadOW7c?si=QbgG44DJi7LVNAvf, at least as early as Oct. 28, 2025.
Available online at https://youtu.be/dD3YBkOUKHk?si=PibnkCacKZfPGD4Y, at least as early as Jul. 9, 2025.
Available online at https://youtu.be/JUz-hyP5PMg?si=s5clcTTKitRXS_OZ, at least as early as Jun. 11, 2025.
Available online at https://www.youtube.com/watch?v=Dp6sqx9BGZs, at least as early as Jun. 11, 2025.
Available online at https://www.youtube.com/watch?v=i1SvmFWu834, at least as early as Mar. 21, 2025.
Available online at https://www.youtube.com/watch?v=r2r26ebhtYQ, at least as early as Feb. 25, 2025.
Available online at https://www.youtube.com/watch?v=uVcBa6NXAbk, at least as early as Feb. 21, 2025.
Available online at https://www.youtube.com/watch?v=l44_zbEwz_w, at least as early as Mar. 19, 2025.
Available online at https://www.youtube.com/watch?v=oe1dke3Cf7l, at least as early as May 28, 2025.
Available online at https://www.youtube.com/watch?v=gS4rOqNDTBk, at least as early as Oct. 8, 2025.
Available online at https://www.youtube.com/watch?v=HYwekersccY, at least as early as Aug. 20, 2025.
Available online at https://www.youtube.com/watch?v=dFObux6mfTc, at least as early as Apr. 28, 2025.
Available online at https://www.youtube.com/watch?v=F_7IPm7f1vl, at least as early as Oct. 30, 2024.
Available online at https://www.youtube.com/watch?v=v8UaiRgqvlc, at least as early as Mar. 5, 2025.
Available online at https://www.youtube.com/watch?v=X2JTgraC6Zk, at least as early as Nov. 18, 2025.
Available online at https://www.youtube.com/watch?v=PJglY8xDGlc, at least as early as Nov. 12, 2025.
Available online at https://www.youtube.com/watch?v=QOi3dKzRoEo, at least as early as Nov. 10, 2025.
Available online at https://www.youtube.com/watch?v=6M6B2W8eqUU, at least as early as Nov. 10, 2025.
Available online at https://www.youtube.com/watch?v=m_Ag_SgsHVg, at least as early as Nov. 7, 2025.
Available online at https://www.youtube.com/watch?v=Yawmu4EQ53w, at least as early as Nov. 6, 2025.
Available online at https://www.youtube.com/watch?v=OhcqCt9ezaw, at least as early as Nov. 6, 2025.
Available online at https://www.youtube.com/watch?v=LdxlegrxsBQ, at least as early as Dec. 6, 2024.
Available online at https://www.youtube.com/shorts/Jdh9cnBDQe0, at least as early as Nov. 6, 2025.
Available online at https://www.youtube.com/watch?v=jjOfpsMRhL4, at least as early as Nov. 19, 2025.
Available online at https://www.youtube.com/watch?v=qDM5N_1QL9k, at least as early as Nov. 19, 2025.
Available online at https://www.youtube.com/watch?v=ERH-tMUHV1E, at least as early as Nov. 19, 2025.
Available online at https://www.youtube.com/watch?v=eUdBIFkMh-M, at least as early as Oct. 20, 2025.
Available online at https://www.youtube.com/watch?v=v1Q4Su54iho, at least as early as Jul. 25, 2025.
Available online at https://www.youtube.com/watch?v=0rwYOa7pJCs, at least as early as Apr. 1, 2025.
Available online at https://www.youtube.com/watch?v=mHP1WGlw5Wk, at least as early as Jul. 17, 2025.
Available online at https://www.youtube.com/watch?v=TNryO2uasws, at least as early as Jul. 23, 2025.
Available online at https://www.youtube.com/watch?v=pegIMP6t9xU, at least as early as Nov. 24, 2025.
Available online at https://www.youtube.com/watch?v=02v3_7n9gH8, at least as early as Nov. 24, 2025.
Available online at https://www.youtube.com/watch?v=LXVV-oErD8s, at least as early as Sep. 17, 2025.
Available online at https://www.youtube.com/watch?v=GcTUIOHvdOs, at least as early as Oct. 16, 2025.
Available online at https://www.youtube.com/watch?v=rnD1PeEJJlc, at least as early as Nov. 26, 2025.

* cited by examiner

ELBOW ASSEMBLY OF A HUMANOID ROBOT

CROSS REFERENCE TO RELATED APPLICATIONS

This application claims the benefit of and priority to U.S. Provisional Patent Application Nos. 63/569,238 filed on Mar. 25, 2024, 63/633,931 filed on Apr. 15, 2024, 63/634,527 filed on Apr. 16, 2024, and 63/634,959 filed on Apr. 17, 2024, each of which is expressly incorporated by reference herein in its entirety.

Reference is hereby made to: (i) PCT Application Nos. PCT/US25/10425, PCT/US25/11450, PCT/US25/12544, PCT/US25/16930, PCT/US25/19793, (ii) U.S. patent application Ser. Nos. 18/919,263, 18/919,274, 19/000,626, 19/006,191, 19/038,657, 19/064,596, 19/066,122, 19/084,609, and (iii) U.S. Provisional Patent Application Nos. 63/557,874, 63/561,300, 63/561,315, 63/564,741, 63/573,226, 63/614,499, 63/615,766, 63/617,762, 63/620,633, 63/625,362, 63/625,370, 63/625,381, 63/625,384, 63/625,389, 63/625,405, 63/625,423, 63/625,431, 63/626,028, 63/626,030, 63/626,034, 63/626,035, 63/626,037, 63/626,039, 63/626,040, 63/626,105, 63/632,630, 63/632,683, 63/633,405, 63/633,920, 63/685,856, 63/696,507, 63/696,533, 63/700,749, 63/706,768, 63/707,547, 63/708,003, 63/722,057, 63/633,941, 63/635,152, 63/556,102, 63/561,317, 63/561,318, and 63/766,911, each of which is expressly incorporated by reference herein in its entirety.

TECHNICAL FIELD

This disclosure relates to a portion of an elbow assembly of a robot, specifically an arm portion or an elbow assembly of a general-purpose humanoid robot.

BACKGROUND

The contemporary workplace is experiencing a critical and growing labor shortage, with over ten million positions in the United States currently categorized as unsafe, undesirable, or unfilled. This deficit spans numerous sectors, including manufacturing (e.g., automotive assembly), construction, and logistics (e.g., package sorting and delivery), where job functions frequently involve repetitive, physically demanding, and/or hazardous tasks that are increasingly unattractive to the human workforce. The persistence of this labor gap poses substantial challenges to productivity, economic development, and occupational safety. To mitigate these challenges, there is a pressing need for the development and deployment of advanced robotic systems capable of executing such tasks efficiently and reliably. General-purpose humanoid robots offer a promising solution by replicating the versatility and adaptability of human workers across a broad spectrum of applications. However, widespread adoption has been limited in part due to technical constraints in replicating the complex biomechanics of human anatomy-particularly the arm and elbow joint, which are important for executing precise, coordinated movements in unstructured environments.

Conventional robotic elbow designs often rely on linear actuators, hydraulic mechanisms, or tendon/cable-driven systems. These solutions tend to be bulky, susceptible to wear, and constrained in their ability to deliver smooth, controlled, and multi-degree-of-freedom motion. In particular, many systems lack functional integration of both flexion-extension and pronation-supination (forearm rotation)

within a compact, robust assembly. This lack of integration restricts the robot's ability to perform nuanced manipulation tasks that are essential in dynamic industrial settings. Additionally, existing designs frequently expose sensitive components—such as actuators, sensors, and wiring—to environmental hazards or mechanical impact, leading to decreased reliability, higher maintenance demands, and reduced uptime. Safety also remains a major concern in collaborative environments, where humanoid robots operate near human workers. The absence of effective energy-dissipation mechanisms and joint motion-limiting systems can elevate the risk of injury upon accidental contact.

These shortcomings highlight the need for an improved robotic elbow assembly that more closely mimics the biomechanics of the human arm, while delivering enhanced durability, motion control, environmental protection, and safety. Addressing these limitations is essential for enabling humanoid robots to perform a wider range of industrial tasks-particularly those requiring dexterity, strength, and resilience-thereby contributing to the alleviation of labor shortages in key economic sectors.

SUMMARY OF THE INVENTION

The presently disclosed subject matter is directed to a humanoid robot comprising a torso and at least one arm assembly operably connected to the torso. The arm assembly includes an upper arm twist actuator assembly, a lower humerus, an upper forearm, and an elbow actuator. The lower humerus has a lower humerus extender operably coupled to the upper arm twist actuator assembly, and an elbow actuator mating assembly integrally formed with an extent of the lower humerus extender. An extent of the elbow actuator mating assembly has a curvilinear external surface. The upper forearm has an upper forearm coupling assembly that includes a U-shaped external surface residing within a first plane, and an upper forearm extender integrally formed with an extent of the upper forearm coupling assembly and that includes a U-shaped external surface residing within a second plane that is oriented perpendicular to the first plane. The elbow actuator has a first extent received within a portion of the elbow actuator mating assembly and a second extent received within a portion of the upper forearm coupling assembly, wherein said elbow actuator mating assembly and upper forearm coupling assembly collectively surround a majority of said elbow actuator.

The presently disclosed subject matter is also directed to a humanoid robot comprising a torso and at least one arm assembly operably connected to the torso. The arm assembly includes an upper arm twist actuator assembly, a lower humerus, an upper forearm, and an elbow actuator. The lower humerus has a lower humerus extender operably coupled to the upper arm twist actuator assembly, and an actuator receiving assembly integrally formed with an extent of the lower humerus extender. An extent of the actuator receiving assembly has a curvilinear external surface. The upper forearm has an upper forearm coupling assembly having a cover opening formed through an extent of said upper forearm coupling assembly, and an upper forearm extender integrally formed with an extent of the upper forearm coupling assembly. An extent of the upper forearm extender has a curvilinear external surface. The elbow actuator has an output that is coupled to the upper forearm coupling assembly by a coupling means accessible through the cover opening, and wherein a majority of said elbow actuator is received within an extent of the actuator receiving assembly.

The presently disclosed subject matter is further directed to a humanoid robot comprising a torso and an arm assembly coupled to the torso. The arm assembly includes an upper humerus, a lower humerus coupled to the upper humerus, an upper forearm, an elbow actuator coupling the lower humerus to the upper forearm, and an elbow rotation limiting system. The elbow actuator is configured to rotate the upper forearm relative to the lower humerus about an elbow rotation axis. The elbow rotation limiting system comprises a first deformable member coupled to the lower humerus, a second deformable member coupled to the upper forearm, and an energy attenuation member coupled to the lower humerus and configured to contact the upper forearm when the elbow actuator rotates the upper forearm towards the lower humerus.

The presently disclosed subject matter is additionally directed to a method of assembling an arm for a humanoid robot. The method comprises coupling an upper humerus to a torso of the humanoid robot, coupling a lower humerus to the upper humerus, positioning an elbow actuator between the lower humerus and an upper forearm, coupling the elbow actuator to the lower humerus and the upper forearm, coupling a first deformable member to the lower humerus, coupling a second deformable member to the upper forearm, and coupling an energy attenuation member to the lower humerus. The elbow actuator is configured to rotate the upper forearm relative to the lower humerus about an elbow rotation axis. The energy attenuation member is configured to contact the upper forearm when the elbow actuator rotates the upper forearm towards the lower humerus.

The presently disclosed subject matter is also directed to an arm assembly for a humanoid robot. The arm assembly comprises an upper humerus configured to couple to a torso of the humanoid robot, a lower humerus coupled to the upper humerus, an upper forearm, an elbow actuator coupling the lower humerus to the upper forearm, a first deformable member coupled to the lower humerus, a second deformable member coupled to the upper forearm, and an energy attenuation member coupled to the lower humerus and configured to contact the upper forearm when the elbow actuator rotates the upper forearm towards the lower humerus. The elbow actuator comprises a rotary actuator having a strain wave gearbox and a brushless DC motor, and is configured to rotate the upper forearm relative to the lower humerus about an elbow rotation axis.

The presently disclosed subject matter is further directed to a humanoid robot arm comprising an upper humerus, a lower humerus coupled to the upper humerus, an upper forearm, an elbow actuator coupling the lower humerus to the upper forearm, a lower forearm coupled to the upper forearm, a wrist coupled to the lower forearm, and an elbow rotation limiting system. The elbow actuator is configured to rotate the upper forearm relative to the lower humerus about an elbow rotation axis. The elbow rotation limiting system comprises a first deformable member coupled to the lower humerus, a second deformable member coupled to the upper forearm, and an energy attenuation member coupled to the lower humerus and configured to contact the upper forearm when the elbow actuator rotates the upper forearm towards the lower humerus. The energy attenuation member comprises a material having a lower density than a material of the first and second deformable members.

The presently disclosed subject matter is additionally directed to a method of operating an arm of a humanoid robot. The method comprises actuating an elbow actuator to rotate an upper forearm relative to a lower humerus about an elbow rotation axis, contacting an energy attenuation member coupled to the lower humerus with the upper forearm as the upper forearm rotates towards the lower humerus, compressing the energy attenuation member between the lower humerus and the upper forearm, limiting further rotation of the upper forearm towards the lower humerus based on the compression of the energy attenuation member, actuating the elbow actuator to rotate the upper forearm away from the lower humerus, and contacting a first deformable member coupled to the lower humerus with a second deformable member coupled to the upper forearm as the upper forearm rotates away from the lower humerus.

The presently disclosed subject matter is also directed to an elbow assembly for a humanoid robot arm. The elbow assembly comprises a lower humerus housing, an upper forearm housing, an elbow actuator coupling the lower humerus housing to the upper forearm housing, a first deformable member coupled to an exterior surface of the lower humerus housing, a second deformable member coupled to an exterior surface of the upper forearm housing, and an energy attenuation member coupled to an interior surface of the lower humerus housing and configured to contact the upper forearm housing when the elbow actuator rotates the upper forearm housing towards the lower humerus housing. The elbow actuator is configured to rotate the upper forearm housing relative to the lower humerus housing about an elbow rotation axis.

The presently disclosed subject matter is further directed to a humanoid robot comprising a torso and an arm assembly coupled to the torso. The arm assembly includes an upper humerus, a lower humerus coupled to the upper humerus, an upper forearm, an elbow actuator coupling the lower humerus to the upper forearm, and a wiring system. The elbow actuator is configured to rotate the upper forearm relative to the lower humerus about an elbow rotation axis. The wiring system comprises a first wire bundle extending from the upper humerus to an input of the elbow actuator, a second wire bundle extending through a central bore of the elbow actuator, and a third wire bundle extending from an output of the elbow actuator to the upper forearm.

The presently disclosed subject matter is additionally directed to a method of wiring an arm assembly for a humanoid robot. The method comprises routing a first wire bundle from an upper humerus to an input of an elbow actuator, routing a second wire bundle through a central bore of the elbow actuator, routing a third wire bundle from an output of the elbow actuator to an upper forearm, coupling a first connector of the first wire bundle to an input printed circuit board of the elbow actuator, coupling a second connector of the second wire bundle to the input printed circuit board of the elbow actuator, coupling a third connector of the second wire bundle to an output printed circuit board of the elbow actuator, and coupling a fourth connector of the third wire bundle to the output printed circuit board of the elbow actuator.

The presently disclosed subject matter is also directed to an arm assembly for a humanoid robot. The arm assembly comprises an upper humerus configured to couple to a torso of the humanoid robot, a lower humerus coupled to the upper humerus, an upper forearm, an elbow actuator coupling the lower humerus to the upper forearm, and a wiring system. The elbow actuator is configured to rotate the upper forearm relative to the lower humerus about an elbow rotation axis. The wiring system comprises a first wire bundle extending from the upper humerus to an input of the elbow actuator, a second wire bundle extending through a central bore of the elbow actuator, and a third wire bundle extending from an output of the elbow actuator to the upper forearm, wherein the second wire bundle comprises a helical configuration within the central bore of the elbow actuator.

The presently disclosed subject matter is further directed to a humanoid robot arm comprising an upper humerus, a lower humerus coupled to the upper humerus, an upper forearm, an elbow actuator coupling the lower humerus to the upper forearm, a lower forearm coupled to the upper forearm, a wrist coupled to the lower forearm, and an illumination assembly. The elbow actuator is configured to rotate the upper forearm relative to the lower humerus about an elbow rotation axis. The illumination assembly comprises at least one light emitting assembly coupled to at least one of the lower humerus or the upper forearm adjacent to the elbow actuator, wherein the at least one light emitting assembly is configured to indicate an operational state of the humanoid robot arm.

The presently disclosed subject matter is additionally directed to a method of indicating an operational state of a humanoid robot arm. The method comprises detecting an operational state of an elbow actuator coupling a lower humerus to an upper forearm of the humanoid robot arm, selecting a light output based on the detected operational state, and activating at least one light emitting assembly coupled to at least one of the lower humerus or the upper forearm adjacent to the elbow actuator to produce the selected light output.

The presently disclosed subject matter is also directed to an elbow assembly for a humanoid robot arm. The elbow assembly comprises a lower humerus housing, an upper forearm housing, an elbow actuator coupling the lower humerus housing to the upper forearm housing, and at least one light emitting assembly coupled to at least one of the lower humerus housing or the upper forearm housing adjacent to the elbow actuator. The elbow actuator is configured to rotate the upper forearm housing relative to the lower humerus housing about an elbow rotation axis. The at least one light emitting assembly is configured to indicate an operational state of the elbow assembly.

The presently disclosed subject matter is further directed to a humanoid robot comprising a torso and an arm assembly coupled to the torso. The arm assembly includes an upper humerus, a lower humerus coupled to the upper humerus, an upper forearm, an elbow actuator coupling the lower humerus to the upper forearm, and a rotation limiting system. The elbow actuator is configured to rotate the upper forearm relative to the lower humerus about an elbow rotation axis. The rotation limiting system comprises a limiting projection extending from an output adapter of the elbow actuator, and a limiting adapter coupled to the upper forearm and comprising a groove configured to receive the limiting projection, wherein the groove comprises a maximum wall and a minimum wall configured to limit rotation of the upper forearm relative to the lower humerus.

The presently disclosed subject matter is additionally directed to a method of limiting rotation of an arm assembly for a humanoid robot. The method comprises coupling a limiting adapter to an upper forearm of the arm assembly, wherein the limiting adapter comprises a groove having a maximum wall and a minimum wall, coupling an output adapter of an elbow actuator to a lower humerus of the arm assembly, wherein the output adapter comprises a limiting projection configured to be received within the groove of the limiting adapter, actuating the elbow actuator to rotate the upper forearm relative to the lower humerus about an elbow rotation axis, and contacting the limiting projection with one of the maximum wall or the minimum wall of the groove to limit rotation of the upper forearm relative to the lower humerus.

In some embodiments, the humanoid robot arm assembly comprises a rotation limiting system including a first deformable member coupled to an exterior surface of the lower humerus and a second deformable member coupled to an exterior surface of the upper forearm, wherein the first and second deformable members are configured to contact each other when the elbow actuator rotates the upper forearm away from the lower humerus into a hyperextended position, thereby providing a supplemental rotation limit beyond the maximum wall of a mechanical groove. Each deformable member may comprise a plastic material characterized by a first density and a first compression/deflection ratio, and may be used in conjunction with an energy attenuation member comprising a urethane material having a second density and compression/deflection ratio. The density and compression/deflection ratio of the energy attenuation member being less than those of the deformable members to facilitate progressive energy dissipation during hyperextension. The elbow actuator may comprise a rotary actuator including a strain wave gearbox and a brushless DC motor, configured to provide at least 140 degrees of rotational range between flexed and hyperextended positions.

In some embodiments, the actuator includes an input printed circuit board (PCB) assembly coupled to a first wire bundle, an output PCB assembly coupled to a third wire bundle, and a second wire bundle extending through a central bore of the rotary actuator to provide electrical continuity between the input and output assemblies. Each of the first, second, and third wire bundles includes multiple conductive strands and an integrated twist when the actuator is in a neutral position. The wiring system may further include a fourth wire bundle routed from the upper humerus to an input of an upper arm twist actuator, a fifth wire bundle routed through the actuator's central bore, and a sixth wire bundle routed from an output of the upper arm twist actuator to the lower humerus. Connectors on each bundle interface with corresponding input and output PCBs to enable signal transmission. The upper and lower arm twist actuators are respectively coupled to the upper humerus and upper forearm and are configured to rotate the lower humerus and lower forearm about a shared arm twist axis. Additionally, the arm assembly may include at least one light emitting assembly, such as a first light emitting assembly on the lower humerus and a second light emitting assembly on the upper forearm. Each light emitting assembly comprises a housing with five primary walls-two angled end walls, a top wall, an angled bottom wall, and an angled interior wall-configured to direct light through an integrated diffuser to control scattering. These light emitting assemblies are operable to display distinct colors corresponding to operational states selected from the group consisting of: working, idle, charging, error, and thinking. The assemblies may be configured to illuminate with either matching or differing colors to indicate status, thereby enhancing both visual communication and system diagnostics.

BRIEF DESCRIPTION OF THE DRAWINGS

The drawing figures depict one or more implementations in accordance with the present teachings by way of example only, not by way of limitation. In the figures, like reference numerals refer to the same or similar elements.

DETAILED DESCRIPTION

Figure 1A:
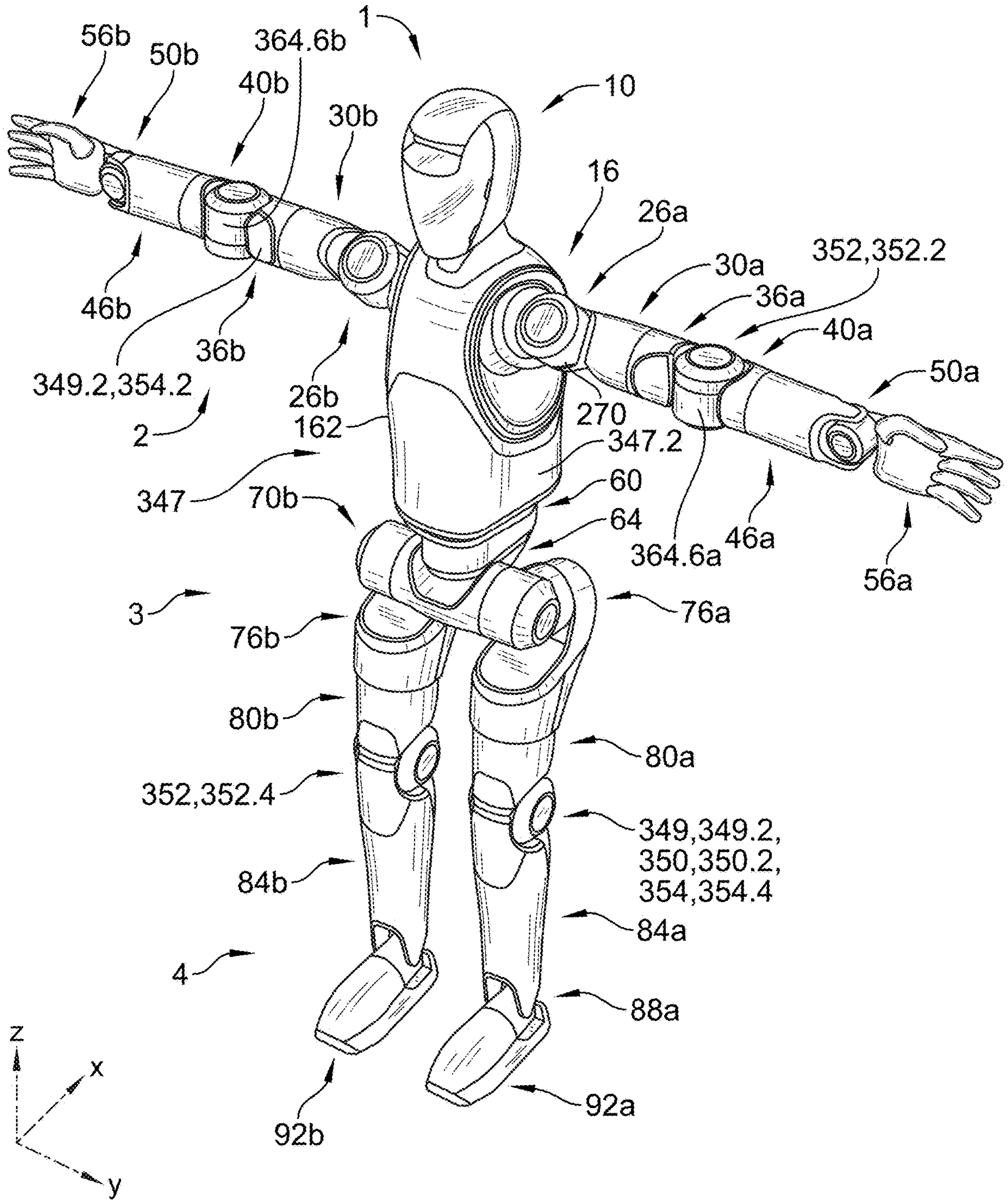
FIGS. 1A-1B are perspective views of a robot, which is comprised of at least: (i) a head, (ii) a torso, (iii) left and right arms, each of which includes a shoulder, an upper humerus, a lower humerus, an upper forearm, a lower forearm, and a wrist, wherein an elbow actuator couples the lower humerus and the upper forearm, (iv) hands, (v) left and right legs, each of which includes a hip, an upper thigh, a lower thigh, a shin, and a talus, wherein a knee actuator couples the lower thigh and shin, and (vi) left and right feet, where various actuators are contained within the housings of the components.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will be described herein in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the methods may be performed in a different order. Accordingly, the drawings, flow charts and detailed description are to be regarded as illustrative in nature, not restrictive or limiting.

A. Introduction

General-purpose humanoid robots can emulate human form and functionality with two legs, two arms, and a head. Enabling such a robot system to execute human tasks poses countless challenges due to the vast array of potential positions, locations, and states said robots could occupy at any given time in a challenging operating environment. In particular, the disclosed elbow assembly is designed to be a component within a robot system, potentially a versatile humanoid robot. Specifically, the arms of the disclosed robot are configured to move in a manner to substantially mimic the movements of a human and to position the hands of the robot. The upper arm assembly and the lower arm assembly are coupled at the elbow actuator, which cooperates with the other actuators contained in the arm to position the hand at the distal end of the arm to enable the robot to perform dexterous tasks.

The preferred arrangement of components of the elbow assembly includes an elbow actuator positioned within an extent of the lower humerus and an extent of upper forearm. By positioning said elbow actuator within the lower humerus and the upper forearm, the housings associated with the lower humerus and upper forearm can protect and house said actuator. In other words, the elbow actuator lacks a separate housing. This configuration is beneficial over conventional robots that lack this feature because it reduces space and weight. Additionally, the configuration of the actuators allows for wires to be internally routed through the housings and then through the center through bore opening of the actuator. This internal routing is beneficial because it reduces external wiring, ensures that a single wire does not transverse multiple degrees of freedom, and reduces wire pinch points; thereby increasing the durability of the elbow and robot.

Unlike conventional robot elbows, the disclosed elbow includes: (i) the lower forearm that is directly coupled to a single side of the arm, and specifically the output of the elbow actuator, (ii) the lower humerus and upper forearm that have substantially round cross-sections in at least one location, (iii) an upper forearm diameter that is slightly less than a lower humerus diameter, which enables the arm to have a slightly tapered look, (iv) a rotational axis that is offset forward from the rotational axis of the upper humerus and the lower forearm, and (v) a two substantially flat surfaces at the elbow actuator that are positioned a distance away from one another, and wherein the distance between said flat surfaces is slightly greater than a diameter of upper forearm. Overall, each of these features of the disclosed elbow provides substantial benefits (e.g., human form factor, range of motion, durability, manufacturability, replicability, modularity) over conventional robot elbows.

The robot arm, including the elbow, includes various keying features or projections/receivers to help ensure proper assembly and provide manufacturing efficiencies. For example, the lower humerus includes a keying feature designed to interact with and receive an extent of the arm twist actuator housed in the upper humerus. Said features provide substantial benefits (e.g., proper and rapid assembly) over conventional robotic arms that lack these features.

Additionally, the disclosed elbow includes a range of motion greater than 80 degrees, preferably greater than 120 degrees, and most preferably between 140 degrees and 160 degrees. The elbow actuator includes a rotary actuator designed to allow the robot to move the plane or change the pitch of the lower arm and hand of the robot. In particular, the elbow actuator is designed to move the robot's arm from an initial position to a flexion position (e.g., bent or flexed), where the upper forearm is moved forward from normal and is closest to the lower humerus, to a hyperextended position, where the lower arm is moved rearward from normal. This range of motion allows said arm assembly to be placed in flexion between 1-140 degrees and hyperflexion between 1 and 20 degrees.

Moreover, the arm assembly (including the upper humerus, lower humerus, upper forearm, and lower forearm) lacks a linear actuator(s), hydraulic, cable-based, or pneumatic actuator(s). Instead, the arm assembly only includes rotary actuators, such as actuators having strain wave gearboxes with brushless DC motors. This design not only reduces components contained in the elbow, provides for greater control over the elbow, simplifies the design of the elbow and its adjoining structures, reduces torques, stresses, and strain that are placed on other structures contained in the robot's arm due to the lack of linkages, but also simplifies manufacturing and assembly of said robot. Each of these benefits provides a substantial advantage to the disclosed robot over conventional robots.

The disclosed elbow includes an elbow rotation limiting system including deformable members and an energy attenuation member that are made from an energy absorbing material(s) (e.g., TPU) and are designed to: (i) help ensure that the actuator and/or the arm portion does not over-rotate in either direction, (ii) reduce pinch points associated with the elbow, and (iii) allow the robot to have a more human-like appearance. A front or internal soft stop assembly includes an energy attenuation member positioned in a front or internal region of the arm that is adjacent to the elbow. In particular, said front or internal region may be located in the lower humerus. Support for the front or internal deformable member may be provided by a reinforced panel designed to be coupled to the lower humerus frame. The elbow protective assembly includes rear or external deformable members positioned in a rear or external region of the arm that is adjacent to the elbow. In particular, said rear or external region may be located in an extent of the lower humerus and an extent of the upper forearm. Support for the rear or external deformable members may be provided by end stop mounts integrally formed within the extents of the lower humerus and the upper forearm.

The disclosed frontal energy attenuation member and rear deformable members can be sacrificial parts that can be replaced. The rear deformable members may be made from plastic and can have a first density and a first compression/deflection ratio, while the front energy attenuation member may include urethane and can have a second density and a second compression/deflection ratio. The disclosed second density and second compression/deflection ratio may be less, and in certain situations, substantially less (e.g., more than 50%), than the first density and first compression/deflection ratio. The frontal energy attenuation member and rear deformable members provide a substantial advantage over conventional robot arms that lack these features.

B. Robot

Figure 1B:
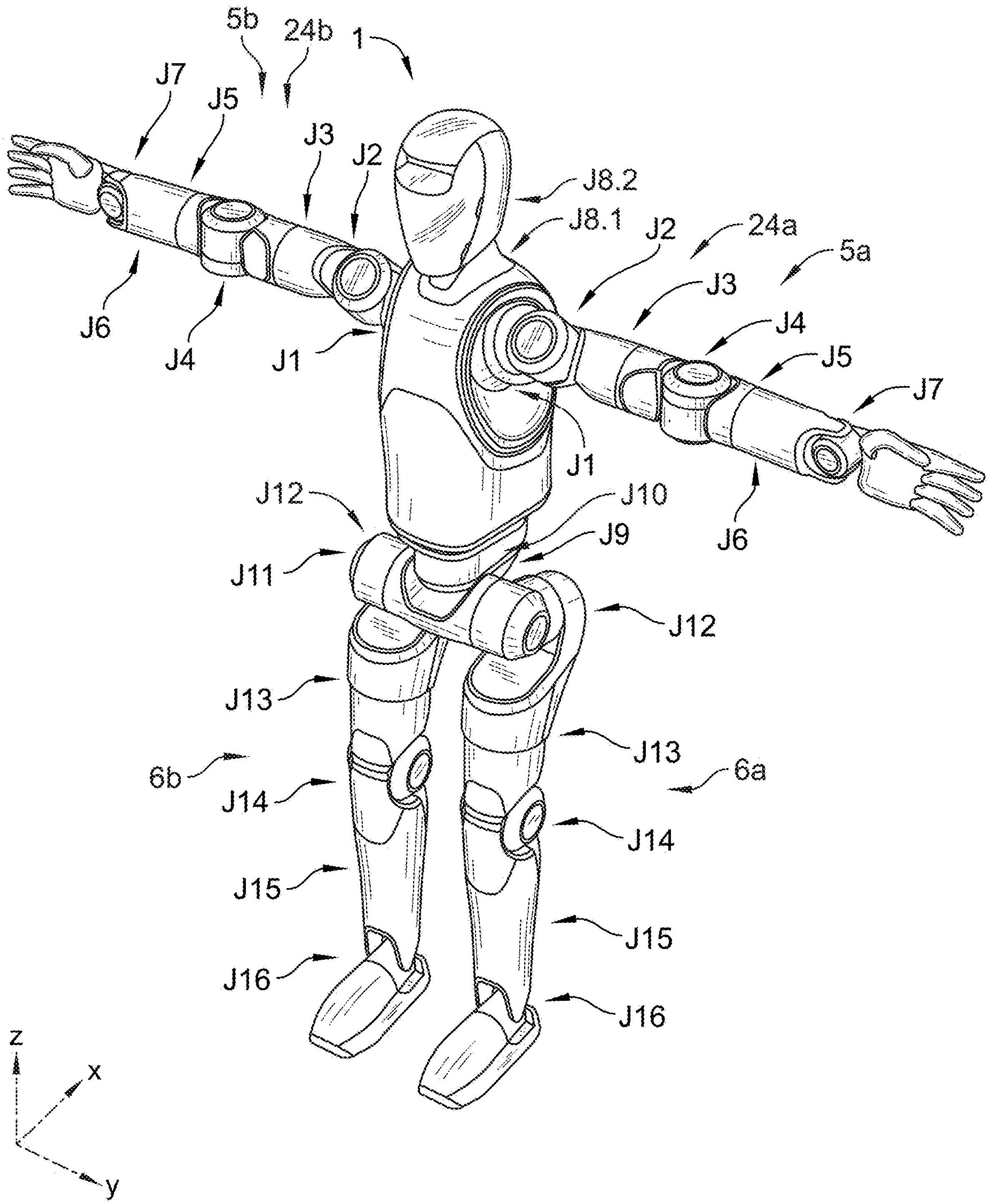

Referring to FIGS. 1A-1B, a humanoid robot 1 may include the following systems, assemblies, components and/or parts: (i) an upper region 2 including a head/neck 10, torso 16, left and right arms 5, and left and right hands 56; (ii) a central region 3 including a spine 60, a pelvis 64, left and right upper leg assemblies, each upper leg including a hip 70, an upper thigh 76, a lower thigh 80; and (iii) a lower region 4 including left and right lower leg assemblies, each lower leg including a shin 84 and a talus 88, and feet 92. Each arm 5 includes a shoulder 26, an upper humerus 30, a lower humerus 36, an upper forearm 40, a lower forearm 46, and a wrist 50. Each leg 6 includes a hip 70, an upper thigh 76, a lower thigh 80, a shin 84 and a talus 88.

Figure 2:
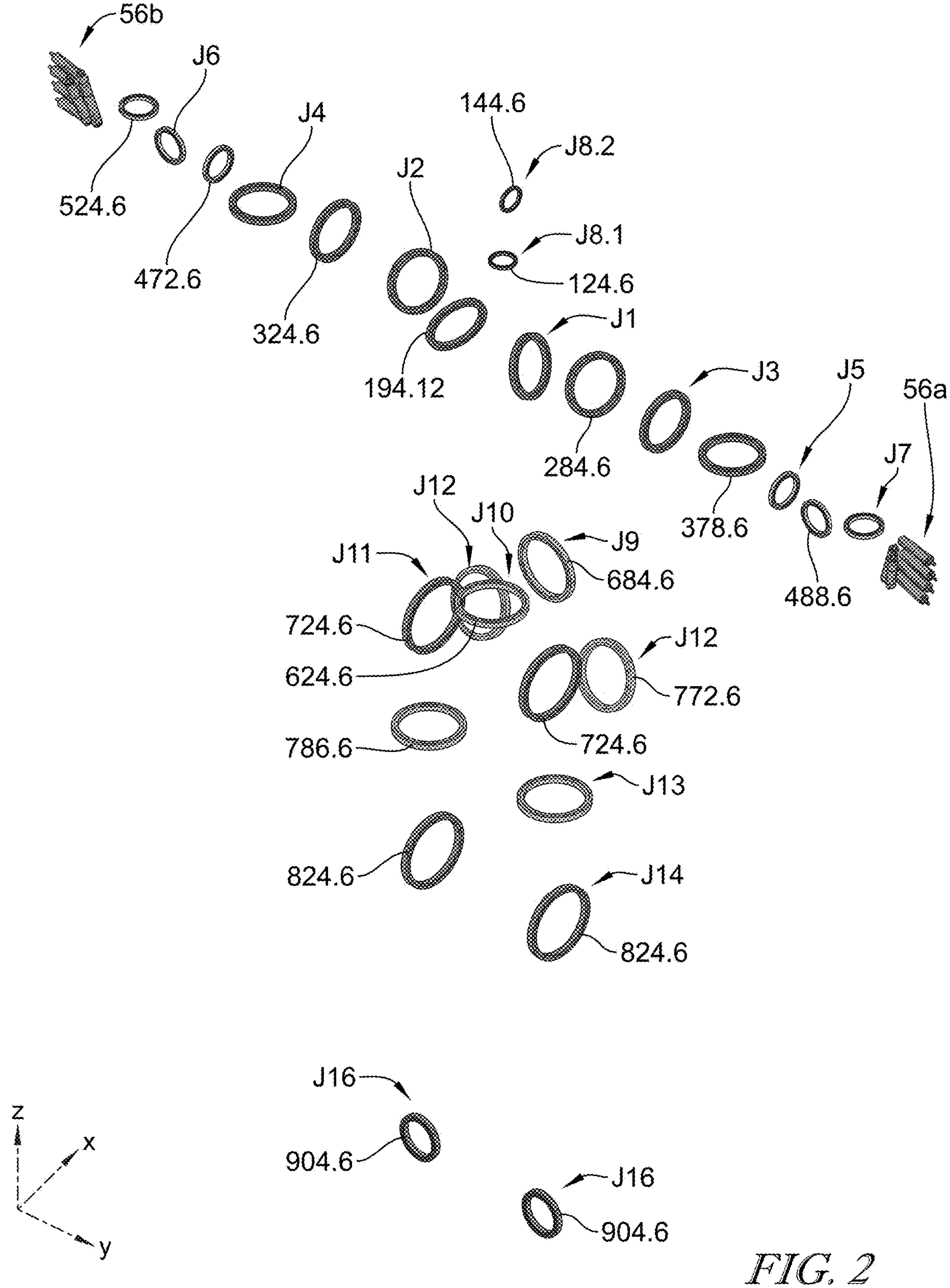
FIG. 2 is a perspective view of an extent of various actuators contained in robot of FIG. 1A, wherein said extent is an actuator bearing that is contained within various actuators.

The robot 1 includes various actuators arranged within the robot 1 to closely replicate human movements and capabilities. A plurality of actuators are arranged within and coupled to various housings of the robot 1 and individually configured to move one or more parts of the robot 1. In the illustrative embodiment, positions of various actuators are indicated in FIG. 2, showing the individual actuator bearings contained within various rotary actuators (J1-J14, J16) and suggesting corresponding rotational axes that are centered within and orthogonal to a plane intersecting the individual actuator bearings. For example, the actuator bearings in the illustrative embodiment may be cross-roller bearings. The individual actuator names, actuator bearings, and axes are further detailed in Table 1 below. It should be understood that in other embodiments, some of these systems, assemblies, components and/or parts may be omitted, combined, or replaced with alternative systems, assemblies, components and/or parts.

The robot 1 includes various actuators arranged within the robot 1 to closely replicate human movements and capabilities. In the illustrative embodiment, the left and right arms 5 extend from the torso 16 of the robot 1. The actuators in the upper arm assembly 24 include: (i) a shoulder actuator (J2) 280 configured to move the arm relative to the robot's torso 16, (ii) a upper arm twist actuator (J3) 320 configured to rotate the arm 5 relative to the robot's torso 16, and (iv) an elbow actuator (J4) 374 configured to bend the elbow or arm of the robot 1. The lower arm includes a lower arm twist actuator (J5) 468, a wrist pitch actuator (J6) 484, and a wrist pivot actuator (J7) 520. The arm actuator (J1) 190 contained in the torso 16 and the actuators (J2-J7) contained in the arm assembly cooperate to position the hand 56 coupled to the wrist 50.

The housing needs for the assemblies of various components of robot 1 can vary in shape and form based on individual structural and/or material requirements for the specific components (e.g., torso, shoulder, head, etc.). Although it may be desirable to utilize a particular material for all the housings to have a consistent exterior appearance for the robot, fabrication may be complicated by the varying structural or operational needs at different robot positions. It may not be necessary to utilize the same materials in different component housings that have different load requirements. Various materials may be preferred for a specific component housing based on strength, toughness, elasticity, yield point, strain energy, resilience, elongation during load, weight, conductivity, etc. Similarly, the complexity of some housing designs may be better suited for one type of manufacture over another. Various fabrication methods of the housing components can include machining, die casting, injection molding, compression molding, composite fabrication, etc. For example, some housings may be cast metal instead of machined metal to achieve the desired cost, form, speed of manufacturing, and mechanical properties.

To hide the fact that different fabrication methods may be used, different materials may be used, the finishes caused by the fabrication methods, or the finishes of the materials, it may be advantageous to obscure the exterior of housings using an exterior covering system 347. Said exterior covering system 347 may provide additional benefits as it can be easily replaced if damaged, protects internal components from dust and debris, conforms to the robot's form without excessive wrinkling, is generally inexpensive, and accommodates ventilation and thermal regulation needs. Further, exterior covering system 347 may not impede the robot's 1 range of motion, maintain access to underlying components, and allow for access and/or operation of indicators or other functional elements (e.g., buttons, levers, etc.) on the robot's exterior surface. The exterior covering system 347 may include attachment mechanisms for secure, detachable mounting at multiple locations, such as the collar, waist, sleeves, ankles, etc. Multi-point attachment ensures a snug fit, reducing the risk of interference between the robot 1 and factory equipment. In some instances, the cover members 347.2 of the exterior covering system 347 can attach directly to the surface of specific components or their portions. The exterior covering system 347 are constructed from highly durable textiles with high stretch capabilities and resistance to pilling, abrasions, and cuts.

The disclosed exterior covering system 347 for the humanoid robot 1 is form-fitting, meaning it is neither loose nor detached by more than a small margin (e.g., between 1 inch and 5 inches, preferably 3 inches) from the robot's exterior surface or the outer surface of the energy attenuation assembly without becoming disconnected. In other words, rather than draping loosely over the robot's frame, the exterior covering system is precisely and securely fitted to specific regions. The exterior covering material exhibits an elongation or stretch percentage exceeding 10% (preferably more than 30%, and most preferably greater than 50%), ensuring that when affixed to the robot 1, it remains under tension to conform closely to the robot's structure. Furthermore, a single cover member 347.2 does not cover or surround all actuators within the robot 1, a majority of the actuators contained in an upper portion of the robot 1, nor does it typically enclose more than three actuators at a time. In other words, the single cover members 347.2 does not resemble an oversized jumpsuit with a single zipper extending from the pelvis to the head region. Additionally, it does not feature a hood that covers a substantial portion of the robot's head. Instead, the exterior covering system 347 may be designed to include textile inserts positioned strategically between moving joint components to further ensure that pivoting motion is not restricted at the robot's joints. Different textile patterns are incorporated to facilitate movement in specific regions, enhancing the robot's functional dexterity.

The humanoid robot 1 may also integrate an energy attenuation assembly 349 comprising multiple energy attenuation members 349.2. These members 349.2 may be positioned beneath the exterior coverings and in contact with certain housings, contributing to impact absorption and structural integrity. The inclusion of energy attenuation members 349.2 is beneficial for protecting the robot 1 during operation and interaction with its environment. These members 349.2 may be strategically placed adjacent to particular housings or specific portions thereof to provide additional support and protection to underlying components. The energy attenuation members 349.2 are composed of non-rigid, deformable, compressible, or energy-absorbing materials. For example, component housings may include coupling features designed to accommodate energy attenuation members 349.2, particularly in interference zones where excessive rotation could result in a component collision. The energy attenuation members 349.2 can be designed as detachable and replaceable elements. Depending on the embodiment, they may be coupled directly to the housing, surround the housing, or be secured via the cover members 347.2. These features allow for modularity, enabling the replacement or removal of energy attenuation members 349.2 as needed.

A portion of the energy attenuation assembly 349 may be included in a rotation limiting system 350 configured to prevent damage due to over rotation of certain actuators. The rotation limiting system 350 includes external replaceable members 350.2 that are coupled to various housings to prevent possible damage due to over rotation of certain actuators. For example, the rotation limiting system 350 includes deformable members 350.2 that are made from an energy absorbing material (e.g., TPU) and are designed to: (i) help ensure that the actuator and/or the leg portion does not over-rotate in either direction, (ii) reduce pinch points associated with the knee, and (iii) allow the robot to have a more human-like appearance. The rotation limiting system 350 includes a protective assembly 352 and a soft stop assembly 354. The protective assembly 352 includes an elbow protective assembly 352.2 and a knee protective assembly 352.4. The soft stop assembly 354 includes an elbow soft stop assembly 354.2 and a knee soft stop assembly 354.4. In various embodiments, the actuators may also include internal limiting features (e.g., hard-stop or range of motion limiters).

Shown in at least FIGS. 1B-4, the actuators contained within the physical robot 1 include actuators (J1-J16) housed within components of the robot 1 to actuate movement of the components of said robot 1. The actuators contained in the robot 1 are configured to provide a range of motion. FIG. 2 shows the arrangement of actuator bearings of the individual actuators with the other structure of the robot and associated actuators have been removed. Therefore, each rotational axis of respective individual actuators is centered within each actuator bearing and extends in a direction perpendicular to a bearing plane intersecting a mid-width of the actuator bearing.

Below is a summary table showing the actuator reference names and numbers, actuator names, and associated components from high level configuration of the robot 1. In particular, the actuator bearing of individual actuators may help define the motion of the component or structure attached to the output driven by the individual actuators.

TABLE 1

| Actuator | Actuator Name | Actuator Axis | Actuator Bearing Plane B, and (Actuator Bearings) |
|---|---|---|---|
| J1 (190) | Arm Actuator | Arm Axis, $A_1$ | $B_1$ (194.12) |
| J2 (280) | Shoulder Actuator | Shoulder Axis, $A_2$ | $B_2$ (284.6) |
| J3 (320) | Upper Arm Twist, Upper Arm X, or Upper Arm Roll Actuator | Upper Arm Twist, Upper Arm X, or Upper Arm Roll Axis, $A_3$ | $B_3$ (324.6) |
| J4 (374) | Elbow, Arm Z, Arm Yaw, or Lower Humerus Actuator | Elbow, Arm Z, Arm Yaw, or Lower Humerus Axis, $A_4$ | $B_4$ (378.6) |
| J5 (468) | Lower Arm Twist, Lower Arm X, or Lower Arm Roll Actuator | Lower Arm Twist, Lower Arm X, or Lower Arm Roll Axis, $A_5$ | $B_5$ (472.6) |
| J6 (484) | Wrist Flex, Wrist/Hand Y, Wrist/Hand Pitch, or Flick Actuator | Wrist Flex, Wrist/Hand Y, Wrist/Hand Pitch, or Flick Axis, $A_6$ | $B_6$ (488.6) |
| J7 (520) | Wrist Pivot, Wrist/Hand Z, Wrist/Hand Yaw, or Wave Actuator | Wrist Pivot, Wrist/Hand Z, Wrist/Hand Yaw, or Wave Axis, $A_7$ | $B_7$ (524.6) |
| J8.1 (120) | Head Twist, Head No, or First Head Actuator | Head Twist, Head No, or First Head Axis, $A_{8.1}$ | $B_{8.1}$ (124.6) |
| J8.2 (140) | Head Nod, Head Yes, or Second Head Actuator | Head Nod, Head Yes, or Second Head Axis, $A_{8.2}$ | $B_{8.2}$ (144.6) |
| J9 (680) | Torso Lean, Spine X, Torso/Spine Roll, or First Spine Actuator | Torso Lean Actuator, Spine X, Torso/Spine Roll, or First Spine Axis, $A_9$ | $B_9$ (684.6) |
| J10 (620) | Torso Twist, Spine Z, Torso/Spine Yaw, or Second Spine Actuator | Torso Twist, Spine Z, Torso/Spine Yaw, or Second Spine Axis, $A_{10}$ | $B_{10}$ (624.6) |
| J11 (720) | Hip Flex, Hip Y, Hip/Leg Pitch, Forward Kick, or First Hip Actuator | Hip Flex, Hip Y, Hip/Leg Pitch, Forward Kick, or First Hip Axis, $A_{11}$ | $B_{11}$ (724.6) |
| J12 (768) | Hip Pivot, Hip X, Hip/Leg Roll, Sideways Kick, or Second Hip Actuator | Hip Pivot, Hip X, Hip/Leg Roll, Sideways Kick, or Second Hip Axis, $A_{12}$ | $B_{12}$ (772.6) |
| J13 (782) | Leg Twist, Hip Z, or Hip/Leg Yaw Actuator | Leg Twist, Hip Z, or Hip/Leg Yaw Axis, $A_{13}$ | $B_{13}$ (786.6) |
| J14 (820) | Knee, Lower Thigh, Lower Leg Y, Lower Leg Pitch, or Rear Kick Actuator | Knee, Lower Thigh, Lower Leg Y, Lower Leg Pitch, or Rear Kick Axis, $A_{14}$ | $B_{14}$ (824.6) |
| J15 (860) | Foot Flex, Foot Y, Foot Pitch, or First Ankle Actuator | Foot Flex, Foot Y, Foot Pitch, or First Ankle Axis, $A_{15}$ | N/A |
| J16 (900) | Talus, Foot Roll, Foot X or Second Ankle Actuator | Talus, Foot Roll, Foot X or Second Ankle Axis, $A_{16}$ | $B_{16}$ (904.6) |

C. Arm Assembly

In the illustrative embodiment of FIG. 1A, the left and right arms extend from the left and right sides of the torso 16 to the hand 56. Each arm includes: (i) an upper humerus 30, (ii) a lower humerus 36, (iii) an upper forearm 40, (iv) a lower forearm 46, and (v) a wrist 50. At least FIGS. 4, 5, and 9-15 show a portion of the arm 5 or the elbow assembly, which includes the lower humerus 36 and upper forearm 40, and the elbow actuator (J4) 374 coupling the lower humerus 36 to the upper forearm 40. The left and right arm assemblies are coupled to respective left and right arm actuators (J1) 190 housed in the torso 16, where the arm actuators (J1) 190 further increase the range of motion of the arms. The above extents and assemblies are one way of subdividing the arm, and it should be understood that other subdivisions of the arm and its associated parts are contemplated in this disclosure.

a. Actuator Arrangement

Figure 3:
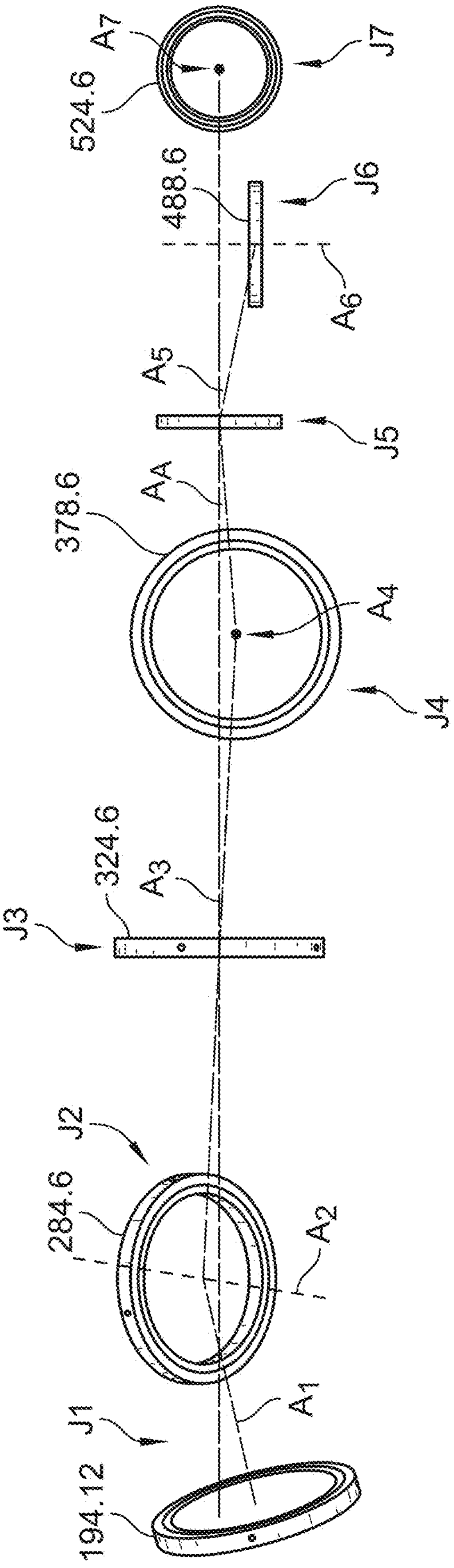
FIG. 3 is a top view of the arrangement of actuator bearings contained within the left arm of the robot and shown in FIG. 2.

A plurality actuators are arranged within and coupled to various housings of the robot 1 and configured to move one or more parts of the robot 1. For illustrative purposes, the arrangement of actuators within the robot 1 is indicated by the actuator bearings (e.g., cross-roller bearing) of the individual actuators, as shown in FIG. 2, where the other structure of the robot and associated actuators have been removed. In this figure, the robot 1 has both arms extended laterally at the sides of the robot 1, as shown in FIGS. 1A-1B. In FIG. 3, another view of the left torso and left arm of the robot 1 are shown. In the illustrative embodiment, the actuator bearings shown are a component of the rotary actuators contained within the robot 1, where the actuator bearings are centered about a rotational axis of the individual actuators. Therefore, each rotational axis of respective individual actuators extends in a direction perpendicular to a plane intersecting a mid-width of the actuator bearing.

The upper arm assembly 24 of the arm 5 includes the upper humerus 30, lower humerus 36, and upper forearm 40. The elbow assembly 39 includes the elbow actuator assembly (J4) 374 coupled to lower humerus 36 and the upper forearm 40. Generally, the elbow actuator (J4) 374 is configured to bend the forearm 40 with respect to the lower humerus 36 in a manner to substantially mimic the movements of a human. The relative position of the elbow with respect to the torso 16 of the robot 1 is dependent on the position of the upper arm assembly 24 controlled, at least in part, by the arm actuator assembly (J1) 190 housed in the torso 16, the shoulder actuator assembly (J2) 280, and the arm twist actuator (J3) 320.

In particular, FIG. 3 shows a top view of actuator bearings in an arrangement of actuators in the left upper torso 16 and left arm 5*a*. In this figure, the left arm 5*a* of the robot 1 is extended laterally at the side of the robot 1 and substantially parallel to the ground or support surface on which the robot 1 is standing. In this position, the arm assembly 5 extends from the arm actuator (J1) 190 housed in the torso 16, where the shoulder actuator (J2) 280 is coupled to the arm actuator (J1) 190. Together, the shoulder actuator (J2) 280 and the arm actuator (J1) 190 cooperate to position the arm extending therefrom. The axes $A_1$, $A_2$ of the shoulder actuator (J2) 280 and the arm actuator (J1) are not colinear nor perpendicular to the arm axis $A_A$ or any of the other actuator axes ($A_2$-$A_7$) of the arm assembly. The arm axis $A_A$ is colinear with the axis $A_3$ of the upper arm twist actuator (J3) 320 that resides substantially in the upper humerus 30 and the axis $A_5$ of the lower arm twist actuator (J5) 468 that resides substantially in the lower forearm 46. As shown, the axis $A_4$ of the elbow actuator (J4) 374 is perpendicular to and offset forward of the arm axis $A_A$. Although the actuator bearing of wrist flex actuator (J6) is offset from the arm axis $A_A$, the axes $A_6$, $A_7$ of wrist flex actuator (J6) and wrist pivot actuator (J7) are perpendicular to the arm axis $A_A$ and to each other, and also intersect the arm axis $A_A$. Although the left arm 5*a* is shown and discussed as an example, the right arm 5*b* has a substantially similar configuration of rotational axes $A_1$-$A_7$, in mirrored positions, such that the rotational axis $A_4$ of the right elbow actuator (J4) is positioned forward of the right arm axis $A_A$.

Movement of the shoulder 26 and upper arm assembly 24 are controlled, at least in part, by the left and right arm actuator assemblies 190*a*, 190*b* housed within the torso 16. The torso housing 162 is designed to protect the components contained within the torso 16, including the left and right arm actuator assemblies 190*a*, 190*b*, and provide stability to the upper portion of the robot 1. The left and right shoulders 26 are coupled to the arm actuator assembly (J1) 190 within the torso 16. This allows the arm actuator (J1) 190 to be able to twist the shoulder 26 about the axis of rotation $A_1$ of the arm actuator (J1) 190. The left and right upper arm assemblies 24 are coupled to the shoulders 26. In particular, the upper humerus 30 is coupled to the actuator assembly (J2) 280 of the shoulder 26. The upper arm twist assembly (J3) 320 is contained substantially within the upper humerus 30, with the output coupled to the lower humerus 36. The elbow actuator (J4) 374 is coupled between the lower humerus 36 and upper forearm 40. As shown in FIG. 1A, the full span of the arms is completed with the addition of a lower forearm 46 and wrist 50, and hand 56 to each side of the robot 1.

The arm actuator assembly (J1) 190 is angled relative to the transverse and sagittal planes. In particular, the rotational axis $A_1$ of the arm actuator assembly 190 is inclined relative to the transverse plane. This incline may be more than 1 degree, preferably more than 7 degrees, most preferably more than 12 degrees, but may be less than 45 degrees, preferably less than 30 degrees, most preferably less than 20 degrees. Additionally, the rotational axis $A_1$ of the arm actuator assembly (J1) 190 is angled relative to the sagittal plane. Said angle may be more than 1 degree, preferably more than 7 degrees, most preferably more than 12 degrees, but may be less than 45 degrees, preferably less than 30 degrees, most preferably less than 20 degrees. In other words, the shoulder is angled upward and rearward. Said angles and positional relationship of the arm actuator assembly 190 will be discussed in greater detail below in connection with the kinematics of said shoulder 26 and upper arm assembly 24.

As shown in at least FIGS. 1-3, the axis $A_2$ of the shoulder actuator assembly (J2) 280 is angled relative to the transverse plane. In particular, the output of the shoulder actuator 284 is tilted relative to the transverse plane. This tilt may be more than 10 degrees, preferably more than 25 degrees, most preferably more than 35 degrees, while it may be less than 90 degrees, preferably less than 75 degrees, most preferably less than 55 degrees. Additionally, the shoulder actuator (J2) 280 is rotated approximately 90 degrees, such that the rotational axis $A_2$ of the actuator is orientated along a substantially vertical plane instead of a substantially horizontal plane.

It should be noted that the arm actuators (J1-J7) may utilize a range and/or combination of advanced motor types, including brushless DC motors, stepper motors, servo motors, coreless DC motors, synchronous AC motors, asynchronous induction motors, linear motors, piezoelectric motors, direct-drive motors, switched reluctance motors, permanent magnet synchronous motors (PMSMs), axial flux motors, and hybrid stepper motors. These motors may employ rare-earth permanent magnets, such as neodymium-iron-boron (NdFeB) alloys, samarium-cobalt (SmCo) magnets, ferrite magnets, alnico magnets, flexible magnets, bonded rare-earth magnets, and high-temperature permanent magnets, to achieve high torque density and energy efficiency. Motor windings may include high-conductivity copper wire with advanced ceramic or polyimide insulation for superior thermal and electrical performance. The motors may be coupled with various high-reduction gear mechanisms designed for precision and load handling, such as strain wave gearboxes (e.g., Harmonic drives), cycloidal reducers, planetary gearboxes, bevel gear systems, worm gears, parallel shaft helical gear mechanisms, spur gear assemblies, crossed helical gear systems, double-enveloping worm gears, herringbone gears, hypoid gears, rack-and-pinion systems, bevel hypoid gears, epicyclic gear trains, and differential gear systems. Additionally, some implementations may incorporate custom gear profiles optimized for torque transfer efficiency, backlash reduction, and noise minimization. Moreover, the mechanical gear systems' reduction ratios may be any reduction ratio, including 1:1.1 to 1:150. In particular, said reduction ratio may be 1:10, 1:20, 1:30, 1:50, and/or 1:100. In other words, said reduction ratio may be less than 1:1.1. In other embodiments, said reduction ratio may be more than 1:150. Further, said actuators may include brakes or clutches to protect the gearbox and/or to allow for power to be removed from the actuators without causing the robot 1 to fall to the ground.

Examples of these alternative combinations include the arm actuator (J1) 190 or the shoulder actuator (J2) 280 utilizing a synchronous reluctance motor (SynRM) coupled with a compound planetary gearbox. In contrast, the wrist pivot actuator (J7) 520 might employ a coreless DC motor paired with a strain wave gearbox. This system could achieve reduction ratios in the range of 1:50 to 1:160, depending on the specific performance requirements. For actuators requiring a balance between speed and torque, such as the elbow actuator (J4) 374, a hybrid stepper motor combined with a cycloidal drive might be employed. This combination could achieve reduction ratios (1:30 to 1:87), offering a good compromise between speed and force. In scenarios where weight reduction is paramount, such as in distal joints like the wrist flex actuator (J6) 484, a flat or pancake-style brushless DC motor might be combined with a strain wave gearbox. This ultra-compact design could achieve reduction ratios from 1:50 to 1:160 while minimizing the added mass at the end of the arm assembly.

Additionally, to achieve exceptional positional accuracy and ensure reliable operation, each motor may be equipped with advanced encoders, which could be optical, magnetic, capacitive, inductive, resistive, piezoelectric, hall-effect, potentiometric, or ultrasonic. These encoders may facilitate sub-millimeter-level accuracy, critical for applications requiring meticulous movement control. To complement positional data, said actuator may include integrated torque sensors that have strain gauges, piezoresistive sensors, magnetoelastic sensors, capacitive sensors, fiber-optic sensors, or rotary transformers. Additionally or alternatively, the actuators may include current sensors, such as Hall-effect sensors, shunt resistors, fluxgate sensors, Rogowski coils, or magnetoresistive sensors. Furthermore, the system may incorporate micro-electromechanical systems (MEMS) gyroscopes and/or accelerometers, which provide additional sensory data related to orientation, angular velocity, and linear acceleration. This sensory integration enhances the robot's ability to navigate complex environments and maintain stability during operation.

Further, the actuators or the output of the actuators may include bearing housings constructed using advanced materials like carbon-fiber-reinforced polymers (CFRPs), fiberglass-reinforced polymers (FRPs), metal alloys, polyetheretherketone (PEEK), thermoplastic composites, and ultra-high-molecular-weight polyethylene (UHMWPE). Additionally, the manufacturing processes for CFRPs, such as filament winding or automated fiber placement, allow for precise control over fiber orientation, further optimizing the mechanical performance of the housings. The bearings themselves can be fabricated from, include, or processed using high-grade steel alloys (e.g., AISI 52100, M50, or 440C stainless steel), high-performance nickel-based superalloys (e.g., Inconel 718 or Hastelloy), cobalt-based alloys (e.g., Stellite), advanced ceramics (e.g., alumina or zirconia-based composites), and polymer matrix composites reinforced with carbon or aramid fibers. These materials may also benefit from advanced heat treatments (e.g., vacuum hardening or cryogenic treatment), surface engineering processes (e.g., ion implantation or physical vapor deposition), or specialized coatings.

To further optimize performance, the rolling elements of the bearings may be composed of advanced ceramic materials (e.g., silicon nitride, tungsten carbide, or zirconia), sapphire, or composite materials combining ceramic with metal or polymer matrices. In another embodiment, the assembly may incorporate cylindrical roller bearings, angular contact ball bearings, or hybrid bearings that combine steel races with ceramic rolling elements. Additionally, spherical roller bearings, tapered roller bearings, needle roller bearings, magnetic bearings, or hybrid or combinations thereof may be used. Cutting-edge manufacturing techniques, including additive manufacturing methods like selective laser melting (SLM), could be employed to create complex bearing geometries. These geometries may integrate features such as internal cooling channels, lubrication reservoirs, or textured surfaces to enhance lubrication retention and minimize wear.

The incorporation of such features allows for improved thermal management, reduced friction, and consistent lubrication distribution, even under challenging operating conditions. Additive manufacturing also enables the production of customized bearing designs with minimal material waste, aligning with sustainable manufacturing practices. In addition to additive manufacturing, other advanced processes like precision machining, laser hardening, or chemical vapor deposition (CVD) coatings may be applied to enhance the surface properties of the bearings. These techniques can improve wear resistance, reduce friction, and provide protection against corrosion, further extending the operational life of the components. The integration of smart sensors within the bearing housing is another potential enhancement, allowing for real-time monitoring of parameters such as temperature, vibration, and load. This data can be used to predict maintenance needs and prevent unexpected failures, ensuring optimal performance and reliability.

b. Upper Humerus

Figure 4:
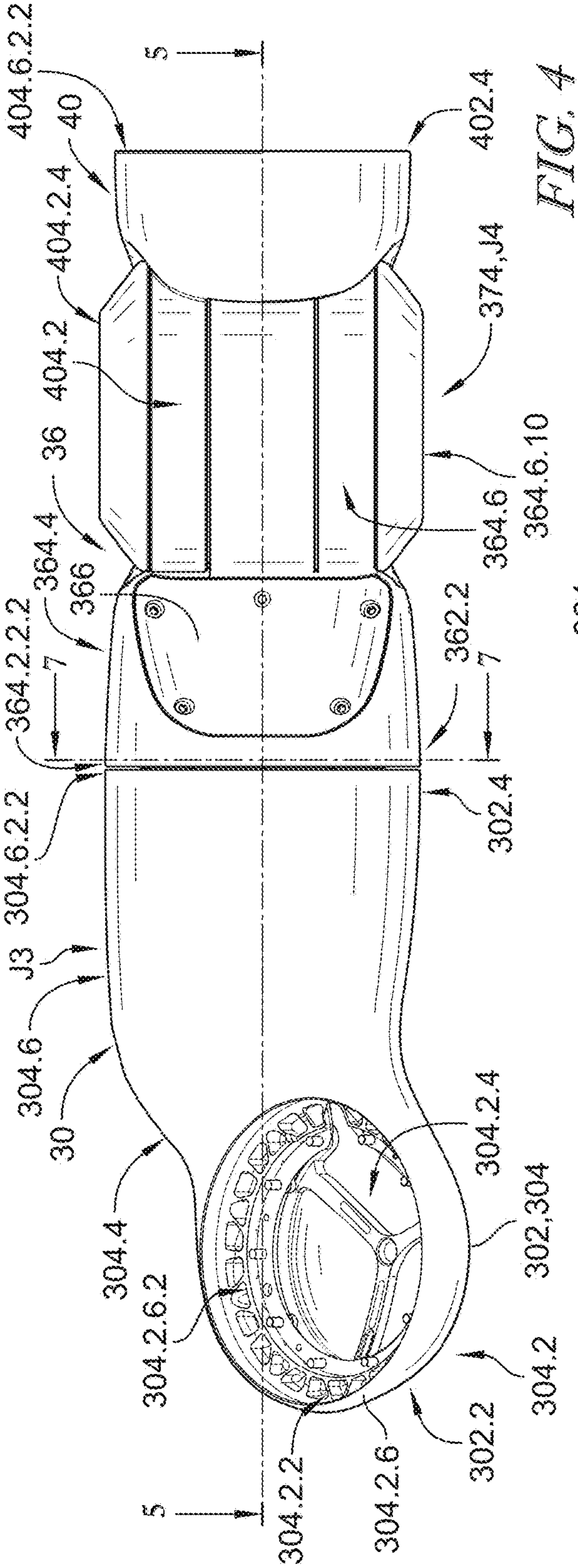
FIG. 4 is a front view of the upper humerus, lower humerus, and upper forearm of the robot in FIG. 1A.
Figure 5:
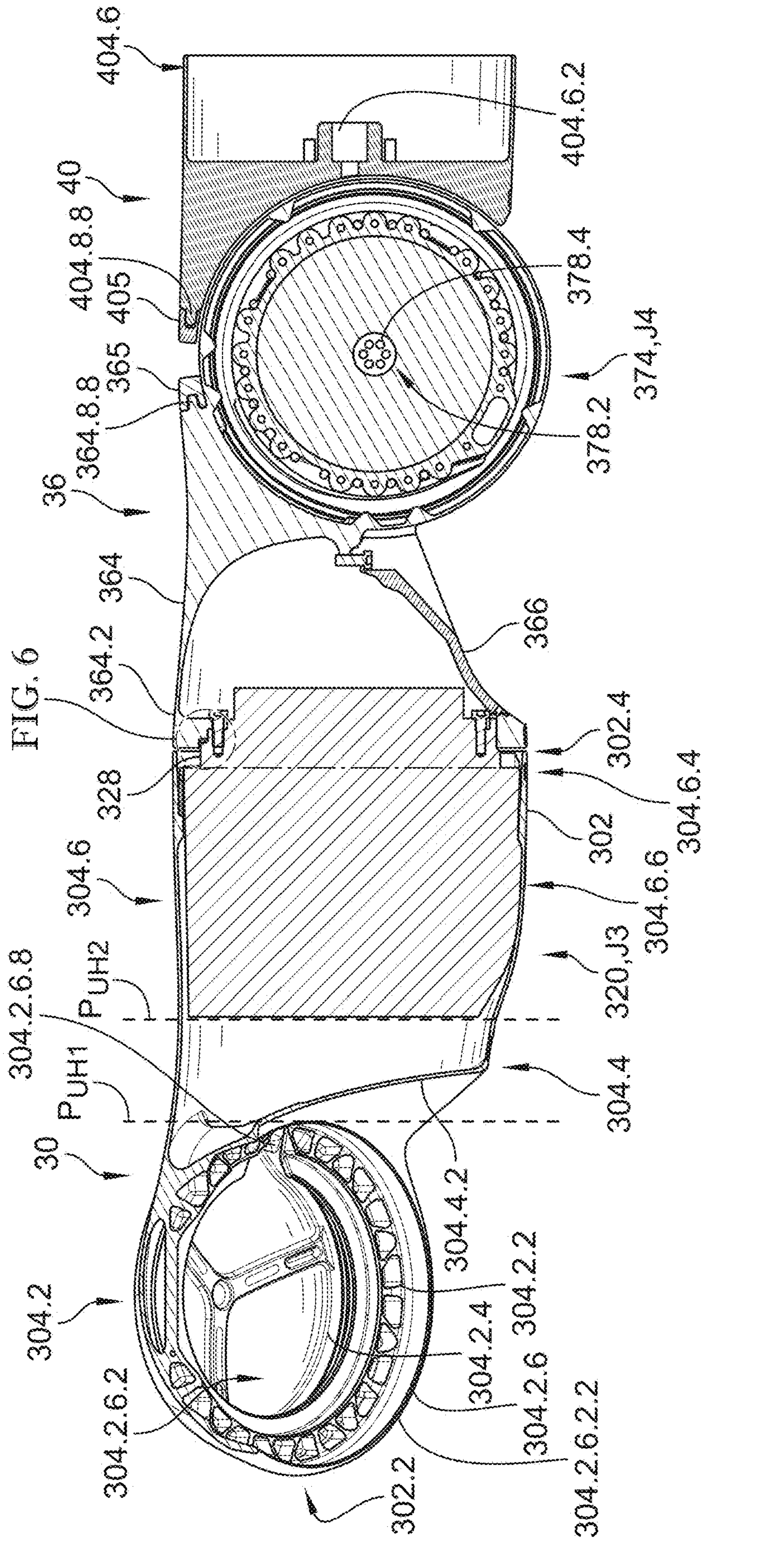
FIG. 5 is cross-sectional view of the upper humerus, lower humerus, and upper forearm taken along line 5-5 of FIG. 4.

Best shown in FIGS. 1, 4, and 5, the upper humerus 30 is configured to couple to shoulder actuator assembly (J2) 280 of the shoulder 26. The upper humerus 30 includes: (i) a housing 302, and (ii) an upper arm twist actuator assembly (J3) 320, wherein a majority of said upper arm twist actuator assembly (J3) 320 is positioned within the housing 302. The housing 302 has a frame 304 that includes (i) an upper humerus coupling assembly 304.2, (ii) an upper humerus extender 304.4, and (iii) an actuator receiving assembly 304.6. The housing 302 may be further defined by planes $P_{UH1}$, $P_{UH2}$ that are parallel to each other and perpendicular to the arm axis $A_A$. The upper humerus coupling assembly 304.2 includes a portion of the housing 302 that is substantially circular in shape with a substantially circular coupling wall portion 304.2.6. The first upper humerus plane $P_{UH1}$ is defined as tangential to the coupling wall portion 304.2.6 spaced from the proximal end 302.2 of the housing 302 along the arm axis $A_A$. The second upper humerus plane $P_{UH2}$ is spaced at a distance from the distal end 302.4 of the housing 302 along the arm axis $A_A$, defining the actuator cavity 304.6.6 within the actuator receiving assembly 304.6. The upper humerus extender 304.4 extends between second upper humerus plane $P_{UH2}$ and a curvilinear wall 304.4.2, where the curvilinear wall 304.4.2 intersects the first upper humerus plane $P_{UH1}$ and couples with an extent of the upper humerus coupling assembly 304.2.

The combination of an extent of the housing of the shoulder 26 and upper humerus coupling assembly 304.2 enable shoulder actuator assembly (J2) 280 to be fully encased in said combination. In the illustrative embodiment, the upper humerus coupling assembly 304.2 is configured to be coupled to the output of shoulder actuator assembly (J2) 280, along with receiving and housing a minor portion (e.g., less than 50% and preferably less than 20% of the actuator 280) of shoulder actuator assembly (J2) 280 extending from the shoulder 26. In alternative embodiments, the percentage of the shoulder actuator assembly (J2) 280 housed by the shoulder 26 and the upper humerus coupling assembly 304.2 may be altered such that a major percentage of shoulder actuator assembly (J2) 280 is housed within the upper humerus coupling assembly 304.2 and a minor extent (e.g., output portion) of the shoulder actuator 284 is housed within the shoulder housing 26. The upper humerus extender 304.4 provides structural support and an enclosure for the wiring 334, specifically the shoulder-upper humerus wire bundle 334.2 that can electrically connect the shoulder actuator assembly (J2) 280 and the upper arm twist actuator assembly (J3) 320.

Figure 6:
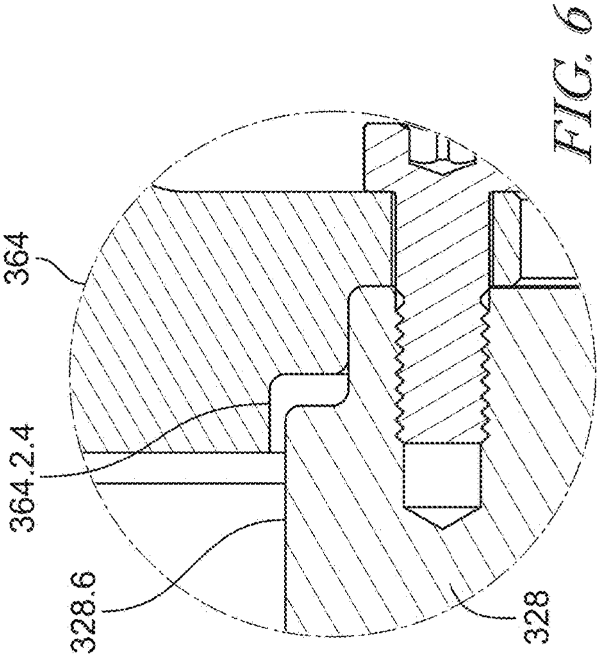
FIG. 6 is a zoomed in view of FIG. 5, showing the connection of the upper humerus and the lower humerus at the upper arm twist actuator.

Referring to FIGS. 4-6, the upper humerus coupling assembly 304.2 includes: (i) an upper humerus input mount 304.2.2, (ii) an actuator cover 304.2.4, and (iii) a coupling wall portion 304.2.6. The coupling wall portion 304.2.6 of the upper humerus coupling assembly 304.2 includes a shoulder opening 304.2.6.2 with the upper humerus input mount 304.2.2 attached within the interior of the coupling wall portion 304.2.6. The coupling wall portion 304.2.6 is substantially circular in shape, and as such has an external surface with a curvilinear extent that may be in the form of a U-shape or arch. Said coupling wall 304.2.6 is also configured to receive an output portion of shoulder actuator 284 extending from the shoulder housing 270. The coupling wall portion 304.2.6 includes a substantially circular edge 304.2.6.2.2 configured to abut and move with respect to a substantially circular edge of the shoulder housing 270 containing the shoulder actuator assembly (J2) 280. The coupling wall portion 304.2.6 may also include a wire passage 304.2.6.8 therethrough for access between the upper humerus coupling assembly 304.2 and the upper humerus extender 304.4. The shoulder-upper humerus wire bundle 334.2 that is coupled to the upper arm twist actuator assembly (J3) 320 is configured to extend through the wire passage 304.2.6.8 to an extent of the shoulder actuator assembly (J2) 280 housed within the upper humerus coupling assembly 304.2.

Figure 15:
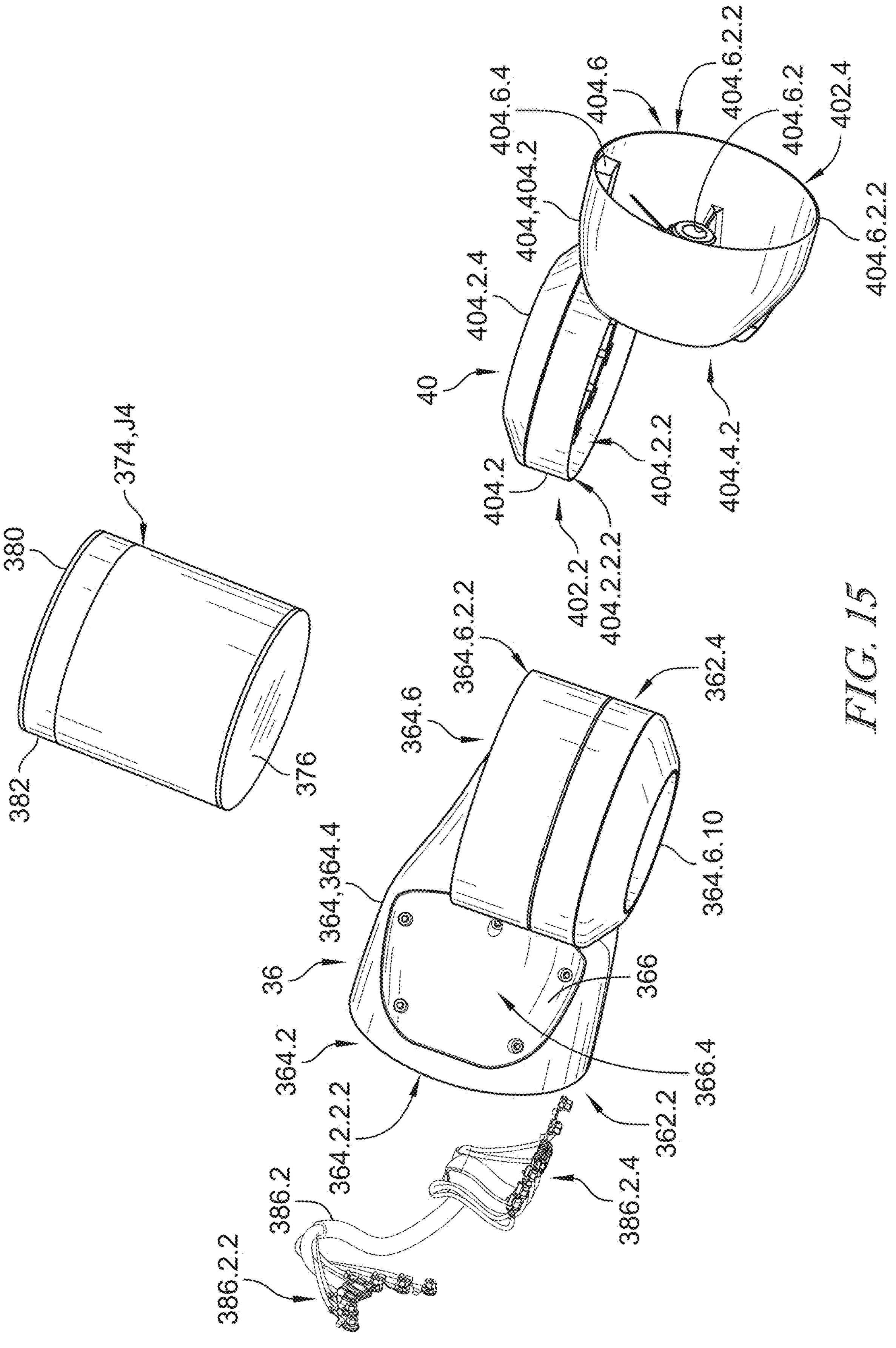
FIG. 15 a first partially exploded view of the elbow of in FIG. 9 showing a lower humerus housing, a upper forearm housing, the elbow actuator, and wiring.

Additionally, the upper humerus extender 304.4 allows for the separation of the shoulder actuator (J2) 280 and arm twist actuator (J3) 320 from one another in order to allow arm twist actuator assembly (J3) 320 to be rotated lengthwise in relation to shoulder actuator assembly (J2) 280, which permits the rotational axes $A_2$, $A_3$ of these actuators to be close to perpendicular to one another (FIG. 3). By placing the axis of rotation $A_3$ of arm twist actuator assembly (J3) 320 substantially parallel with the ground and substantially perpendicular to the sagittal plane (when the robot 1 is in the extended position), arm twist actuator assembly (J3) 320 is configured to allow the robot to twist the arm while remaining in the transverse plane. The upper humerus extender 304.4 includes a curvilinear wall 304.4.2 that has a steep pitch, which allows said extender 304.4 to couple said upper humerus coupling assembly 304.2 to the actuator receiving assembly 304.6, while not impeding the movement of the shoulder actuator assembly (J2) 280. The upper humerus extender 304.4 extends between the curvilinear wall 304.4.2 and the second upper humerus plane $P_{UH2}$, where the wire passage 304.2.6.8 of the coupling wall portion 304.2.6 extends through the curvilinear wall 304.4.2 to the interior of the housing 302 of the upper humerus extender 304.4 to facilitate the connection of the shoulder-upper humerus wire bundle 334.2 to the upper arm twist actuator assembly (J3) 320. As shown in FIGS. 4-7, the upper arm twist actuator (J3) 320 includes an internal bore opening 324.2 configured for the internal wire bundle 324.4 that extends from one side of the actuator to the other. The upper humerus-lower humerus wire bundle 386.2 extends from between the upper arm twist actuator assembly (J3) 320 to the elbow actuator assembly (J4) 374 (FIG. 15).

Referring to FIGS. 5-8, the upper arm twist actuator assembly (J3) 320 is configured to be received into the actuator receiving assembly 304.6 that includes an actuator receptacle 304.6.2 and an upper humerus actuator mount 304.6.4. The actuator cavity 304.6.6 within the actuator receiving assembly 304.6 is an interior space within the housing 302 with a depth and diameter sufficient to house a substantial portion of the upper arm twist actuator assembly (J3) 320 that extends inward when mounted to the upper humerus actuator mount 304.6.4. The depth is the distance from the distal end 302.4 to the second upper humerus plane $P_{UH2}$. The housing 302 at the actuator receiving assembly 304.6 is substantially circular with a substantially circular edge 304.6.2.2 at the distal end 302.4 configured to abut and rotate with respect to an edge 364.2.2.2 of the lower humerus input mount 364.2.2. The exterior shape of the housing 302 between the distal end 302.4 and the second upper humerus plane $P_{UH2}$ may taper slightly without interfering with the interior actuator cavity 304.6.6 that houses the upper arm twist actuator assembly (J3) 320. The perimeter and/or diameter of the actuator receiving assembly 304.6 at the edge 304.6.2.2 is substantially the same as the perimeter and/or diameter of the lower humerus input mount 364.2.2 at the edge 364.2.2.2. Matching of these perimeters and/or diameters is desirable because it gives the robot 1 a human like appearance.

Figure 30:
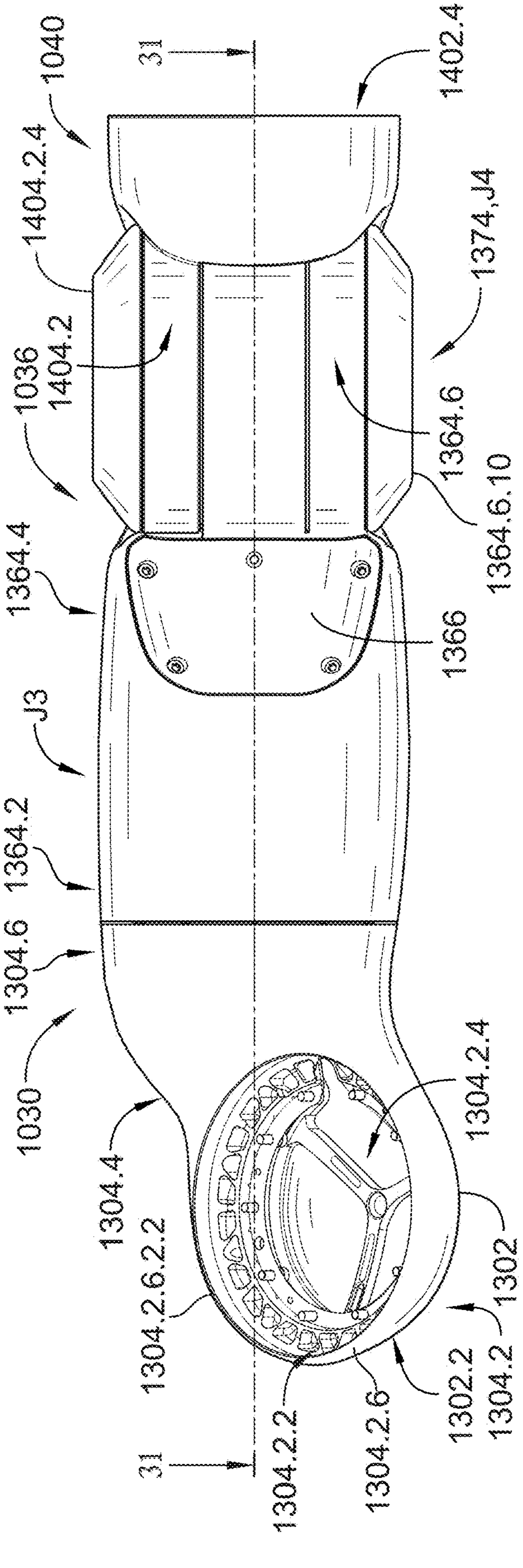
FIG. 30 is a front view of an alternative embodiment of an upper humerus, a lower humerus, and an upper forearm of a second embodiment of a humanoid robot.
Figure 31:
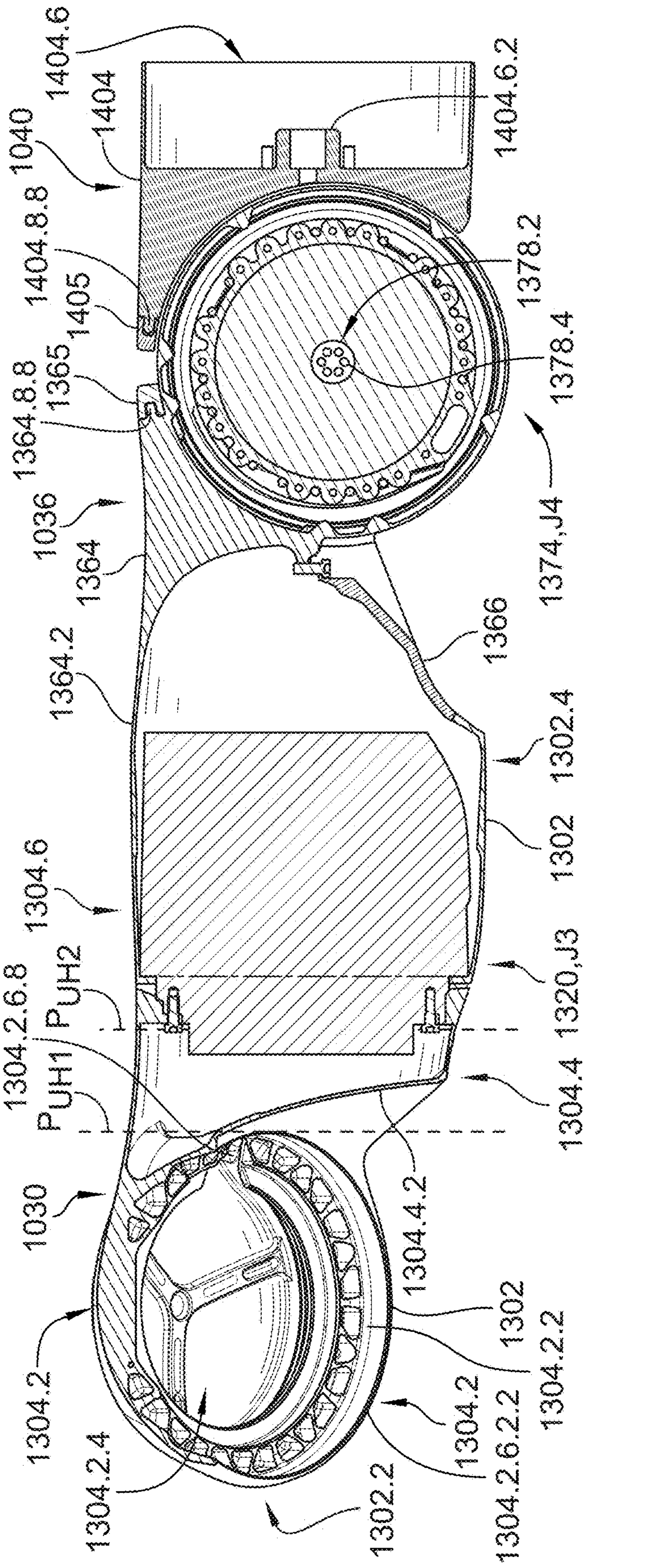
FIG. 31 is cross-sectional view of the upper humerus, lower humerus, and upper forearm taken along line 31-31 of FIG. 30.

The upper arm twist actuator assembly (J3) 320 may be positioned within the actuator receptacle 304.6.2 of the actuator receiving assembly 304.6 and secured to the upper humerus actuator mount 304.6.4. In one embodiment, the upper arm twist actuator assembly (J3) 320 is seated and fully encased within the upper humerus housing 302. In other embodiments, said upper arm twist actuator assembly (J3) 320 may not be fully encased within the upper humerus housing 302 and instead a portion (e.g., between 10% to 50% of the actuator assembly 320) may be positioned outside of said housing 302. In a further alternative embodiment (as shown in FIGS. 30-31), a majority of the upper arm twist actuator assembly (J3) 1320 may be positioned outside of the upper humerus housing 1302. In said alternative embodiment, the upper arm twist actuator assembly (J3) 1320 may be omitted or may be positioned within an extent of the lower humerus 1036. The alternative embodiment requires that the configuration of the upper arm twist actuator assembly (J3) 1320 be switched such that the output is positioned closer to the torso, and the split between the upper humerus housing 1302 and the lower humerus housing 1304 is positioned between $P_{UH1}$ and $P_{UH2}$. If said upper arm twist actuator assembly (J3) 1320 is positioned within the lower humerus 1036, then the upper humerus housing 1302 may lack an actuator or at least a majority of an actuator positioned therein.

D. Elbow Assembly

Referring to FIGS. 4-19, the elbow assembly 39 includes the lower humerus 36 and the upper forearm 40 and elbow actuator assembly (J4) 374 coupled therebetween. Each of the lower humerus 36 and the upper forearm 40 are configured to couple with a portion of the elbow actuator assembly (J4) 374, however, neither are configured in this embodiment to fully house any of the actuators. The housings of the lower humerus 36 and the upper forearm 40 are coupled at the elbow actuator (J4) 374, such that an extent of the lower humerus 36 abuts and rotates with respect to an extent of the upper forearm 40. As such, the elbow actuator (J4) 374 is supported on a single side of the actuator by each of the lower humerus 36 and the upper forearm 40. In other words, neither the lower humerus 36 nor the upper forearm 40 provide support on both sides of the elbow actuator (J4) 374.

In an alternative embodiment, either one of the lower humerus 36 or the upper forearm 40 may house a substantial majority (e.g., over 80%) of the elbow actuator (J4) 374. This housing arrangement may permit either one of the lower humerus 36 or the upper forearm 40 to include projections or members that are positioned on both sides of the elbow actuator (J4) 374. In one example, the upper forearm 40 may house a substantial majority (e.g., over 80%) of the elbow actuator (J4) 374, while the upper forearm 40 may include upper and lower members that are positioned on opposite sides of said actuator (J4) 374. While this alternative design may be heavier than the design shown in a majority of the images contained herein, it may be desirable because it may increase robustness of the robot 1 at said elbow assembly.

Based on the above discussion, the elbow actuator assembly (J4) 374 links or couples an upper arm twist actuator assembly (J3) 320 that resides the upper humerus 30 to the actuators that reside in the lower forearm, wrist, and hand. The upper forearm 40 is coupled to the lower forearm 46 which contains a lower arm twist actuator (J5) 468 and is configured to change the rotation of the lower arm and hand about an arm axis $A_A$. As shown in FIG. 3, when in arms of the robot 1 are in an extended position, the arm axis $A_A$ is colinear with the axis $A_3$ of the upper arm twist actuator (J3) 320 that resides in the upper humerus 30 and the axis $A_5$ of the lower arm twist actuator (J5) 468 that resides in the lower forearm 46. Additional wrist actuators (J6-J7) further cooperate to position the hand 56. Further, the rotational axis $A_4$ of the elbow actuator assembly (J4) 374 is perpendicular to and offset forward of the arm axis $A_A$. Said offset of the rotational axis $A_4$ is beneficial because: (i) it gives the arm assembly a more human look, and (ii) it also increases the inner range of motion, which in turn limits the need to rottenly hyperextend the arm at the elbow joint.

a. Lower Humerus

As shown in FIGS. 4-8, the lower humerus 36 is coupled to the upper humerus 30. Said coupling may be accomplished by either: (i) positioning the arm twist actuator (J3) 320 within an extent of the upper humerus 30 and coupling the output adapter 328 of said arm twist actuator (J3) 320 to an extent of the lower humerus 36, or (ii) positioning the arm twist actuator (J3) 1320 within an extent of the lower humerus 1036 and coupling the output adapter 1328 of said arm twist actuator (J3) 1320 to an extent of the upper humerus 1030. It should be noted that the first version is depicted in FIGS. 1-29, while the second version is depicted in FIGS. 30-31. It should be understood that other embodiments are contemplated by the Applicant based on the disclosure contained in this Application and/or based on the disclosure contained in other Applications that are incorporated herein by reference.

As shown in FIGS. 1-29, the lower humerus 36 is configured to be coupled to the output adapter 328 of the arm twist actuator (J3) 320. The coupling of said lower humerus 36 to the output adapter 328 enables said arm twist actuator (J3) 320 to rotate the rest of the arm about the $A_3$ axis. The lower humerus 36 may include (i) a housing 362 having a frame 364, (ii) an elbow actuator assembly (J4) 374, and (iii) wiring 386. The housing 362 includes a frame 364 and an internal elbow cover 366. The housing 362*a*, 362*b* of the left and right lower humerus 36*a*, 36*b* are each coupled to the respective arm twist actuators 320 (J3) in the upper humerus 30 in mirrored positions such that the arms each bend inward at the elbow toward the front of the torso 16. Although the left and right housings 362*a*, 362*b* have the same structure (i.e. interchangeable for either side), each are coupled to the respective arm twist actuators (J3) 320 positioned such that the elbow actuator receiving assembly 364.6 of the housing 362 is inverted with respect to the left side and the right side, such that when coupled within the respective frames 364, the output of the elbow actuators (J4) 374 are in opposite rotational directions. For example, the left lower humerus housing 362*a* may be positioned such that the elbow actuator receiving assembly 364.6*a* is positioned downward to receive elbow actuator (J4) 374 from the top, whereas the right lower humerus housing 362*b* may be positioned such that the elbow actuator receiving assembly 364.6*b* is positioned upward to receive elbow actuator (J4) 374 from the bottom (FIG. 1A). The same configurations for left and right lower humerus housing 362*a*, 362*b* are used for simplicity and to minimize part count.

The frame 364 of the lower humerus housing 362 may include: (i) a lower humerus coupling assembly, an arm twist mating assembly, an arm twist actuator coupling assembly, or arm twist receiving assembly 364.2, (ii) a lower humerus extender 364.4, and (iii) an elbow actuator coupling assembly, an elbow actuator mating assembly, or an elbow actuator receiving assembly 364.6. The frame 364 may be further defined by planes $P_{LH1}$, $P_{LH2}$ that are parallel to each other and perpendicular to the arm axis $A_A$. The first lower humerus plane $P_{LH1}$ is spaced at a distance from the proximal end 362.2 of the housing 362 along the arm axis $A_A$ that includes the lower humerus input mount 364.2.2. The elbow actuator receiving assembly 364.6 includes a portion of the frame 364 that is substantially circular in shape with a substantially circular actuator receptacle 364.6.2. As such, said elbow actuator receiving assembly or elbow actuator mating assembly 364.6 includes an exterior surface that has a curvilinear extent that may be in the form of a U-shape or arc that is positioned in the X-Y plane (when the arms 5 are in an extended position as shown in FIGS. 1A-1B). The second lower humerus plane $P_{LH2}$ is defined as tangential to the actuator receptacle 364.6.2 spaced from the distal end 362.4 of the housing 362 along the arm axis $A_A$. The lower humerus extender 364.4 extends between the first lower humerus plane $P_{LH1}$ and a curvilinear wall 364.4.2, where the curvilinear wall 364.4.2 intersects the second lower humerus plane $P_{LH2}$ and couples with an extent of the actuator receptacle 364.6.2.

The lower humerus coupling assembly 364.2 is configured to be positioned on an output end of upper arm twist actuator assembly (J3) 320 that is opposed to the input end of upper arm twist actuator assembly (J3) 320 that is secured within the upper humerus housing 302. The lower humerus coupling assembly 364.2 includes an exterior surface that has a curvilinear extent that may be in the form of a U-shape or arc that is positioned in the Z-X plane, wherein the Z-X plane is perpendicular to the X-Y plane. Referring to FIGS. 4-5, the outer diameter or perimeter of the lower humerus coupling assembly 364.2 is substantially similar to the outer diameter or perimeter of the actuator receiving assembly 304.6 of the upper humerus 30. Substantial matching of these diameters or perimeters allows for the arm to appear uniform and human-like. It should be understood that in other embodiments, said diameters may not match or may not substantially match one another. For example, the lower humerus coupling assembly 364.2 may have a smaller diameter that is designed to fit within an extent of the actuator receiving assembly 304.6 of the upper humerus 30.

The combination of the lower humerus coupling assembly 364.2 and upper humerus housing 302 enables the upper arm twist actuator assembly (J3) 320 to be fully encased of said combination (as shown in FIG. 5). The lower humerus coupling assembly 364.2 is configured to receive and house a minor portion (e.g., less than 20% and preferably less than 5% of the actuator assembly (J3) 320) of the upper arm twist actuator assembly (J3) 320. Specifically, said lower humerus coupling assembly 364 may only house an output extent of the upper arm twist actuator assembly (J3) 320, wherein housing of said extent is beneficial because it simplifies coupling of the housing 362 to the actuator 320. In alternative embodiments, the percentage of the upper arm twist actuator assembly (J3) 320 that is received by the upper humerus housing 302 and the lower humerus coupling assembly 364.2 may be altered such that a major percentage of the upper arm twist actuator assembly (J3) 320 is housed within the lower humerus coupling assembly 364.2 and a minor extent of the upper arm twist actuator assembly (J3) 320 is housed within the upper humerus housing 302. In fact and as shown in FIGS. 30-31, a substantial majority or even the entirety of the upper arm twist actuator assembly (J3) 320 may be positioned within the lower humerus coupling assembly 364.2 or housing 362.

Figure 8:
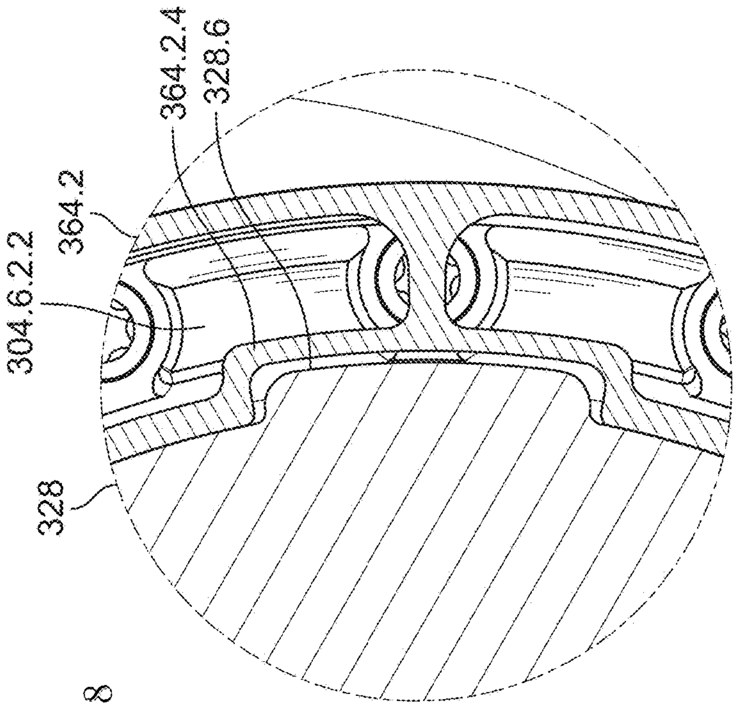
FIG. 8 is a zoomed in view of FIG. 7, showing a portion removed from the housing of the lower humerus to receive an extent of the hard stop projection.
Figure 7:
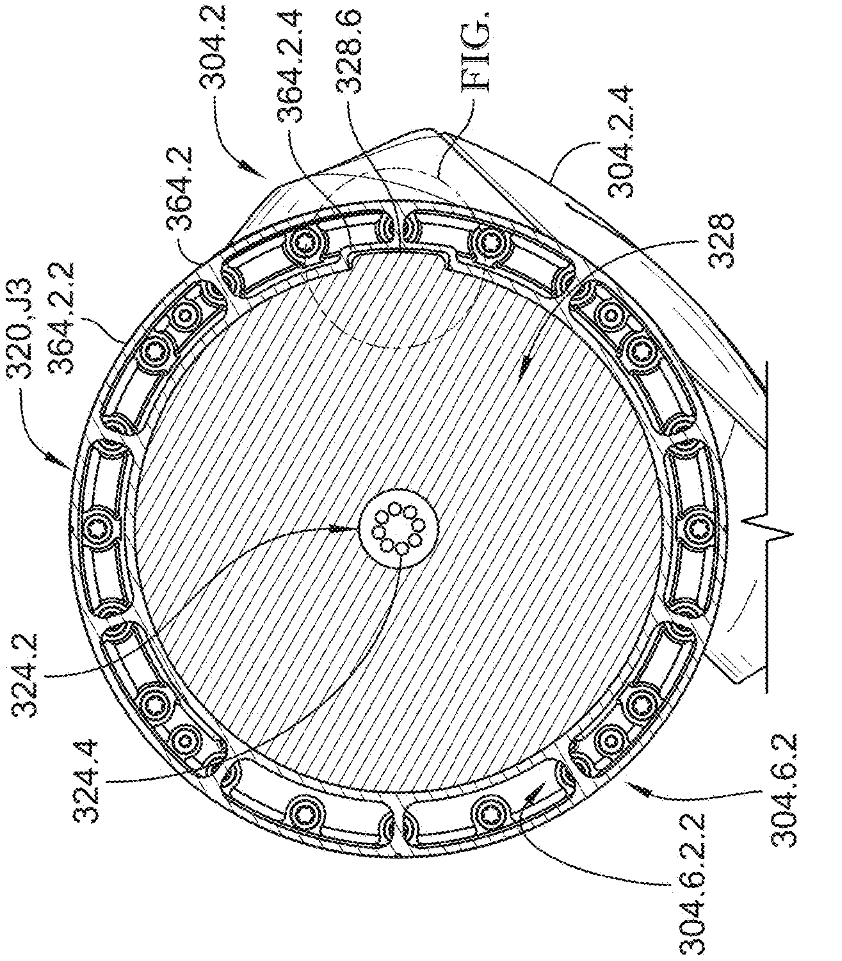
FIG. 7 is cross-sectional view of the lower humerus taken along line 7-7 of FIG. 4.

Shown in FIGS. 4-18, the lower humerus coupling assembly 364.2 of the frame 364 may include a lower humerus input mount 364.2.2 to couple the lower humerus 36 to the upper arm twist actuator assembly (J3) 320. Similar to the upper humerus coupling assembly 304.2, lower humerus coupling assembly 364.2 includes the lower humerus input mount 364.2.2 configured to abut the upper humerus output mount 328. Said lower humerus input mount 364.2.2 is coupled to the upper humerus output mount 328 via a coupling means (e.g., one or more fasteners-namely threaded, projections, snap-fit connector, bayonet mount, pin-and-hole connection, press-fit/interference fit, clamp or clip mechanism, magnets, hook-and-loop, rivets, ball detent, hinge joints, sliding rails, cam locks, toggle clamps, quick-release pins, spring-loaded connectors, wedge locks, dowel pins, ratchet mechanisms, T-slot connectors, twist locks, latches, locking tabs, etc.). As best shown in FIGS. 7-8, the input mount 364.2.2 of the lower humerus housing 362 includes a notch 364.2.4 formed in the frame 364 configured to receive an extent of the limiting projection 328.6 of the upper arm twist actuator assembly (J3) 320. The input mount 364.2.2 may be formed in the frame 364 with area removed forming the notch 364.2.4. The extent of the limiting projection 328.6 and the notch 364.2.4 mate to ensure proper assembly and increase contact area between an actuator output and a housing structure of the next component. This keyed structure helps reduce installation issues and misalignment of the components.

Figure 18:
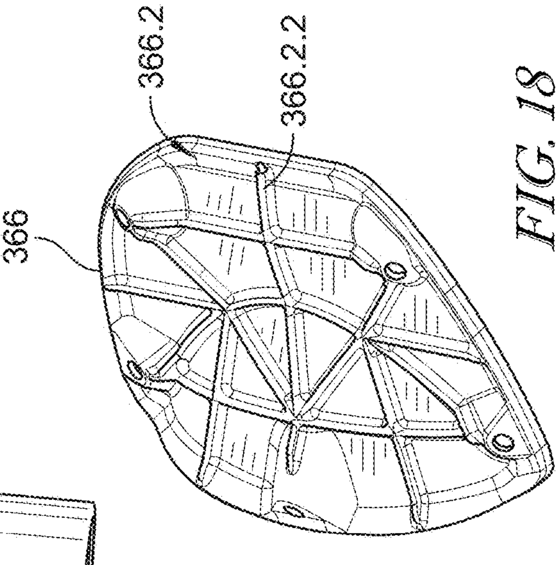
FIG. 18 is a perspective view of the internal elbow cover of FIG. 16.
Figure 17:
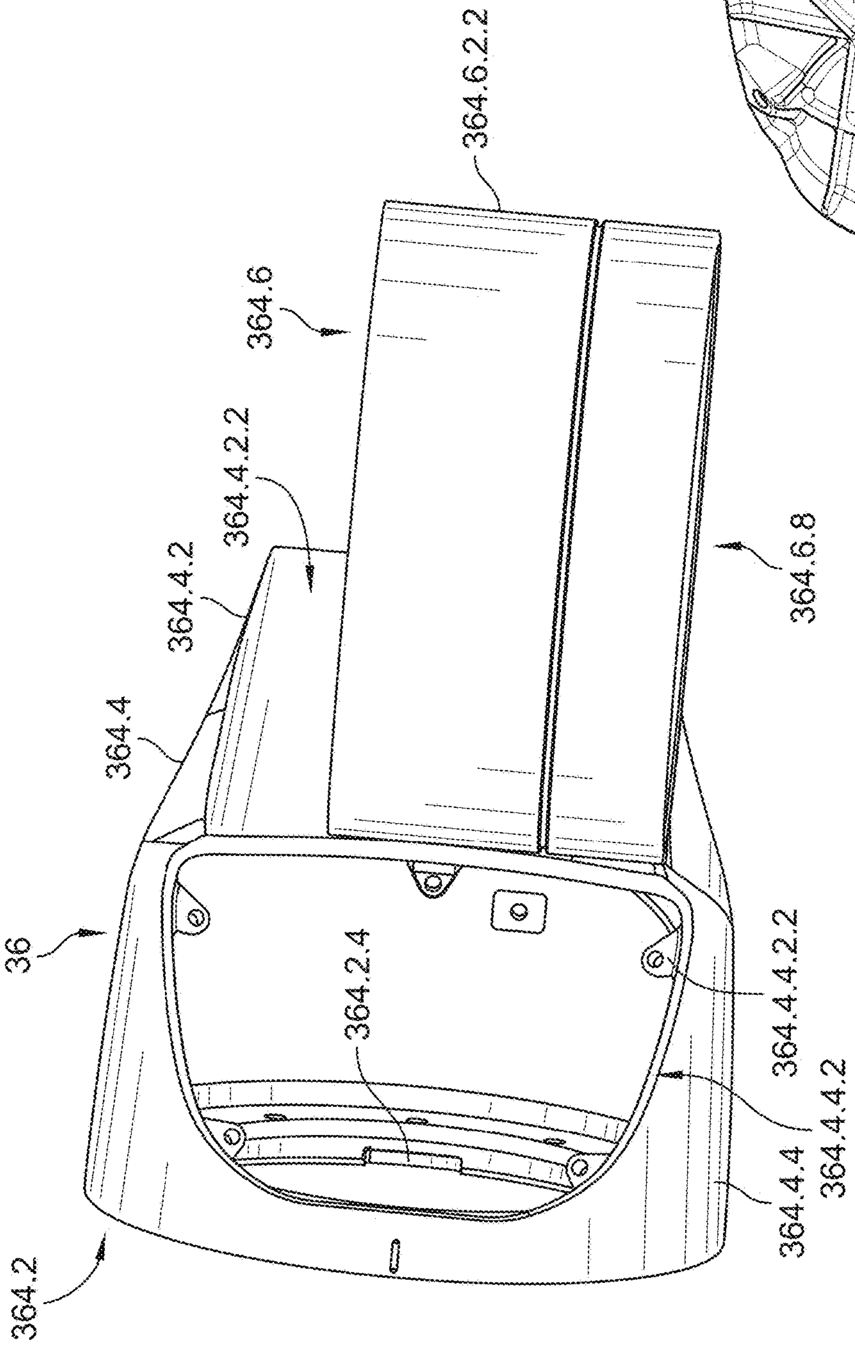
FIG. 17 is a perspective side view of the lower humerus frame of FIG. 16.

Referring to FIGS. 17-18, the lower humerus extender 364.4 includes an access opening 364.4.4.2 in a sidewall portion 364.4.4 to access the lower humerus input mount 364.2.2 and secure said mount 364.2.2 to the upper humerus output mount 328 via a coupling means (e.g., threaded fasteners or any other coupling structure disclosed herein). An internal elbow cover 366 may be removably coupled to the lower humerus extender 364.4 to cover the access opening 364.4.4.2 and reinforce the housing 362 at the access opening 364.4.4.2. For example, the internal elbow cover 366 may be coupled to the housing 362 by the interaction between the coupling means (e.g., threaded fasteners or any other coupling structure disclosed herein) and mounting features 364.4.4.2.2 of the access opening 364.4.4.2. The interior surface 366.2 of the cover 366 includes ribs 366.2.2 in order to increase the stiffness of said cover 366. In other embodiments, the ribs 366.2.2 may be omitted, their thickness may be increased, or fewer ribs may be used. Additionally, it should be understood that in other embodiments, the cover 366 may be omitted and instead it may be integrally formed as a part of the frame 364. The exterior surface 366.4 of the cover may include or be coupled to an arm energy attenuation member 368 configured to absorb energy. It should be understood that the other locations and other methods of accessing said coupling means and mount 364.2.2 are contemplated by this disclosure. For example, a longitudinal split in the frame 364 may provide said access.

The lower humerus extender 364.4 of the lower humerus frame 364 is shaped to provide structural support and a transition from the lower humerus coupling assembly 364.2 to an elbow actuator receiving assembly 364.6. Additionally, the lower humerus extender 364.4 allows for the separation of the actuator assemblies (J3, J4) 320, 374 from one another in order to allow the elbow actuator assembly (J4) 374 to be rotated lengthwise in relation to the upper arm twist actuator assembly (J3) 320, which permits the rotational axes $A_3$, $A_4$ of these actuators to be substantially perpendicular to one another. By placing the axis of rotation of the elbow actuator assembly (J4) 374 substantially perpendicular with the ground and substantially parallel to the sagittal plane (when the robot 1 is in the extended position), the elbow actuator assembly (J4) 374 is configured to allow the robot 1 to bend at the elbow while staying in the transverse plane.

As shown in FIG. 17, the lower humerus extender 364.4 includes the curvilinear wall 364.4.2 and sidewall portion 364.4.4 that has a steep pitch, which are features that allow said extender 364.4 to couple said lower humerus coupling assembly 364.2 to the elbow actuator receiving assembly 364.6, while not impeding the movement driven by the upper arm twist actuator assembly (J3) 320. The curvilinear wall 364.4.2 may have an arcuate surface 364.4.2.2 that conforms to the shape of the elbow actuator receiving assembly 364.6. The curvilinear wall 364.4.2 is also configured to receive an extent of the exterior surface 404.2.2.2 of the upper forearm coupling assembly 404.2 that partially encloses the elbow actuator (J4) 374, allowing rotational movement between the arcuate surface 364.4.2.2 and the exterior surface 404.2.2.2. While the curvilinear wall 364.4.2 surrounds an extent of the lower humerus coupling assembly 364.2, in other embodiments, the curvilinear wall 364.4.2 may be omitted and instead a tapered wall that extends from the lower humerus coupling assembly 364.2 may be utilized. Said tapered wall may be less desirable because it limits the space contained within the lower humerus frame 364.

An external surface portion 364.8.2 of the lower humerus extender 364.4 tapers from the second lower humerus plane ($P_{LH2}$) to a member mounting surface 364.8.4 positioned at an extent of the elbow actuator receiving assembly 364.6. The member mounting surface 364.8.4 is configured to couple with a replaceable deformable member 365. In the illustrative embodiment, the member mounting surface 364.8.4 includes an end stop projection 364.8.8 extending from the member mounting surface 364.8.4 that is configured to mate with the replaceable deformable member 365.

b. Upper Forearm

As shown in FIGS. 4-15 and 19, the upper forearm 40 includes: (i) a housing 402 having a frame 404 and (ii) wiring 430. The frame 404 includes (i) an upper forearm coupling assembly 404.2 having an upper forearm input mount 404.2.2 and an actuator cover 404.2.4, and (ii) an upper forearm extender 404.4. The upper forearm 40 provides a transition between the upper arm assembly 24 and the lower forearm 46, wrist 50, and hand 56. The housing 402 may be further defined by planes $P_{UF1}$, $P_{UF2}$ that are parallel to each other and perpendicular to the arm axis $A_4$. The upper forearm coupling assembly 404.2 includes a portion of the housing 402 that is substantially circular in shape with a substantially circular coupling wall portion 404.2.6. As such and as shown in FIGS. 5, 12-14, and 19, said upper forearm coupling assembly 404.2 includes an exterior surface that has a curvilinear extent that may be in the form of a U-shape or arch that is positioned in the X-Y plane. Said upper forearm coupling assembly 404.2 may be coupled to the upper forearm output mount 382 of the elbow actuator assembly (J4) 374. The upper forearm coupling assembly 404.2 can have a cover opening 404.2.6 suitable to provide access to the upper forearm input mount 404.2.2 to secure the upper forearm output mount 382 to said upper forearm input mount 404.2.2 using a coupling means (e.g., threaded fasteners or any other coupling structure disclosed herein).

The first upper forearm plane $P_{UF1}$ is defined as tangential to the coupling wall portion 404.2.6 and spaced from the proximal end 402.2 of the housing 402 along the arm axis $A_4$. The second upper forearm plane $P_{UF2}$ is spaced at a distance from the distal end 402.4 of the housing 402 along the arm axis $A_4$ at a coupling wall 404.6.2 that is configured to interface with an extent of the lower arm twist actuator (J5). The upper forearm extender 404.4 extends between the second upper forearm plane $P_{UF2}$ and a curvilinear wall 404.4.2, where the curvilinear wall 404.4.2 intersects the first upper forearm plane $P_{UF1}$ and couples with an extent of the upper forearm coupling assembly 404.2.

The actuator cover 404.2.4 can be detachably attached to the cover opening 404.2.6 to enclose the elbow actuator assembly (J4) 374 using a coupling means (e.g., threaded fasteners or any other coupling structure disclosed herein). The combination of the lower humerus elbow actuator receiving assembly 364.6 and the upper forearm coupling assembly 404.2 enable the elbow actuator assembly (J4) 374 to be fully encased by said combination. The upper forearm coupling assembly 404.2 is configured to receive and house a minor portion (e.g., less than 50% and preferably less than 20%) of elbow actuator assembly (J4) 374. It should be understood that in other embodiments, the percentage of the elbow actuator assembly (J4) 374 that is received by the lower humerus receiving assembly 364.6 and the upper forearm coupling assembly 404.2 may be altered such that a major percentage of the elbow actuator assembly (J4) 374 is housed within the upper forearm coupling assembly 404.2 and a minor extent of the elbow actuator assembly (J4) 374 is housed within the lower humerus receiving assembly 364.6.

Figure 19:
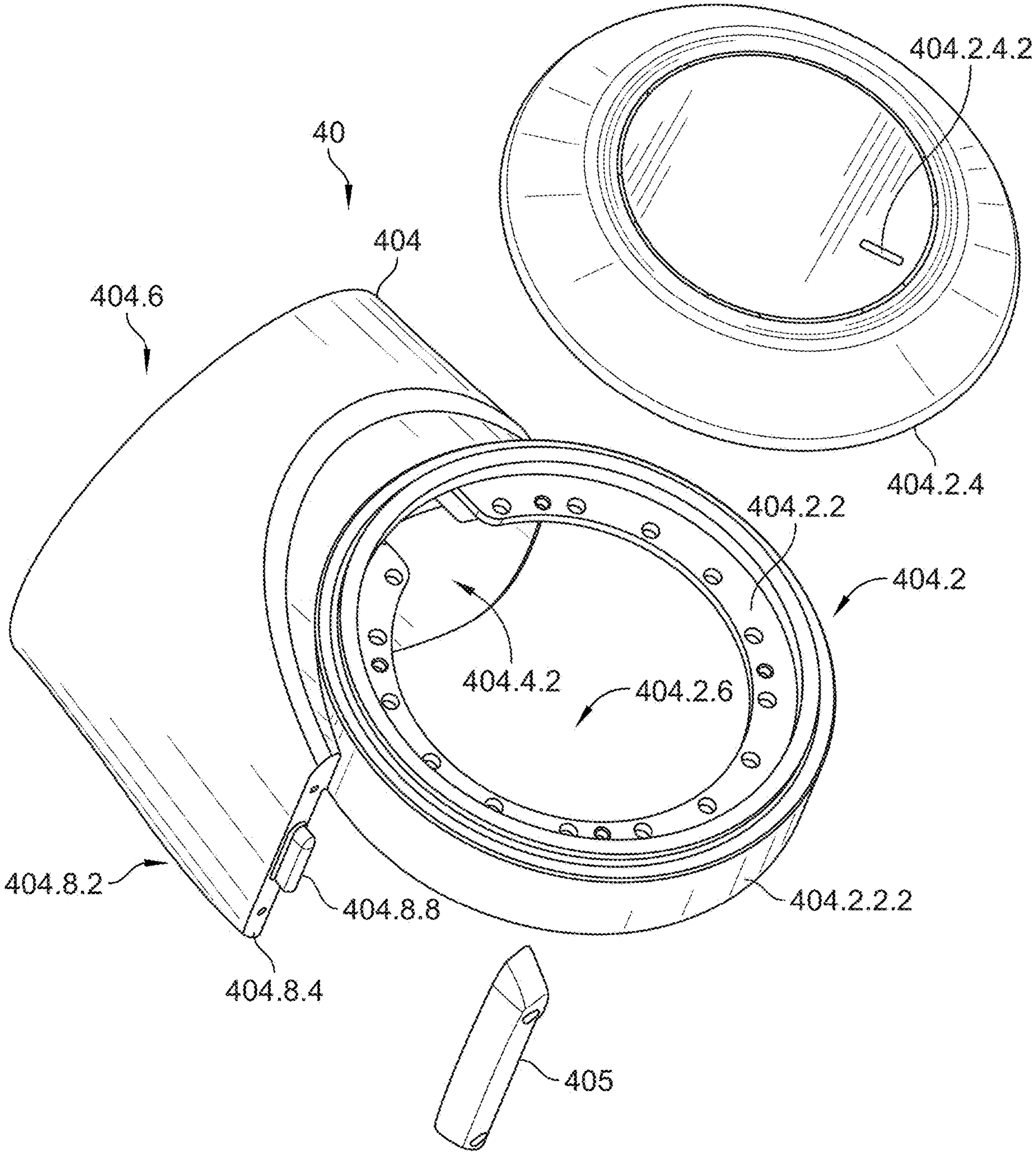
FIG. 19 is an exploded view of the upper forearm housing of FIG. 15.

The upper forearm extender 404.4 provides further structure and a passageway for wiring 430 extending from the elbow actuator (J4) 374. Specifically, the lower humerus-upper forearm wire bundle 430.2 can be connected to the lower humerus actuator assembly or elbow actuator assembly (J4) 374, extend through the upper forearm extender 404.4, and be configured to be coupled to another actuator or distribution board contained in the wrist 50 or hand 56 of the robot 1. As shown in FIG. 19, the upper forearm extender 404.4 includes the curvilinear wall 404.4.2 having an arcuate surface 404.4.2.2 that conforms to the shape of the upper forearm coupling assembly 404.2. The curvilinear wall 404.4.2 is also configured to receive an extent of the exterior surface 364.6.2.2 of the elbow actuator receiving assembly 364.6 that partially encloses the elbow actuator (J4) 374, allowing rotational movement between the arcuate surface 404.4.2.2 and the exterior surface 364.6.2.2. An external surface portion 404.8.2 of the upper forearm extender 404.4 tapers from the first upper forearm plane ($P_{UF1}$) to a member mounting surface 404.8.4 around an extent of the upper forearm coupling assembly 404.2. The member mounting surface 404.8.4 is configured to couple with a replaceable deformable member 405. In the illustrative embodiment, the member mounting surface 404.8.4 includes an end stop projection 404.8.8 extending from the member mounting surface 404.8.4 that is configured to mate with the replaceable deformable member 405.

Figure 9:
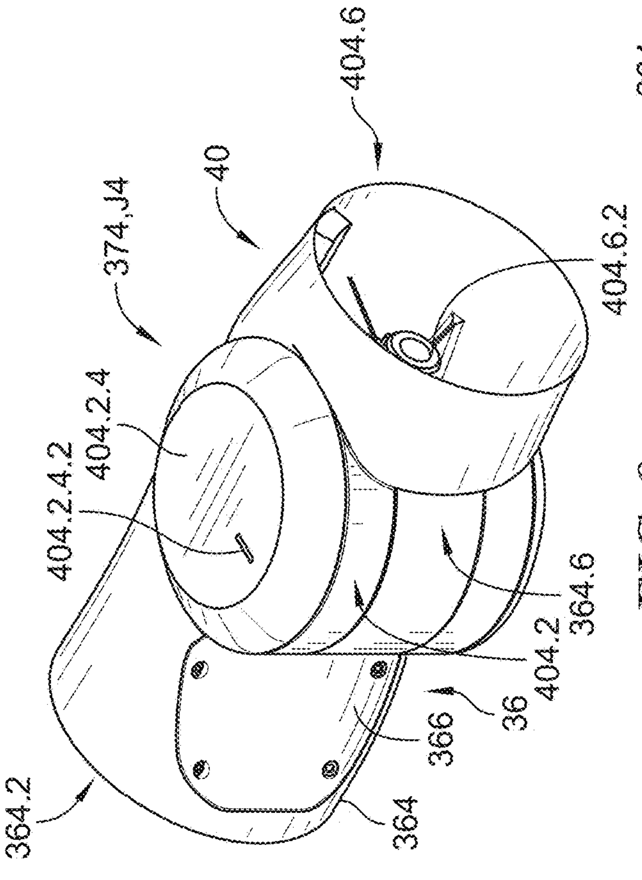
FIG. 9 is a perspective view of the elbow of the robot of FIG. 1A, wherein the elbow includes the lower humerus and the upper forearm.
Figure 10:
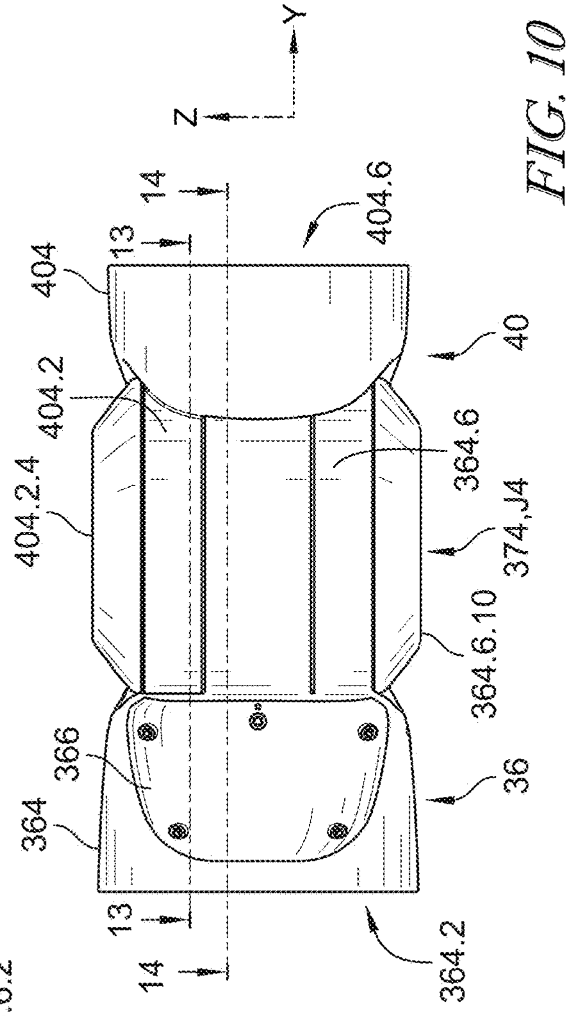
FIG. 10 is a front view of the elbow of FIG. 9.
Figure 22:
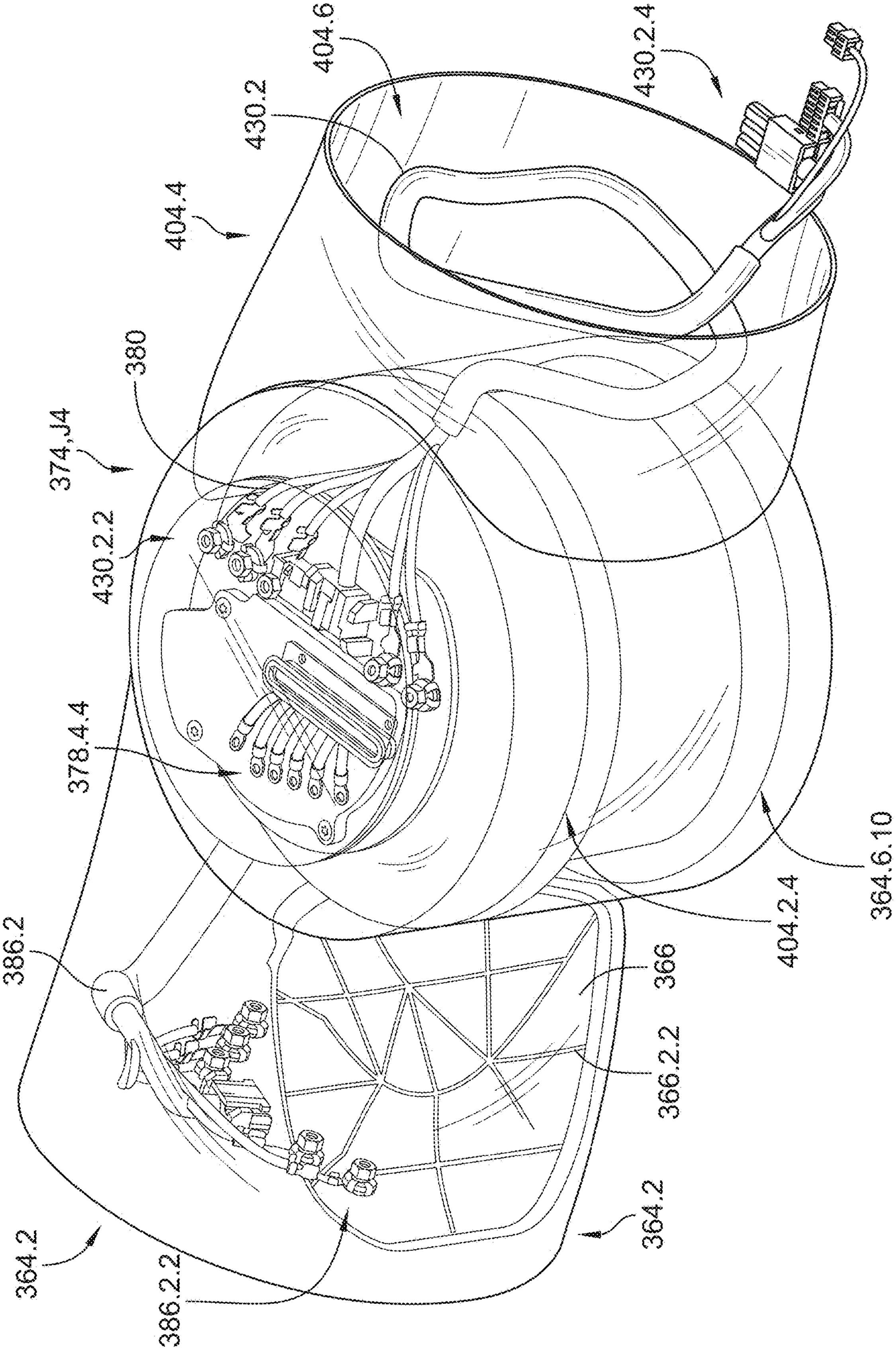
FIG. 22 is a front perspective view of the elbow actuator of FIG. 21.

The lower forearm coupling portion 404.6 of the upper forearm 40 is configured to receive an output end of the lower arm twist actuator assembly (J5) 468 that is secured within the lower forearm housing 462. The lower forearm coupling portion 404.6 may include a coupling wall 404.6.2 and a limiting limiter 404.6.4 within the interior of the lower forearm coupling portion 404.6. The lower arm twist actuator assembly (J5) 468 may include a coupling clamp 473 configured to couple with the coupling wall 404.6.2 and a limiting projection configured to interact with the limiting limiter 404.6.4 of the upper forearm 40. The housing 402 at the lower forearm coupling portion 404.6 is substantially circular with a substantially circular edge 404.6.2.2 at the distal end 402.4 configured to abut and rotate with respect to an edge 464.2.2.2 of the lower forearm actuator receptacle 464.2.2. As such and as shown in FIGS. 9, 15 and 22, the lower forearm coupling portion 404.6 includes an exterior surface that has a curvilinear extent that may be in the form of a U-shape or arch portion that is positioned in the Z-X plane, wherein the Z-X plane is perpendicular to the X-Y plane. The perimeter and/or diameter of the lower forearm coupling portion 404.6 at the edge 404.6.2.2 is substantially the same as the perimeter and/or diameter of the lower forearm actuator receptacle 464.2.2 at the edge 464.2.2.2.

c. Elbow Actuator

As shown in FIGS. 4-15, the elbow actuator (J4) 374 is coupled between the lower humerus 36 and the upper forearm 40. The elbow actuator receiving assembly 364.6 of the lower humerus frame 364 is configured to house a majority of the elbow actuator assembly (J4) 374 and wiring 386. Said elbow actuator receiving assembly 364.6 extends from the lower humerus extender 364.4 and is configured to be positioned adjacent to the housing 402 of the upper forearm 40. The elbow actuator receiving assembly 364.6 may include: (i) an actuator receptacle 364.6.2, (ii) a lower humerus actuator mount 364.6.4, (iii) a forearm opening 364.6.6, (iv) a cover opening 364.6.8, and (v) an actuator cover 364.6.10. The frame 364 may be formed such that the elbow actuator assembly (J4) 374 is received into the actuator receptacle 364.6.2 via the forearm opening 364.6.6 and secured therein to the lower humerus actuator mount 364.6.4. The cover opening 364.6.8 formed opposite the forearm opening 364.6.6 may provide access to the elbow actuator assembly (J4) 374. The actuator cover 364.6.10 can be detachably attached to enclose the housing. For example, the wiring 386, specifically the upper humerus-lower humerus wire bundle 386.2, can extend from between the upper arm twist actuator assembly (J3) 320 and the elbow actuator assembly (J4) 374 via the lower humerus extender 364.4 and be accessed via the cover opening 364.6.8.

Figure 13:
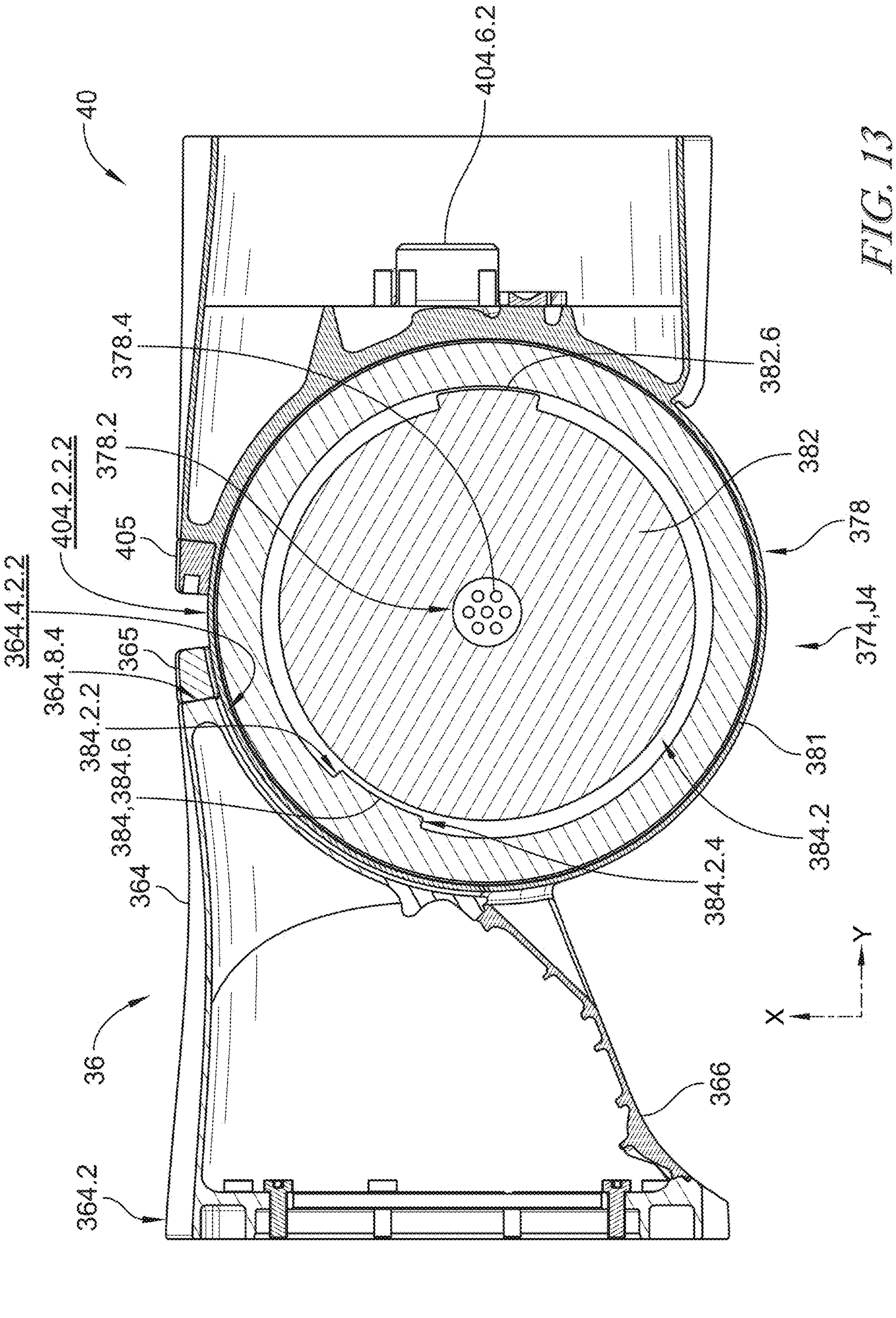
FIG. 13 is cross-sectional view of the elbow taken along line 13-13 of FIG. 10.
Figure 21:
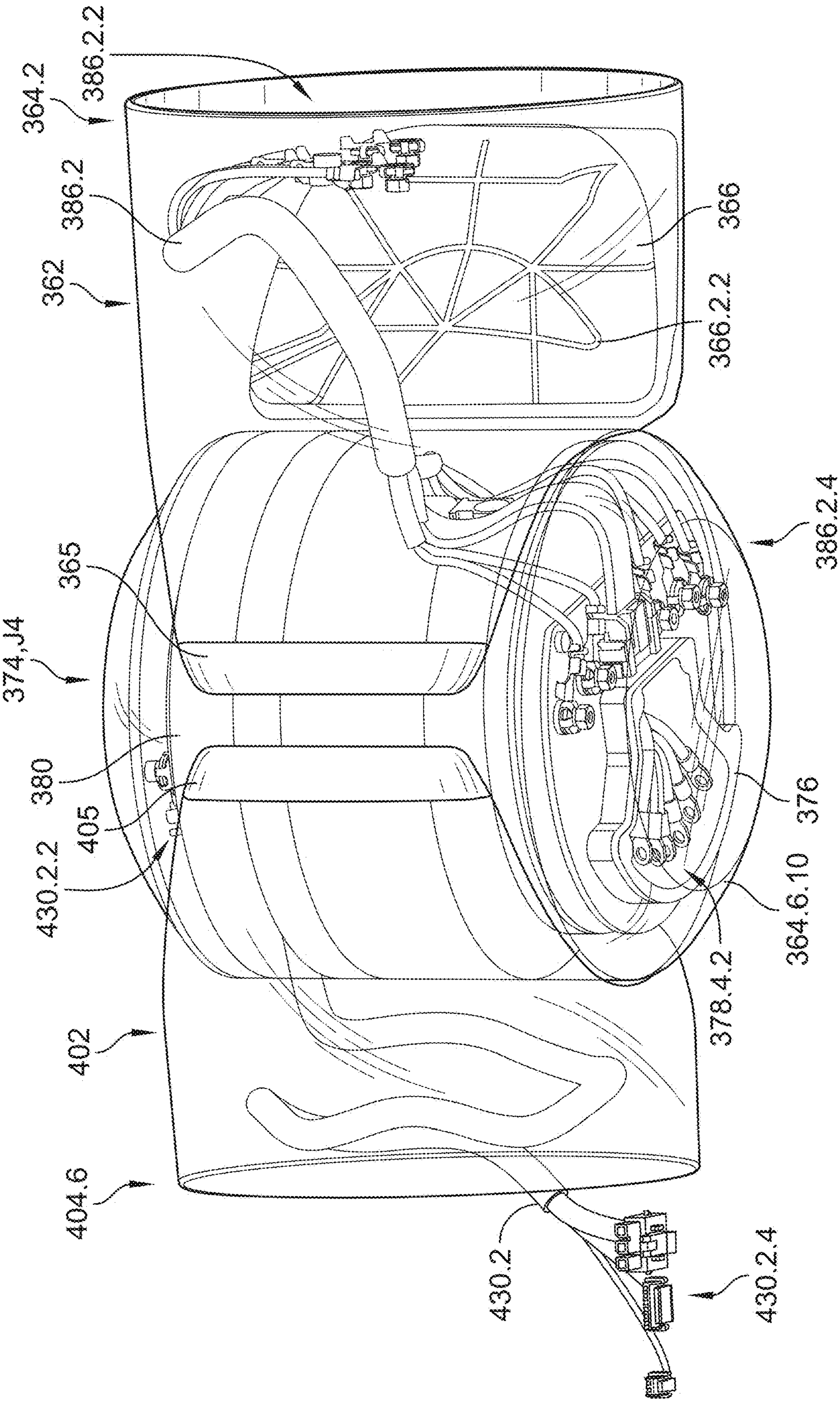
FIG. 21 is a rear perspective view of the elbow of the robot of FIG. 1A, showing the elbow actuator enclosed within the lower humerus and upper forearm, wiring to adjacent actuators, and wherein the lower humerus housing and upper forearm housing are translucent and the respective replaceable deformable members shown.

As shown in at least FIGS. 13, 15 and 21, each of the left and right elbow actuator assemblies (J4) 374 include: (i) an input PCB assembly 376, (ii) an actuator 378, and (iii) an output PCB assembly 380. The elbow actuator 378 includes: (i) a through bore opening 378.2, (ii) internal wiring 378.4, (iii) an output adapter receiver 381, (iv) an output adapter 382, and (v) a limiting adapter 384. The elbow actuator assembly 374 is configured to be coupled to the frame 364 of the lower humerus 36 within the elbow actuator receiving assembly 364.6. The upper forearm housing 402 includes a coupling assembly 404.2 that engages the output of the elbow actuator (J4) 374. The upper forearm coupling assembly 404.2 may include an upper forearm input mount 404.2.2 configured to cooperate with the limiting adapter 384 and accessible via an opening 404.2.6 covered by removable cover 404.2.4. Together, the elbow actuator receiving assembly 364.6 of the lower humerus housing 362 and the coupling assembly 404.2 of the upper forearm housing 402 enclose the elbow actuator (J4) 374.

Figure 11:
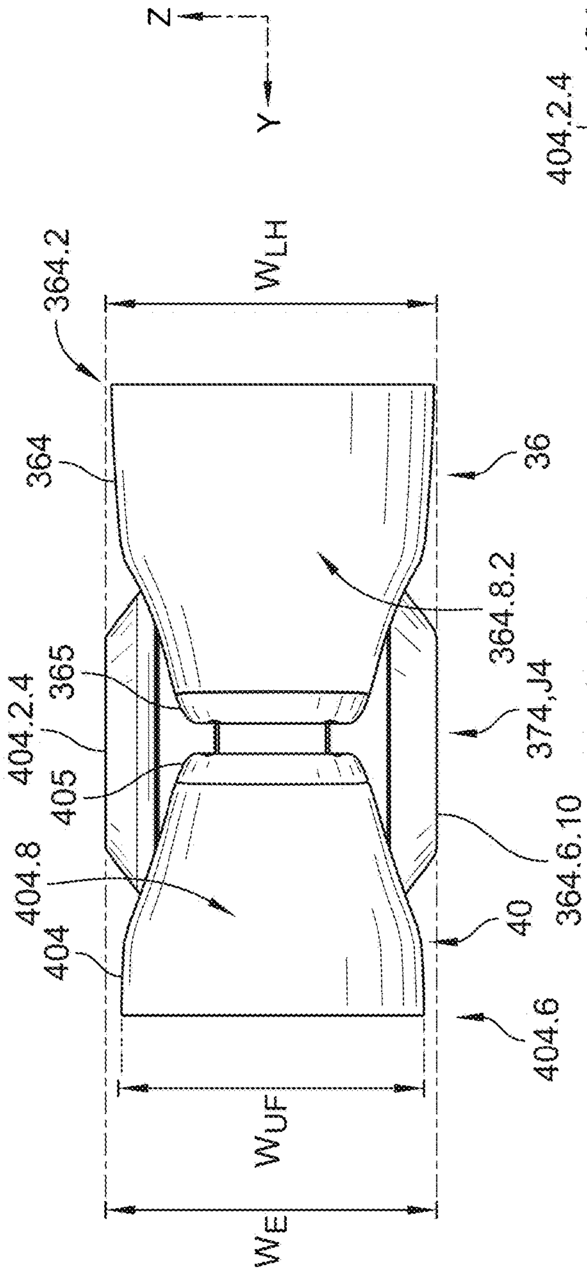
FIG. 11 is a rear view of the elbow of FIG. 9.
Figure 12:
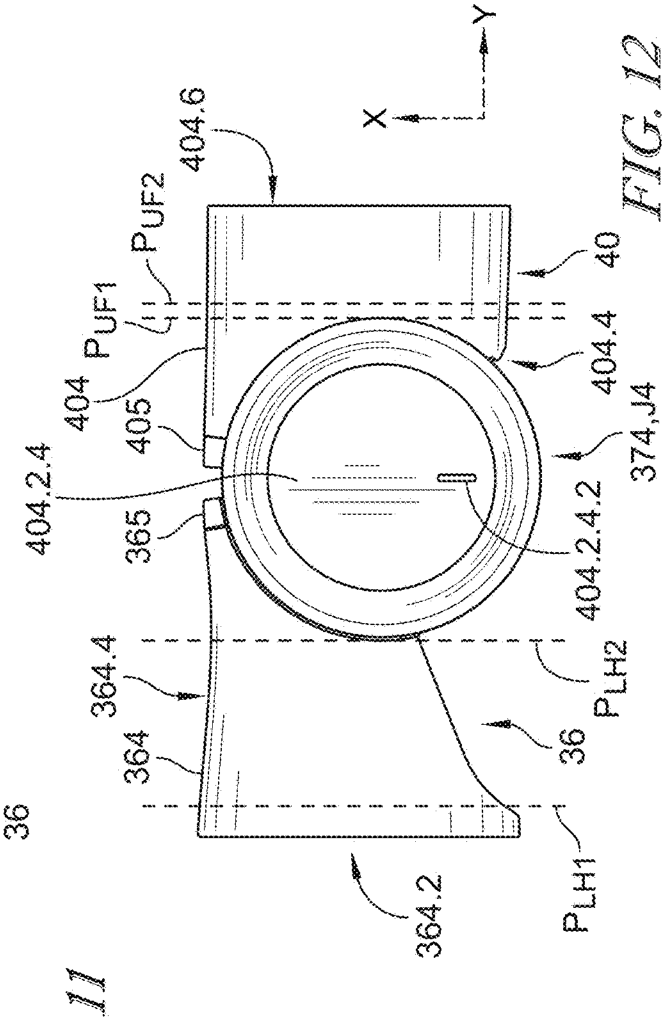
FIG. 12 is a top view of the elbow of FIG. 9.

Referring to FIG. 11, the enclosed elbow actuator (J4) 374 includes covers 364.6.10, 404.2.4 that define two substantially flat surfaces positioned a distance away from one another on opposite sides of the elbow actuator (J4) 374 and defining a width (WE) of the elbow. The width (WE) of the elbow is slightly greater than a width (WUF) of upper forearm, where the width (WUF) is defined by a diameter of the upper forearm 40 at the distal end 404.6.6. The width (WLH) of the lower humerus 36 is substantially the same as the width (WE) of elbow, where the width (WLH) is defined by a diameter of the lower humerus 36 at the proximal end 362.2.

d. Wiring

The wiring (i.e. a single wire or wire set/bundle) to connect, power, and control the actuators does not extend across multiple actuators. Stated another way, said single wire or wire set/bundle does not extend across multiple degrees of freedom. This helps ensure that the electrical power and control wires for each actuator (e.g, actuators J1-J4) are not accidentally pinched, cut, or damaged by the movement of said actuators. The wire bundles are used to connect the electrical current from one side of an actuator to the other side of an actuator, and continue to the next actuator. To avoid a single wire or wire bundle extending across multiple actuators, three sets or bundles of wires are utilized in connection with a single actuator: (i) input wire set/bundle to input PCB, (ii) internal wire set/bundle connecting the input PCB to an output PCB, and (iii) output wire set/bundle from the output PCB board, where the output wire set/bundle from one actuator may be the input wire set/bundle to the next actuator. The power may be connected to either the input or output PCB. Each actuator (e.g., actuators J1-J4) has a fixed input on a frame side and a moving output on the face of the actuator. It should be understood that in other embodiments, other wire configurations or coupling methods may be utilized. For example, said electrical wiring and control wires may be formed within the robot's shell or outer layers. In this example, each actuator would be connected to said shell/outer-based wires using a single bundle of wires. In another example, one or two wire sets/bundles may be utilized instead of three wire sets/bundles. More than three wire sets/bundles (e.g., four to ten) may be used in further alternative embodiments.

Figure 20:
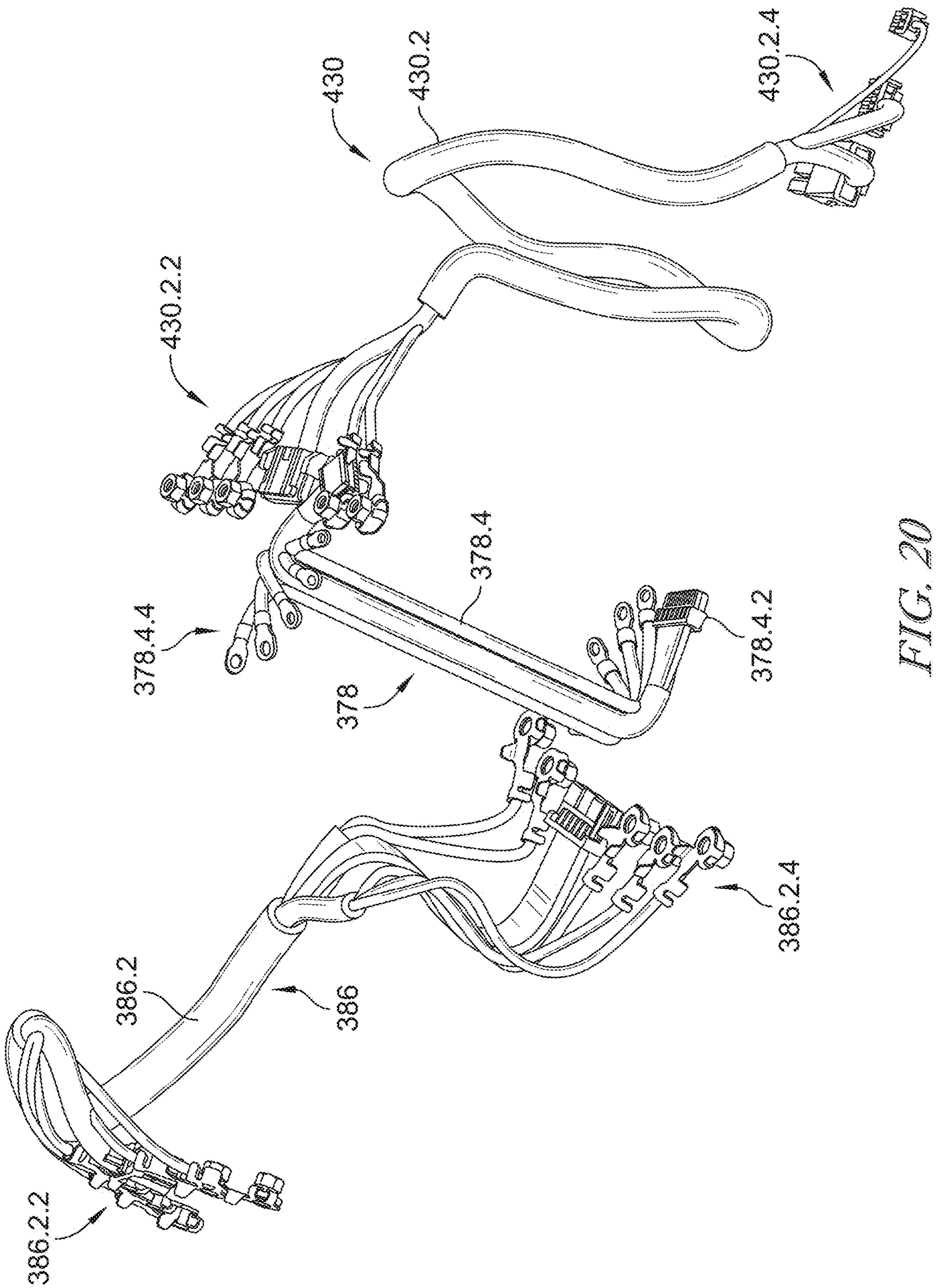
FIG. 20 is a perspective view of the wire bundles for the elbow actuator including wiring connections to adjacent actuators of the robot of FIG. 1A.

For example, as shown in FIG. 20-22, the wiring for elbow actuator (J4) 374 includes: (i) an upper humerus-lower humerus wire bundle 386.2, (ii) an internal wire bundle 378.4, and (iii) a lower humerus-upper forearm wire bundle 430.2. In particular, the upper humerus-lower humerus wire bundle 386.2, can extend from a first plurality of connectors 386.2.2 connected to the upper arm twist actuator (J3) 320 and a second plurality of connectors 386.2.4 connected to the elbow actuator (J4) 374 via the lower humerus extender 364.4 and be accessed via the cover opening 364.6.8. The input PCB 376 of the lower humerus actuator assembly or elbow actuator assembly (J4) 374 is coupled to the output PCB 380 of said lower humerus actuator assembly or elbow actuator assembly (J4) 374 via a bundle of internal wires 378.4 that extend through the internal bore opening 378.2, wherein first and second plurality of connectors 378.4.2, 378.4.4 are connected to respective PCBs 376, 380 (FIGS. 21-22). The lower humerus-upper forearm wire bundle 430.2 can be connected to the lower humerus actuator assembly or elbow actuator assembly (J4) 374 by a first plurality of connectors 430.2.2, extend through the upper forearm extender 404.4, and be configured to be coupled by a second plurality of connectors 430.2.4 to another actuator (e.g., actuator (J5) 468) or distribution board contained in the wrist or hand of the robot 1.

For example, as shown in FIG. 20, the first and second ends (e.g., plurality of connectors 378.4.2, 378.4.4) of the internal wire bundle 378.4 are not designed to be aligned with one another when the actuator is in the normal state. In fact, it is desirable to have the ends offset to one another by a minimum of 10 degrees and preferably more than 50 degrees. In certain embodiments, it is desirable to place the first plurality of connectors 378.4.2 in a position that ensures that an input wire does not kink or bend when contacting the input PCB 376. Based on this location, then it is desirable to rotate the second plurality of connectors 378.4.4 to the middle of the range of motion of said actuator. For example, the first plurality of connectors 378.4.2 may be placed at a first position, the range of motion of the actuator may be 240 degrees, and as such the second plurality of connectors 378.4.4 may be positioned at 120 degrees. This will minimize the amount in either direction that said middle wire may need to rotate during the use of the actuator. In other embodiments, the outer or inner most connectors may be placed at the middle of said rotation of the actuator. And in further embodiments, each and every wire may have substantially the same offset between the first and second connectors regardless of the range of motion of the actuator. Still other embodiments, may require that every set of wire bundles have a different offset between the first and second plurality of connectors 378.4.2, 378.4.4 due to the positional relationship of the input and output boards. In summary, the offsets between the first and second plurality of connectors 378.4.2, 378.4.4 may be based on the range of motion of the associated actuator, may be set to a defined value for all actuators, may vary between actuators due to the positional relationships of the PCBs, may have a different configuration, or a combination of the above.

The above described offsets between the first and second plurality of connectors of said internal wire bundle (e.g., wire bundle 324.4, 378.4) allows the wires to have an integrated twist when the actuator (e.g., J3, J4) is in a neutral position. Said integrated twist may be a helix or any other known type of twist. To enable the wire to move when said actuator moves, it should be understood that each wire (e.g., individual wires and/or cables in FIG. 20) contained within the wire bundle may include multiple conductive wire strands. Specifically, each wire may contain more than 20 and preferably more than 50 wire strands. It should be understood that increasing the number of wire strands within each wire allows said wire to be more flexible, which helps reduce wear on the wire as the actuator is moving (which causes said wire to rotate). The said conductive wire strands may be encased by a non-conductive sleeve.

e. Indicator Lights

In various embodiments, the robot 1 may include an illumination assembly including light emitting assemblies coupled to various housings (e.g., head, feet, hands, knees, elbows, etc.). For example, in the elbow assembly may include one or more lights 364.6.10.2, 404.2.4.2 positioned at the elbow actuator (J4) 374 and coupled to actuator cover 364.6.10 of the lower humerus and/or cover 404.2.4 of the upper forearm 40. The lights 364.6.10.2, 404.2.4.2. can be one light emitter of a plurality of light emitters and/or light emitting assemblies included in an illumination assembly of the robot 1.

For example, the illumination assembly may: (i) emit a light that surrounds the periphery of the frontal shell of the head 10, (ii) emit a light that surrounds the rear edge of the frontal shell of the head 10, (iii) include one or more emitters positioned in other robot parts (e.g., torso, knee, leg, arm, hand etc.). The light emitters enable the robot 1 to communicate with humans without using the display (e.g., display in the head), wherein said light emitters act as or are configured to act as an indicator light. Typically, the light emitters (and in this configuration, indicator lights) can communicate information about the humanoid robot 1 to nearby humans by: (i) emitting light having different wavelengths, wherein said emitted light may be perceived by a nearby human as having different color light, and/or (ii) utilizing illumination sequences, durations, and/or brightness. For example, the indicator lights may be used to communicate the working state (e.g., yellow—600 nm), idle state (e.g., green—550 nm), charging state (e.g., blinking or white), error state (e.g., red—665 nm), thinking (e.g., blue—470 nm), or other general states. This is beneficial because it can limit the information that needs to be displayed on the display and allows a human, robot, or machine to receive information from the robot 1, when the human, robot, or machine is directly to one side of the robot 1 (e.g., a position where the human, robot, or machine could not see the display). Also, the light emitters use less battery power than the display and may be able to relay information more quickly to the human, robot, or machine. Alternatively, the indicator lights can signal an operator to immediately take note of a more complex condition or information that is comprehensively displayed on the display to ensure that an operator properly assesses that complex condition or information for the humanoid robot 1.

In various embodiments, said light emitters include housings having five primary walls that are comprised of: (i) two end walls, wherein said end walls are angled (e.g., at an obtuse angle) relative to the frontal surface of the intermediate cover, (ii) a top wall, (iii) a bottom wall, wherein said bottom wall is angled relative to the frontal surface of the intermediate cover, and (iv) an interior wall, wherein said interior wall is angled (e.g., at an obtuse angle) relative to the frontal surface of the intermediate cover. The angled configuration of the two end walls, bottom wall, and interior wall is designed to: (i) force light out of the housing, and (ii) ensure that the light emitted radiates through a diffuser or lens in a manner that does not let the light scatter broadly, nor does it overly restrict the scattering of the light. In other embodiments, the walls may not be angled relative to the frontal surface of the intermediate cover, the top wall may be angled relative to the frontal surface of the intermediate cover, and/or the angles between the walls and the frontal surface of the intermediate cover may be an acute angle.

E. Elbow Rotation Limiting System

As shown in FIGS. 1 and 23-29, the rotation limiting system 350 of the robot 1 includes: (i) an arrangement of limiting projections of the elbow actuator (j4) 374 (e.g., projection 382.6 of the output adapter 382 and limiting projection 384.6 of the limiting adapter 384), (ii) an elbow protective assembly 352.2, and (iii) an elbow soft stop assembly 354.2. The arrangement of limiting projections 382.6, 384.6 are contained within the housings, while the an elbow protective assembly 352.2, and an elbow soft stop assembly 354.2 are positioned on the exterior of the housings. Specifically, the elbow protective assembly 352.2 is positioned in outer region of the lower humerus 36 and upper forearm 40 near the elbow and includes deformable members 365, 405 that are configured to protect rear portions of the lower humerus 36 and upper forearm 40 in hyperextension. The elbow soft stop assembly 354.2 is positioned in inner region of the lower humerus 36 and includes an arm energy attenuation member 368 coupled to the lower humerus 36, wherein said arm energy attenuation member 368 is configured to compress when the elbow is bent.

Support for the deformable members 365, 405 and an arm energy attenuation member 368 may be provided by projections or other means of mounting that are integrally formed in respective housings or panels coupled to said housings. For example, support for the upper and lower rear deformable members may be provided by projections integrally formed with the frames 364, 404 of the lower humerus 36 and upper forearm 40. Support for the arm energy attenuation member may be provided by an internal elbow cover 366 that is removably coupled to the lower humerus 36. It should be understood that in other embodiments, the panel could be: (i) omitted or integrally formed with an extent of the deformable member or energy attenuation member, or (ii) integrally formed with an extent of the housing or frame. As described above, the elbow actuator (J4) 374 may include internal hard stops that limit the range of motion of the elbow. The deformable members 365, 405 and an arm energy attenuation member 368 may be used in connection with a hard stop or in other embodiments, said members may replace the hard stop. In further embodiments, said deformable members 365, 405 and arm energy attenuation member 368 may be replaced with external or internal hard stops.

The disclosed deformable members 365, 405 and arm energy attenuation member 368 can be sacrificial parts that can be replaced if broken and are designed to reduce safety concerns when the robot is interacting with humans. The rear deformable members 365, 405 may be made from plastic and can have a first density and a first compression/deflection ratio, while the front arm energy attenuation member 368 may include a urethane and can have a second density and a second compression/deflection ratio. The disclosed second density and second compression/deflection ratio may be less, and in certain situations may be substantially less (e.g., more than 50%), than the first density and first compression/deflection ratio. In other embodiments, the arm energy attenuation member 368 may include two extents, wherein the first extent or region having a first density and a first compression/deflection ratio and the second extent or region having a second density and a second compression/deflection ratio. The second density and a second compression/deflection ratio are greater than the first density compression/deflection ratio. In this embodiment, the second extent or region is positioned adjacent to the panel, shin frame, or shin housing and is surrounded by the first extent or region. The deformable members 365, 405 and arm energy attenuation member 368 provide a substantial advantage over conventional robot arms that lack these features.

Finally, the disclosed elbow protective assembly 352.2 and elbow soft stop assembly 354.2 includes disposable or sacrificial parts designed to be used for a period of time and then when damaged. For example, said deformable members 365, 405 and an arm energy attenuation member 368 are designed to protect structural members of the lower humerus 36 and upper forearm 40 at the elbow. Similarly, the arm energy attenuation member 368 protects the lower humerus 36 and upper forearm 40. These disposable or sacrificial parts are located in a position likely to receive high amounts of wear and tear, and are made from a material that hides scratches and is more deformable than metal. These disposable or sacrificial parts provide the disclosed elbow assembly with substantial advantages over conventional robot arm or elbow that lack these disposable or sacrificial parts.

a. Integrated Limiting Projections

As shown in FIG. 13, the arrangement of limiting projections includes (i) a projection 382.6 of the output adapter 382 and (ii) a limiting projection 384.6 of the limiting adapter 384. In particular, the output adapter 382 includes: an upper forearm output mount 382.4 having a mounting surface 382.4.2, an opening 382.4.4, and projection 382.6. The mounting surface 382.4.2 of the actuator assembly (J4) 374 is configured to abut the actuator mount 404.2.2 of the coupling assembly 404.2 in the upper forearm 40. The projection 382.6 is configured to be positioned within the lower humerus output adapter receiver 381, wherein said receiver 381 is positioned adjacent to the actuator bearing 378.6. The limiting adapter 384 is positioned adjacent to an extent of the output adapter 382 and is secured to an extent of the actuator (J4) 374 using a coupling means (e.g., threaded fasteners or any other coupling structure disclosed herein). The limiting adapter 384 includes a groove 384.2 that is designed to receive the limiting projection 382.6 of the output adapter 382. Although the groove 384.2 includes a limiting projection 384.6 having a maximum wall 384.2.2 and a minimum wall 384.2.4 configured to interact with the limiting projection 382.6 of the output adapter 382, the configuration of housings 362, 402 includes external deformable members 365, 405 that reduces the likelihood of the limiting projection 382.6 from engaging with the maximum wall 384.2.2 and the minimum wall 384.2.4.

b. Elbow Protective Assembly

Figure 14:
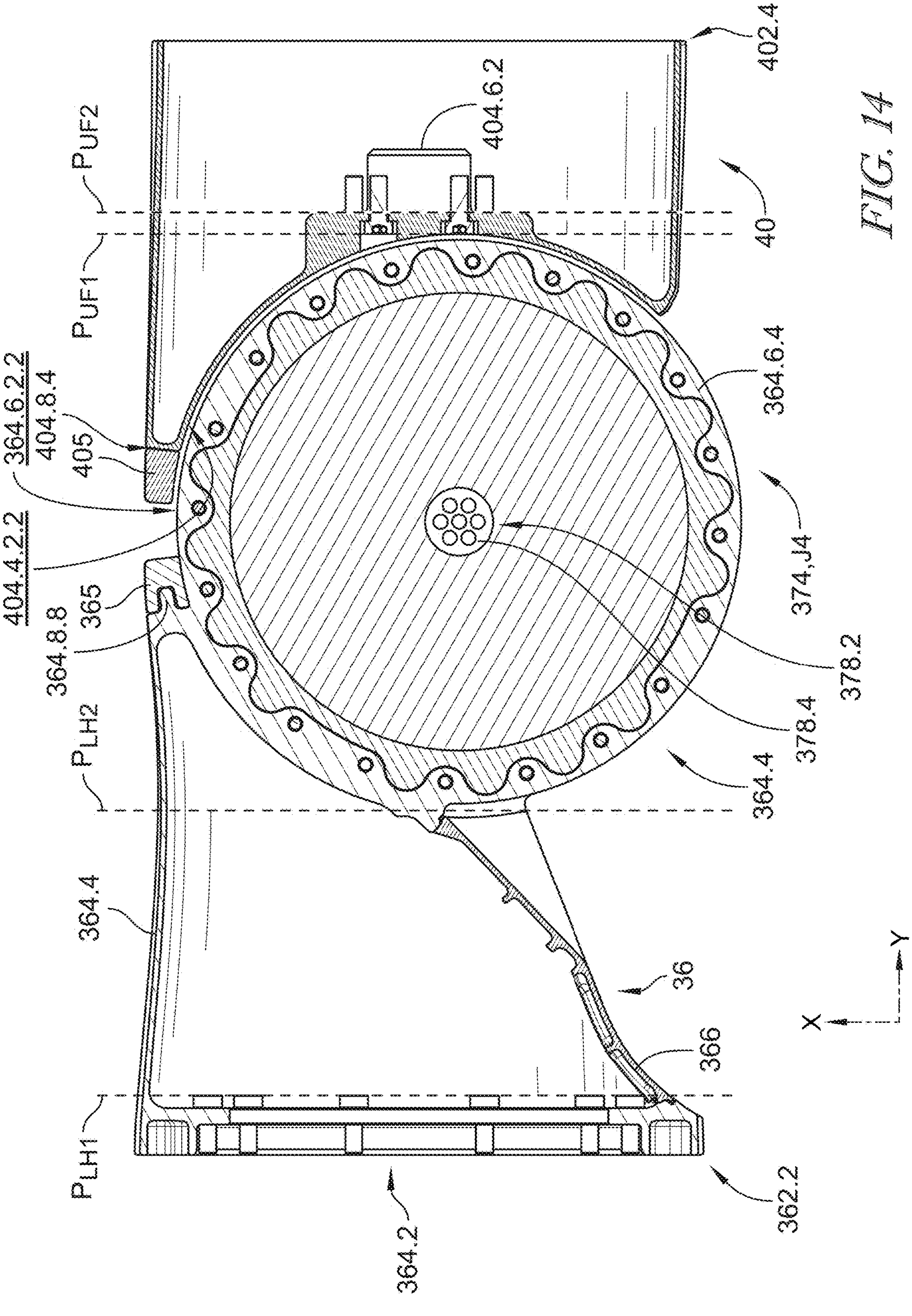
FIG. 14 is cross-sectional view of the elbow taken along line 14-14 of FIG. 10.
Figure 16:
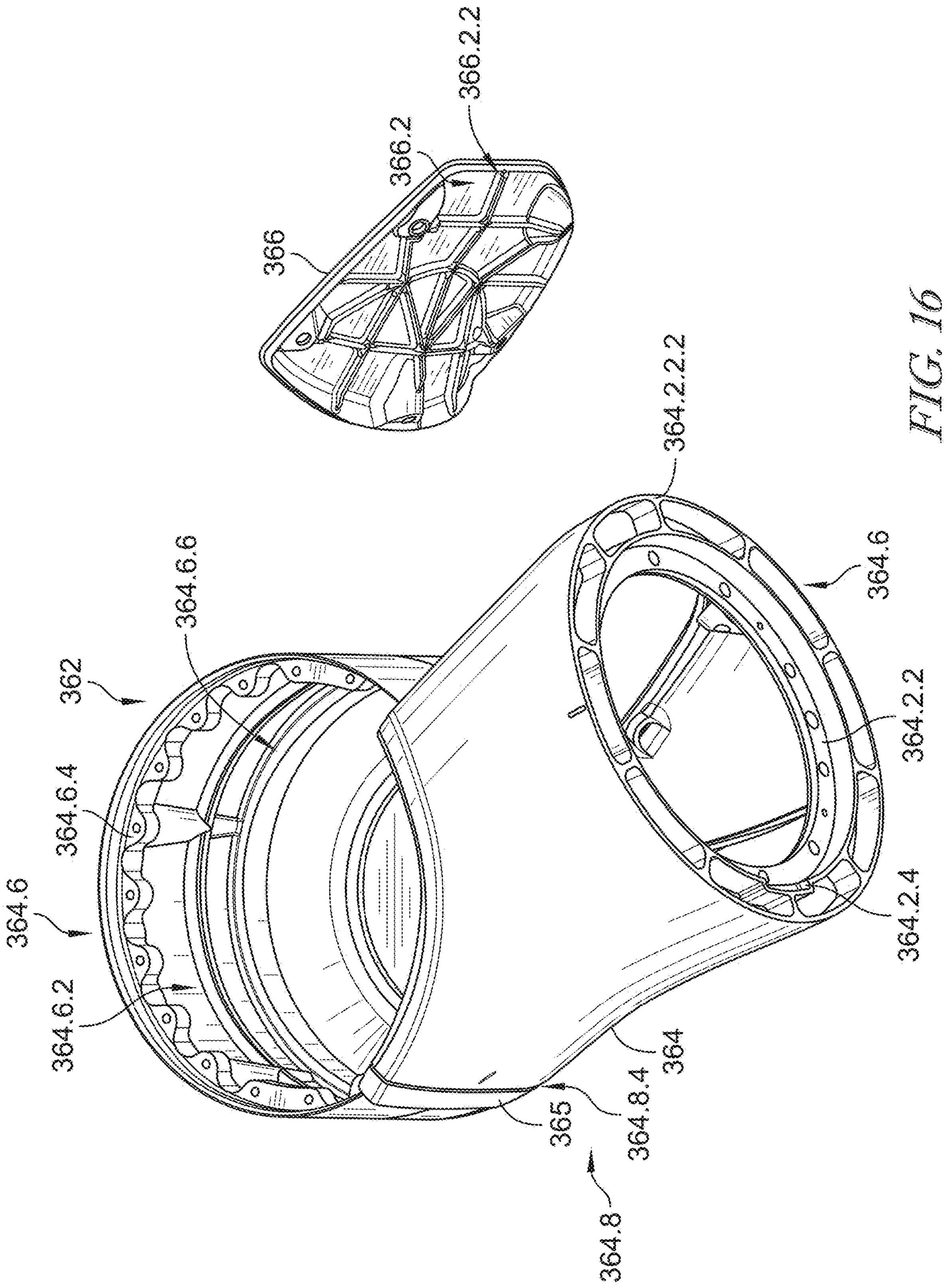
FIG. 16 is a perspective exploded view of the lower humerus housing of FIG. 15 showing a frame and an internal elbow cover.

Referring to FIGS. 11-14 and 24-29, the elbow protective assembly 352.2 includes a deformable member 365 coupled to the rear portion of the lower humerus 36 and a deformable member 405 coupled to the rear portion of the upper forearm 40. As shown in FIGS. 14-16, an external extent of the lower humerus housing 362 includes an end stop mount 364.8 for coupling a replaceable upper deformable member 365. The lower humerus housing 362 is shaped such that an external surface portion 364.8.2 tapers from the lower humerus coupling assembly 364.2 to member mounting surface 364.8.4 positioned at an extent of the elbow actuator receiving assembly 364.6. The member mounting surface 364.8.4 is configured to receive the replaceable upper deformable member 365 that is fastened to the member mounting surface 364.8.4. The member mounting surface 364.8.4 may also have an end stop projection 364.8.8 extending from the surface that is configured to mate with the replaceable upper deformable member 365. The end stop projection 364.8.8 may be made of the same or different material as the housing 362.

Similarly, as shown in FIG. 19, an external extent of the upper forearm housing 402 includes an end stop mount 404.8 that faces the end stop mount 364.8 of the lower humerus 36. The upper forearm housing 402 is shaped such that an external surface portion 404.8 tapers from the lower forearm coupling assembly 404.6 to a member mounting surface 404.8.4 positioned along an extent of the upper forearm coupling assembly 404.2. The member mounting surface 404.8.4 is configured to receive a replaceable lower deformable member 405 that is fastened to the member mounting surface 404.8.4. The member mounting surface 404.8.4 may also have an end stop projection 404.8.8 extending from the surface that is configured to mate with the replaceable lower deformable member 405. The end stop projection 404.8.8 may be made of the same or different material as the housing 402.

The external end stop mounts 364.8, 404.8 are formed such that the member mounting surfaces 364.8.4, 404.8.4, and attached replaceable deformable members 365, 405, are substantially parallel to the axis of rotation of the elbow actuator (J4) 374. Replaceable deformable members 365, 405 are spaced apart when the arm is in an initial position, without flexing or extending the arm about the elbow. The end stop mounts 364.8, 404.8 and attached replaceable deformable members 365, 405 are configured such that when the elbow is hyperextended, the replaceable deformable members 365, 405 impact each other, which limits further movement. The deformable members 365, 405 may be made from any material, preferably deformable, which includes plastics or polymers, and the energy absorbing materials listed with respect to the energy attenuation member 368 below.

c. Elbow Soft Stop Assembly

As best shown in FIGS. 23-26, the elbow soft stop assembly 354.2 of the robot 1 includes an arm energy attenuation member 368 coupled to a front portion of the lower humerus 36 and is positioned in a front or internal region of the arm that is adjacent to the elbow. Said frontal portion of the lower humerus housing 362 includes an internal elbow cover 366 that is removably coupled to the frame 364 of the lower humerus housing 362. The internal elbow cover 366 is configured to be removed to access the lower humerus input mount 364.2.2. The interior surface 366.2 of the cover 366 includes ribs 366.2.2 to increase the stiffness of said cover 366. In other embodiments, the ribs 366.2.2 may be omitted, their thickness may be increased, or fewer ribs may be used. Additionally, it should be understood that in other embodiments, the cover 366 may be omitted and instead it may be integrally formed as a part of the frame 364. The exterior surface 366.4 of the cover may include or be coupled to an arm energy attenuation member 368 configured to absorb energy.

Figure 26:
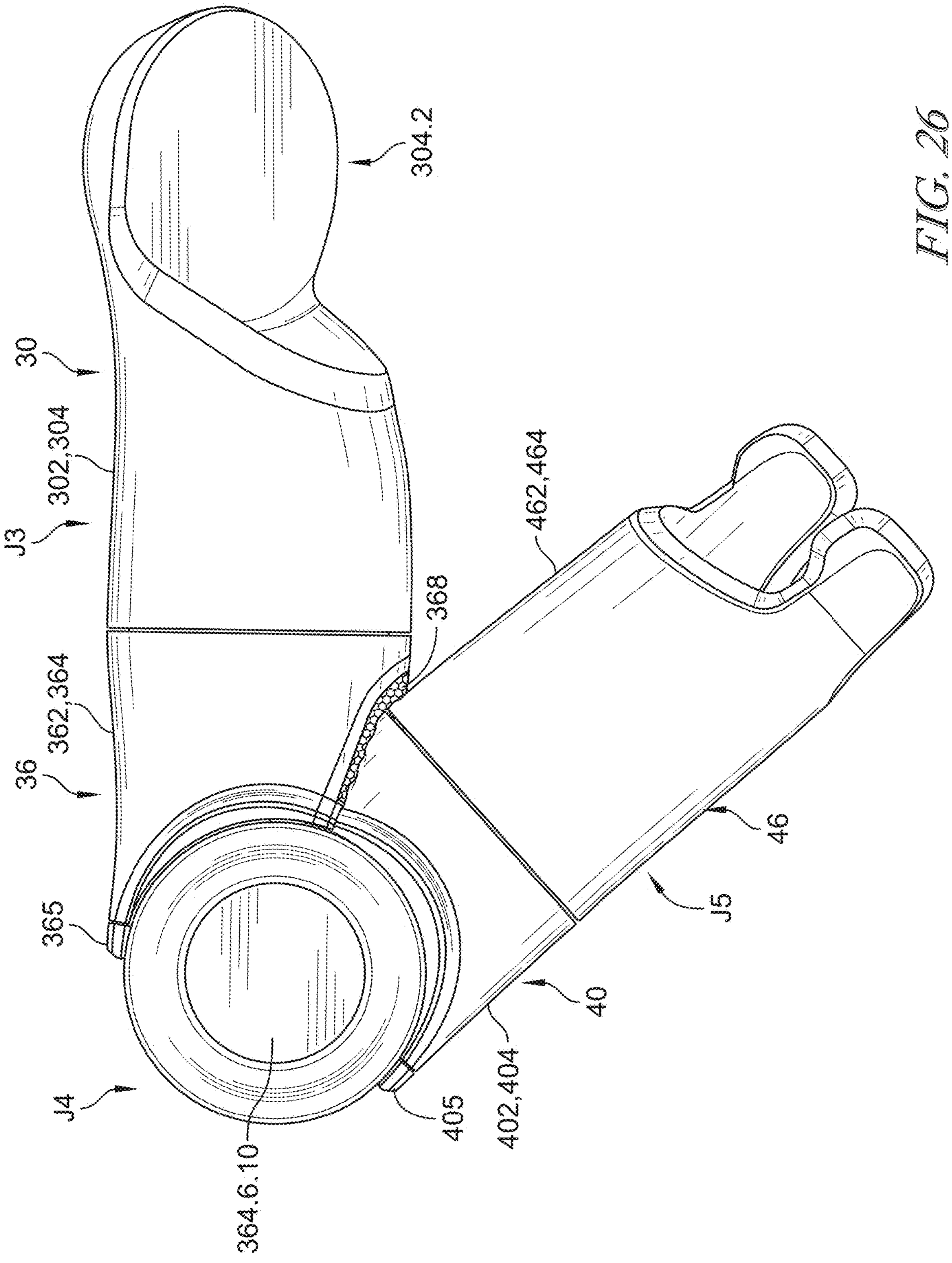
FIG. 26 is a top view of the elbow of FIG. 25, wherein the arm is in a fully flexed position and the front energy attenuation member is compressed.

The arm energy attenuation member 368 is configured to contact a front portion of the upper forearm 40 when the robot 1 bends its elbow. As described above, the inclusion of said energy attenuation member 368 increases the range of motion of the robot's elbow and gives the robot a human-like configuration. The arm energy attenuation member 368 is configured such that when the arm is bent at the elbow, the arm energy attenuation member 368 compresses to limit the movement of the upper forearm 40 toward the lower humerus 36. For example, as shown in FIG. 26, said deformable member 368 is configured to be compressed to its fullest extent in this configuration (when the arm is in the fully flexed position). Said compression of the arm energy attenuation member 368 in this configuration limits the movement of the lower forearm 46 toward the upper humerus 30.

The arm energy attenuation member 368 and deformable members 365, 405 may include one or more energy absorbing materials, including any of the below-listed materials, structures or any known material. The arm energy attenuation member 368 may be made of one energy attenuating material and the rear deformable members 365, 405 may be made of another energy attenuating material. In some embodiments, the arm energy attenuation member 368 may be made of a material of a first density and the rear deformable members 365, 405 may be made of the same material of a second density. In various embodiments, the arm energy attenuation member 368 may be made of energy attenuating materials that are of different densities. For example, the arm energy attenuation member 368 may be made from an energy attenuating material of two different densities.

The arm energy attenuation member 368 and deformable members 365, 405 may include one or more energy absorbing materials, including any of the below-listed materials, structures or any known material. The arm energy attenuation member 368 and deformable members 365, 405 can be made of non-rigid, deformable, compressible, energy absorbing, or other materials. In one example, the arm energy attenuation member 368 can be made of two different densities of polyurethane. In other examples the arm energy attenuation member 368 can be made from and/or include: (i) polymers (e.g., polyethylene foam (PE Foam), ethylene vinyl acetate (EVA) foam, polyurethane foam (including Memory Foam and Open-cell Polyurethane Foam), polyimide foam, polyvinyl chloride (PVC) foam, expanded polypropylene (EPP) foam, cross-linked polyethylene foam (XLPE), polyethylene terephthalate (PET) Foam), (ii) rubber foams (e.g., neoprene foam, silicone rubber foam, nitrile butadiene rubber (NBR) foam, ethylene propylene diene monomer (EPDM) foam, vinyl nitrile foam, thermoplastic elastomer (TPE) foam, elastomeric foam), (iii) natural foams, (iv) engineered foams (e.g., microcellular urethane (MCU) foam, reticulated polyurethane foam, melamine foam, convoluted foam), (v) composite and hybrid materials (e.g., multi-layered foams, fiberglass foam composites, metalized foam composites), (vi) expanded polystyrene (EPS), (vii) expanded polypropylene (EPP), (viii) Koroyd®, (ix) D30®, (x) Poron® XRD, (xi) thermoplastic elastomers (TPE), (xii) thermoplastic polyurethane (TPU), (xiii) any other known plastics, (xiv) any combination of the above, and/or (xv) any other material known to one of skill in the art. Further, the energy attenuation member 368 may include any known structure of said materials, wherein said structures may include lattices, non-repeating units, and/or repeating units (e.g., cube, sphere, cylinder, cone, pyramid, torus, prism, tetrahedron, dodecahedron, octahedron, icosahedron, ellipsoid, paraboloid, cuboid, hexahedron). It should be understood that the repeating unit or lattice cell may be contained in a specific region or may propagate throughout the energy attenuation member 368. As such, the arm energy attenuation member 368 may include multiple different regions that each include a unique selection of: (i) material, including its chemical composition, (ii) properties, including mechanical and/or material based, (iii) shape, including lattice cells (e.g., surface or strut based) or material based shapes (e.g., pores materials), (iv) arrangements of shapes, (v) etc. For example, variations between materials, properties, shapes, and/or arrangement of said shapes can be optimized through computer simulation (FEA) to optimize the energy attenuation member or assembly for local loading conditions.

Other embodiments of the energy attenuation members may combine various advanced materials and architectural designs to absorb and dissipate impact energy across multiple scales. In one embodiment, multi-layered composite structures may incorporate phase-change materials (PCMs), such as microencapsulated paraffin wax embedded within high-performance polymer matrices. These PCMs absorb energy during thermal transitions from solid to liquid states, with the encapsulation size and concentration tuned to specific load conditions. Similarly, functionally graded materials (FGMs) or other multi-layered assemblies may be utilized, wherein the material composition or layers vary—from a stiff, impact-resistant outer layer to soft, more compliant, energy-dissipative inner core—to optimize load distribution. Alternatively, the FGMs or multi-layered assemblies may vary from soft, more compliant outer layer to stiff, impact-resistant inner core. Further and as discussed above, the FGMs or multi-layered assemblies' material composition or layers vary in stiffness or have other properties that vary laterally. In summary, said stiffness or other properties of the energy attenuation member or assembly may vary across the depth of the member, laterally across the width, vertically across the height, or any combination thereof. Such FGMs or multi-layered assemblies can be further enhanced by incorporating gradient nanocomposites, where nanoparticles or nanofibers are dispersed in controlled gradients to tailor mechanical responses. In other examples, FGMs or multi-layered assemblies may include alternating layers of rigid and flexible materials to dissipate impact forces. Further, these composite attenuation members may be strategically located in critical regions, such as joints, limb segments, and torso sections, where localized energy dissipation is most needed.

Additional embodiments integrate adaptive damping mechanisms using smart fluids and electromechanical components. For example, magnetorheological (MR)) fluids or magnetorheological elastomers (MREs) are contained within flexible pouches or embedded channels; when subjected to controlled magnetic fields generated by integrated coils, their viscosity or stiffness rapidly increases, enabling real-time adjustment of damping properties.

Additionally, or alternatively, the energy attenuation members may include compressible chambers with optional microfluidic networks, and wherein said chambers may be filled with hydrogel, air, or any other liquid or gas. Further enhancements include shear thickening fluids (STFs) impregnated in flexible fabrics, which instantly stiffen under high strain rates, and electroactive polymers that modify their mechanical properties upon exposure to electrical stimuli. Finally, said energy attenuation members may include: (i) origami-inspired folding structures could be integrated into the attenuation members, wherein the structures are designed to allow for controlled deformation and energy absorption, (ii) sacrificial structures designed to plastically deform or fracture in a controlled manner during high-energy impacts, and/or (iii) Kirigami-inspired structures that include engineered cut patterns that are designed to allow for controlled out-of-plane deformation and energy absorption, while maintaining in-plane flexibility. Wherein said structures are intended to be replaceable.

F. Kinematics of the Elbow

FIGS. 25-29 generally relate to the range of motion and associated kinematics of the arm 5 about the elbow of the robot 1. The elbow actuator (J4) 374 is configured to bend in a manner to substantially mimic the movements of a human. In particular, the elbow assembly including the lower humerus 36 and upper forearm 40 are coupled about the elbow actuator (J4) 374. The lower forearm 46, wrist 50, and hand 56 extend from the upper forearm 40 and move with respect to the lower humerus 36. The disclosed arm includes a range of motion greater than 80 degrees, preferably greater than 120 degrees, and most preferably between 140 degrees and 160 degrees. This range of motion allows said arm assembly to be placed in flexion between 1-140 degrees and hyperflexion between 1 and 20 degrees.

Figure 23:
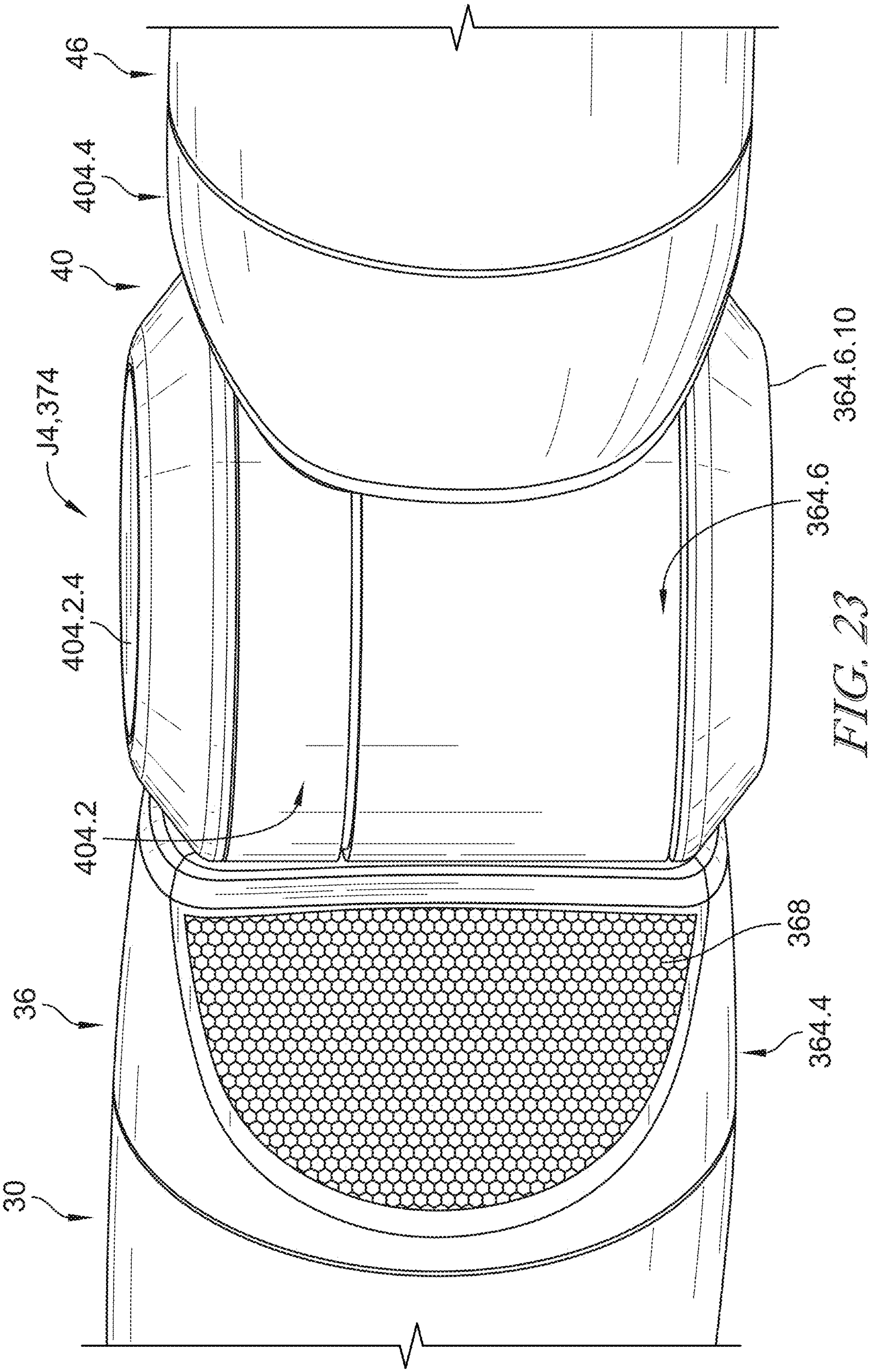
FIG. 23 is a front perspective view of the elbow of FIG. 1A, wherein the arm is in an initial position and showing the front energy attenuation member or internal soft stop.
Figure 24:
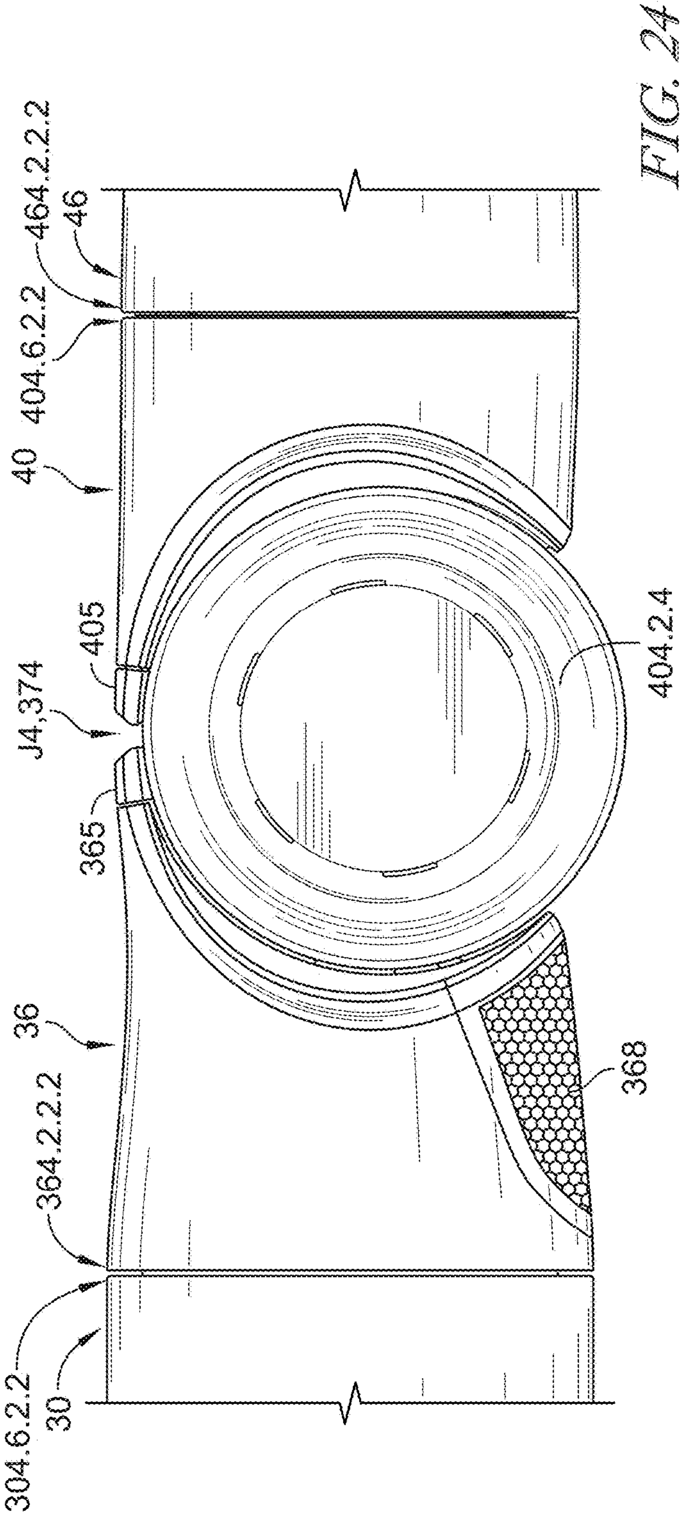
FIG. 24 is a top view of the elbow of FIG. 23, showing the front energy attenuation member and the rear deformable members.
Figure 27:
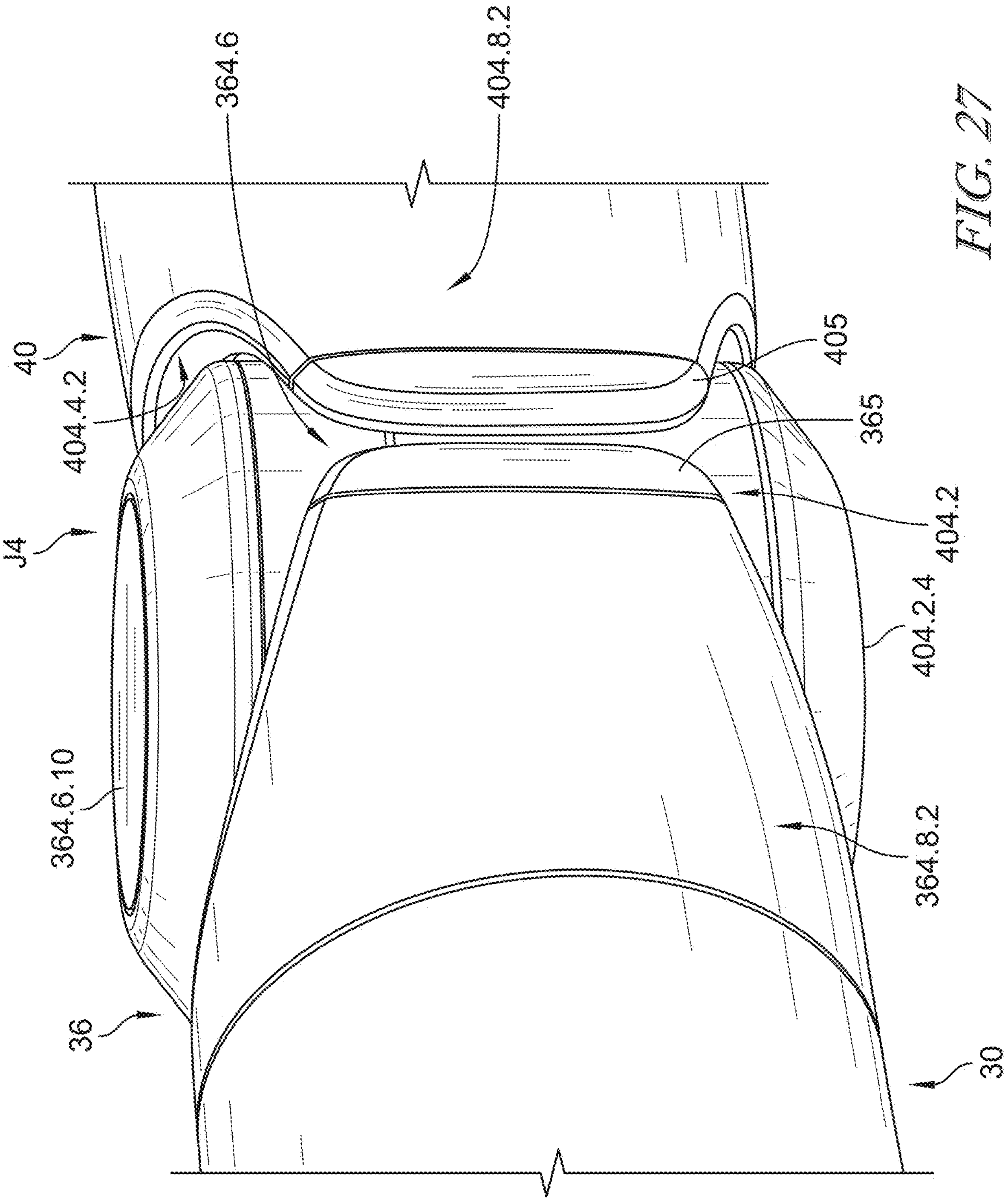
FIG. 27 is a rear perspective view of the elbow of FIG. 1A, wherein the arm and the rear or external deformable members are in an initial position.

In FIG. 1B, the robot 1 is shown with the arm 5 in an extended position, where the arms are fully extended on the sides of the robot 1 and palms of the hands 56 facing forward. This position is also considered an initial position of the arm 5, for the purpose of describing the movement about the elbow of the robot 1, where the rotational axes $A_3$, As of the arm twist actuator (J3) 320 and the lower arm twist actuator (J5) 468 are aligned and define the arm axis $A_A$. In this position, the elbow actuator (J4) 374 is positioned such that the rotational axis $A_4$ is perpendicular to the ground or support surface of the robot 1 and parallel to the sagittal and coronal planes. The arms 5 are oriented such that a front portion of the lower humerus 36 including energy attenuation member 368 and a front portion of the upper forearm 40 are forward facing, as shown in FIG. 23, and the rear deformable members 365, 405 are facing rearward, as shown in FIG. 27. Also shown in FIG. 24 in the initial position, a top view of the elbow. In this example, when the elbow actuator (J4) 374 rotates (clockwise) to move the upper forearm 40 toward the lower humerus 36, the elbow is in a flexion position. On the contrary, when the lower forearm 40 rotates in the opposite (counter-clockwise) a short distance about rotational axis $A_4$ before the rear deformable members 365, 405 contact each other, placing the elbow in a hyperextended state. For example, the elbow range of motion ranges from about −1 to −162 degrees (flexed), to normal at 0 degrees, to about 1 and 18 degrees (hyperextended).

Figure 25:
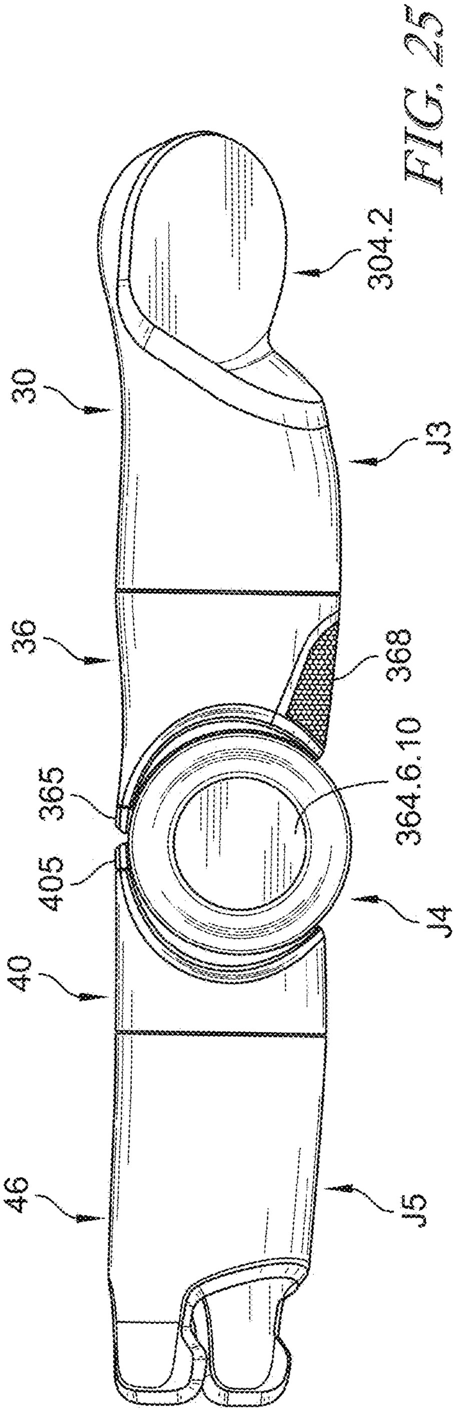
FIG. 25 is a top view of the elbow of FIG. 1A, wherein the arm is in an initial position.

In FIG. 25, the arm assembly 5 of the robot 1 is shown in an initial position. As shown in FIG. 26, the arm is considered in a flexion position as the elbow bends the forearm 40 inward toward the lower humerus 36. When the upper forearm 40 contacts the energy attenuation member 368 of the lower humerus 36, the arm 5 may continue to bend until a second range of motion limit, as shown in FIG. 26. The energy attenuation member 368 temporarily deforms with compression and may return to a previous form when the lower humerus 36 and upper forearm 40 are no longer in contact. In this example, compression of the deformable member 368 begins at about 80 degrees and continues until the range of motion limit, at about 135 degrees.

Figure 28:
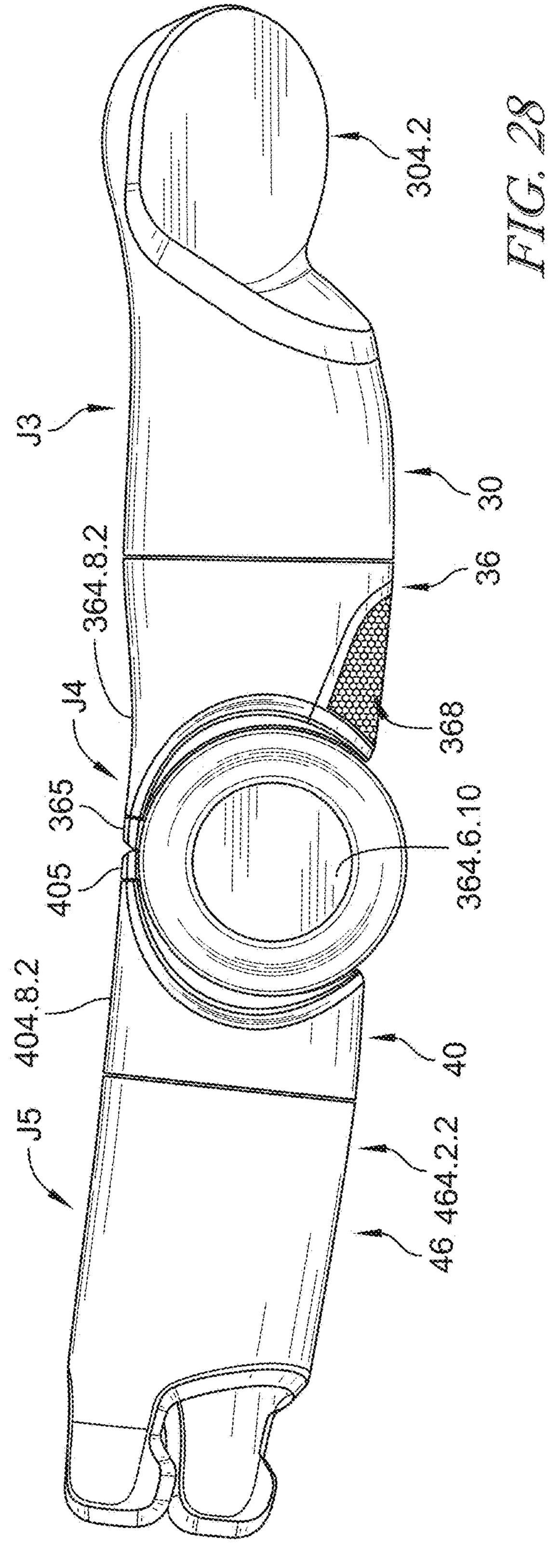
FIG. 28 is a top view of the elbow of FIG. 1A, wherein the arm is in a hyperextended position.
Figure 29:
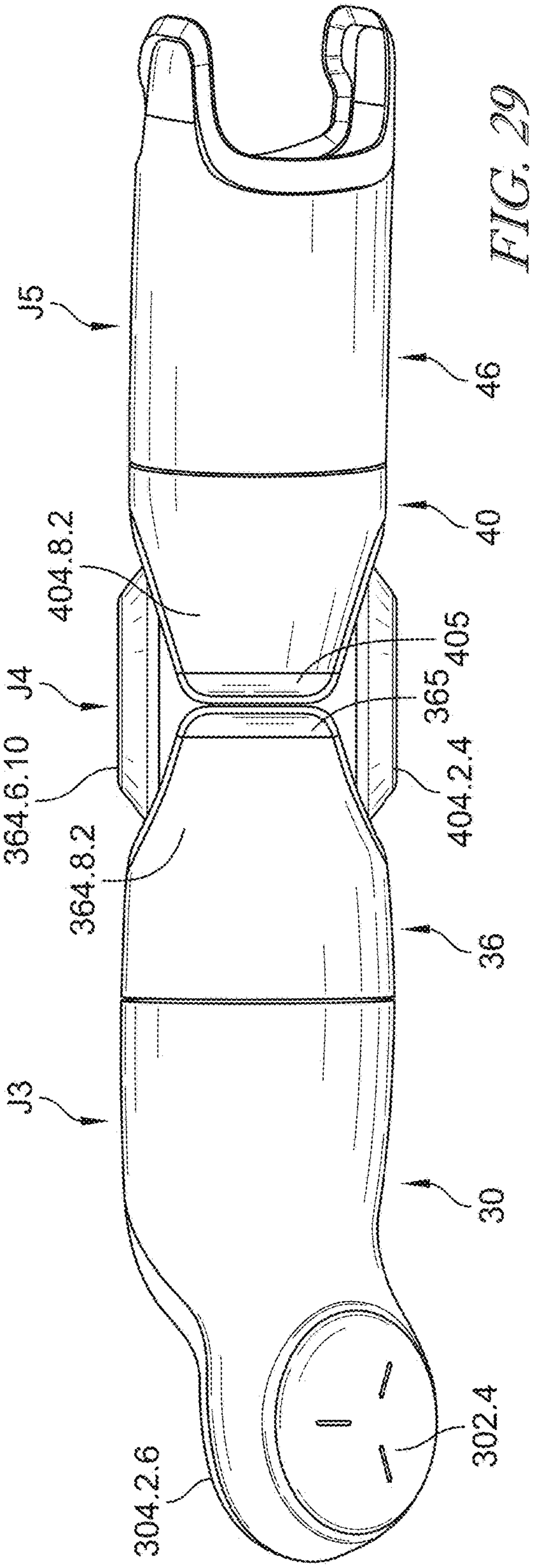
FIG. 29 is a rear view of the elbow of FIG. 28.

FIGS. 28-29 show the arm assembly in a hyperextended position, where the forearm is moved in the opposite direction until the range of motion limit, when the deformable members 365, 405 impact each other, at about at least 5 degrees, preferably at least 10 degrees, and most preferably at least 15 degrees. In other words, the total range of motion of the can be about 180 degrees, preferably 165 degrees, and most preferably between 140 degrees and 160 degrees.

G. Industrial Applications

While the disclosure shows illustrative embodiments of a robot (in particular, a humanoid robot), it should be understood that embodiments are designed to be examples of the principles of the disclosed assemblies, methods and systems, and are not intended to limit the broad aspects of the disclosed concepts to the embodiments illustrated. As will be realized, the disclosed robot, and its functionality and methods of operation, are capable of other and different configurations and several details are capable of being modified all without departing from the scope of the disclosed methods and systems. For example, one or more of the disclosed embodiments, in part or whole, may be combined with a disclosed assembly, method and system. As such, one or more steps from the diagrams or components in the Figures may be selectively omitted and/or combined consistent with the disclosed assemblies, methods and systems. Additionally, one or more steps from the arrangement of components may be omitted or performed in a different order. Accordingly, the drawings, diagrams, and detailed description are to be regarded as illustrative in nature, not restrictive or limiting, of said humanoid robot.

While the above-described methods and systems are designed for use with a general-purpose humanoid robot, it should be understood that the assemblies, components, learning capabilities, and/or kinematic capabilities may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems. The robot system may include one or more sensors (e.g., cameras, temperature, pressure, force, inductive or capacitive touch), motors (e.g., servo motors and stepper motors), actuators, biasing members, encoders, housing, or any other component known in the art that is used in connection with robot systems. Likewise, the robot system may omit one or more sensors (e.g., cameras, temperature, pressure, force, inductive or capacitive touch), motors (e.g., servo motors and stepper motors), actuators, biasing members, encoders, housing, or any other component known in the art that is used in connection with robot systems.

In other embodiments, other configurations and/or components may be utilized. As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as the main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It should also be understood that substantially utilized herein means a deviation less than 15% and preferably less than 5%. It should also be understood that near means within 10 cm, proximate means within 5 cm, and adjacent means within 1 cm. It should also be understood that other configuration or arrangements of the above-described components is contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

In this Application, to the extent any U.S. patents, U.S. patent applications, or other materials (e.g., articles) have been incorporated by reference, the text of such materials is only incorporated by reference to the extent that they do not conflict with materials, statements and drawings set forth herein. In the event of such conflict, the text of the present document controls, and terms in this document should not be given a narrower reading in virtue of the way in which those terms are used in other materials incorporated by reference. It should also be understood that structures and/or features not directly associated with a robot cannot be adopted or implemented into the disclosed humanoid robot without careful analysis and verification of the complex realities of designing, testing, manufacturing, and certifying a robot for completion of usable work nearby and/or around humans. Theoretical designs that attempt to implement such modifications from non-robotic structures and/or features are insufficient (and in some instances, woefully insufficient) because they amount to mere design exercises that are not tethered to the complex realities of successfully designing, manufacturing and testing a robot.

The invention claimed is:

1. A humanoid robot comprising:

an upper region including a torso and at least one arm assembly operably connected to the torso, and wherein when said arm assembly is in an extended state, the arm assembly includes:

an upper arm twist actuator assembly with a rotational upper arm twist axis;

a lower humerus with: (i) a lower humerus extender operably coupled to the upper arm twist actuator assembly and having a lower humerus center, and (ii) an elbow actuator mating assembly integrally formed with an extent of the lower humerus extender, and wherein an extent of the elbow actuator mating assembly has a curvilinear external surface;

an upper forearm with: (i) an upper forearm coupling assembly that includes an external surface having a curvilinear extent that resides within a first plane, and (ii) an upper forearm extender integrally formed with an extent of the upper forearm coupling assembly and that includes an upper forearm center and an external surface having a curvilinear extent that resides within a second plane that is oriented perpendicular to the first plane; and an electric elbow actuator having: (i) an elbow axis that is offset from a plane that extends between the lower humerus center and the upper forearm center, (ii) a first extent positioned within a portion of the elbow actuator mating assembly, and (iii) a second extent positioned within a portion of the upper forearm coupling assembly, and wherein said elbow actuator mating assembly and said upper forearm coupling assembly collectively surround a majority of said electric elbow actuator.

2. The humanoid robot of claim 1, wherein a majority of the upper arm twist actuator assembly is located external to the lower humerus.

3. The humanoid robot of claim 1, wherein the arm assembly includes an energy attenuation member adapted to compress to limit movement of the upper forearm towards the lower humerus.

4. The humanoid robot of claim 1, wherein the electric elbow actuator includes a through bore opening formed through the electric elbow actuator, and wherein a wire bundle that receives electrical signals from the upper arm twist actuator assembly is positioned within said through bore opening.

5. The humanoid robot of claim 1, wherein the upper forearm coupling assembly includes a cover opening formed through an extent of said upper forearm coupling assembly, and wherein the electric elbow actuator includes an output that is coupled to the upper forearm coupling assembly by a coupling means that is accessible through the cover opening.

6. The humanoid robot of claim 1, wherein the elbow actuator mating assembly and the upper forearm coupling assembly each include a substantially circular edge configured to abut and rotate with respect to each other.

7. The humanoid robot of claim 1, wherein the electric elbow actuator comprises a rotary actuator having a strain wave gearbox and a brushless DC motor.

8. The humanoid robot of claim 1, further comprising at least one light emitting assembly positioned adjacent to the electric elbow actuator and configured to indicate an operational state of the humanoid robot arm.

9. The humanoid robot of claim 1, further comprising a rotation limiting system comprising:

a limiting projection extending from an output adapter of the electric elbow actuator; and a limiting adapter coupled to the upper forearm and comprising a groove configured to receive the limiting projection, wherein the groove comprises a maximum wall and a minimum wall configured to limit rotation of the upper forearm relative to the lower humerus.

10. The humanoid robot of claim 1, wherein the lower humerus and the upper forearm are housed within a textile exterior covering.

11. The humanoid robot of claim 1, further comprising a lower arm twist actuator assembly with a rotational lower arm twist axis, and wherein the rotational lower arm twist axis is aligned in an arm plane with the rotational upper arm twist axis.

12. The humanoid robot of claim 11, wherein the elbow axis is offset from the arm plane.

13. The humanoid robot of claim 12, wherein the plane is coincident with the arm plane.

14. The humanoid robot of claim 12, wherein the elbow actuator has a center that is offset from the arm plane.

15. A humanoid robot comprising:

an upper region including a torso and at least one arm assembly operably connected to the torso, said arm assembly including:

an upper arm twist actuator assembly having a projection and a rotational upper arm twist axis;

a lower humerus with: (i) a lower humerus extender operably coupled to the upper arm twist actuator assembly and having a receiver configured to receive the projection of the upper arm twist actuator assembly, and (ii) an elbow actuator receiving assembly integrally formed with an extent of the lower humerus extender, and wherein an extent of the elbow actuator receiving assembly has a curvilinear external surface;

an upper forearm with: (i) an upper forearm coupling assembly, and (ii) an upper forearm extender integrally formed with an extent of the upper forearm coupling assembly, and wherein an extent of the upper forearm extender has a curvilinear external surface;

an elbow actuator having an output that is coupled to the upper forearm coupling assembly, and wherein a majority of said elbow actuator is positioned within an extent of the elbow actuator receiving assembly.

16. The humanoid robot of claim 15, wherein the arm assembly; does not include a single wire that traverses multiple degrees of freedom.

17. The humanoid robot of claim 15, further comprising at least one light emitting assembly positioned adjacent to the elbow actuator and configured to indicate an operational state of the humanoid robot arm.

18. The humanoid robot of claim 15, further comprising an energy attenuation member coupled to the lower humerus and configured to contact the upper forearm when the elbow actuator rotates the upper forearm towards the lower humerus.

19. The humanoid robot of claim 15, wherein the elbow actuator lacks a separate housing and is protected by the lower humerus and the upper forearm.

20. The humanoid robot of claim 15, wherein the upper forearm coupling assembly includes a curvilinear extent of an external surface residing within a first plane, and the upper forearm extender integrally formed with an extent of the upper forearm coupling assembly and that includes a curvilinear extent of the external surface residing within a second plane that is oriented perpendicular to the first plane.

21. The humanoid robot of claim 15, wherein the lower humerus and the upper forearm are housed within a textile exterior covering.

22. The humanoid robot of claim 15, further comprising a lower arm twist actuator assembly with a rotational lower arm twist axis, and wherein the rotational lower arm twist axis is aligned in an arm plane with the rotational upper arm twist axis.

* * * * *